United States Patent
Yang et al.

(10) Patent No.: US 10,795,447 B2
(45) Date of Patent: *Oct. 6, 2020

(54) KEYSWITCH WITH ADJUSTABLE TACTILE FEEDBACK

(71) Applicant: DARFON ELECTRONICS CORP., Taoyuan (TW)

(72) Inventors: Chen Yang, Taoyuan (TW); Chia-Hung Liu, Taoyuan (TW); Yung-Chih Wang, Taoyuan (TW); Yu-Chun Hsieh, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,465

(22) Filed: Dec. 10, 2019

(65) Prior Publication Data

US 2020/0117277 A1 Apr. 16, 2020

Related U.S. Application Data

(63) Continuation of application No. 16/128,524, filed on Sep. 12, 2018, now Pat. No. 10,572,018.

(30) Foreign Application Priority Data

Nov. 29, 2017 (TW) .............................. 106141570 A

(51) Int. Cl.
*H01H 13/7057* (2006.01)
*G06F 3/01* (2006.01)
(Continued)

(52) U.S. Cl.
CPC ............ *G06F 3/016* (2013.01); *G06F 3/0202* (2013.01); *G06F 3/023* (2013.01);
(Continued)

(58) Field of Classification Search
CPC ........ H01H 15/02; H01H 15/06; H01H 1/242; H01H 13/12; H01H 13/28; H01H 13/48;
(Continued)

(56) References Cited

U.S. PATENT DOCUMENTS 4,950,856 A * 8/1990 Valenzona ........... H01H 13/023
200/276.1
10,431,402 B2 * 10/2019 Hsieh ....................... H01H 3/12
(Continued)

FOREIGN PATENT DOCUMENTS

| TW | 201505060 A | 2/2015 |
|---|---|---|
| TW | 201707031 A | 2/2017 |
| TW | I581290 B | 5/2017 |

OTHER PUBLICATIONS

Yang, the specification, including the claims, and drawings in the U.S. Appl. No. 16/129,813, filed Sep. 13, 2018.

*Primary Examiner* — Ahmed M Saeed
(74) *Attorney, Agent, or Firm* — Winston Hsu

(57) ABSTRACT

A keyswitch with adjustable tactile feedback is adjusted by an adjusting method. The keyswitch includes a baseplate, an upper housing, an upper bushing component, a lower bushing component, a keycap and a recovering component. The baseplate has an electrode module, the upper housing is disposed on the baseplate, the upper bushing component is movably disposed on the upper housing, the lower bushing component is movably located between the baseplate and the upper housing, and the keycap is connected to a connecting portion of the upper bushing component. The lower bushing component can rotate relative to the baseplate to switch between a first position and a second position. The lower bushing component has a first lateral surface and a second lateral surface with different shapes. The recovering (Continued)

component is disposed between the baseplate and the lower bushing component to upwardly push the lower bushing component.

17 Claims, 42 Drawing Sheets

(51) Int. Cl.
    *G06F 3/023*     (2006.01)
    *H01H 13/85*     (2006.01)
    *G06F 3/02*     (2006.01)

(52) U.S. Cl.
    CPC ........ *H01H 13/7057* (2013.01); *H01H 13/85* (2013.01); *H01H 2215/028* (2013.01); *H01H 2235/01* (2013.01)

(58) Field of Classification Search
    CPC ........ H01H 13/52; H01H 13/56; H01H 13/20; H01H 13/36; H01H 13/365; H01H 13/14; H01H 3/125; H01H 13/7065; H01H 2221/044; H01H 2221/036; H01H 13/7057; H01H 13/85; H01H 2235/01; H01H 2215/028; G06F 3/016; G06F 3/0202; G06F 3/023
    See application file for complete search history.

(56) References Cited

U.S. PATENT DOCUMENTS

| | | |
|---|---|---|
| 2013/0015986 A1 | 1/2013 | Lu |
| 2017/0011871 A1* | 1/2017 | Izawa ................ H01H 1/5805 |
| 2017/0115745 A1 | 4/2017 | Hadas |
| 2017/0221653 A1* | 8/2017 | Liao .................... H01H 13/023 |
| 2017/0308178 A1 | 10/2017 | Huang |
| 2017/0364259 A1 | 12/2017 | Kamata |
| 2018/0006648 A1* | 1/2018 | Liu ...................... H01H 13/705 |
| 2018/0074587 A1* | 3/2018 | Liu ....................... G06F 3/016 |
| 2019/0163273 A1 | 5/2019 | Yang |
| 2019/0164703 A1 | 5/2019 | Yang |

\* cited by examiner

KEYSWITCH WITH ADJUSTABLE TACTILE FEEDBACK

CROSS REFERENCE TO RELATED APPLICATIONS

This is a continuation application of U.S. patent application Ser. No. 16/128,524, filed on Sep. 12, 2018. The above mentioned applications are included in their entirety herein by reference.

BACKGROUND OF THE INVENTION

1. Field of the Invention

The present invention relates to a keyswitch, and more particularly, to a keyswitch with adjustable tactile feedback.

2. Description of the Prior Art

A keyboard, which is the most common input device, could be found in variety of electronic apparatuses for users to input characters, symbols, numerals and so on. Furthermore, from consumer electronic products to industrial machine tools, they are all equipped with a keyboard for performing input operations.

In actual application, there are various kinds of keyswitches for providing different tactile feedbacks. For example, the tactile feedback may be varied by high or low triggering position between an elastic piece and a conductive electrode, long or short travel distance, required actuation force of the keyswitch, tactile or linear feedback of the keyswitch, clicky or non-clicky tactile feedback of the keyswitch, etc. That is to say, a conventional mechanical keyswitch only provides one single kind of tactile feedback without a tactile feedback adjusting function. Thus, if the user wants to experience different kinds of tactile feedbacks, the user must buy a new keyboard or replace the original keyswitches on the gaming keyboard with new keyswitches for providing another kind of tactile feedback. In such a manner, it would cause a high replacement cost, so as to greatly limit flexibility in use and operational convenience of the mechanical keyswitch.

SUMMARY OF THE INVENTION

The present invention provides a keyswitch with adjustable tactile feedback for solving above drawbacks.

According to the claimed invention, a keyswitch capable of assembling with a keycap includes a substrate, an upper sleeve component, a lower sleeve component and a recovering component. The upper cover is disposed on the substrate. The upper sleeve component is disposed on the upper cover in a movable manner at a vertical direction. The upper sleeve component has a keycap connecting portion, a first bottom surface and a second bottom surface, the first bottom surface is lower than the second bottom surface, and the keycap connects portion being assembled with the keycap. The lower sleeve component is movably disposed between the substrate and the upper cover. The lower sleeve component is rotated relative to the substrate at a level direction and switched between a first angle position and a second angle position. The lower sleeve component has a first top surface and a second top surface, and the first top surface is higher than the second top surface. The recovering component is disposed between the substrate and the lower sleeve component and adapted to upwardly move the lower sleeve component. The first bottom surface abuts the first top surface, a gap between the lower sleeve component and the substrate is reduced and the recovering component has a first length while the lower sleeve component contacts against the upper sleeve component in the first angle position. The first bottom surface abuts the second top surface or the second bottom surface abuts the first top surface, the gap between the lower sleeve component and the substrate is enlarged and the recovering component has a second length greater than the first length while the lower sleeve component contacts against the upper sleeve component in the second angle position.

According to the claimed invention, a keyswitch capable of assembling with a keycap includes a substrate, an upper sleeve component, a lower sleeve component and a recovering component. The substrate has a first top surface and a second top surface, and the first top surface is higher than the second top surface. The upper cover is disposed on the substrate. The upper sleeve component is disposed on the upper cover in a movable manner at a vertical direction, and the upper sleeve component has a keycap connecting portion assembled with the keycap. The lower sleeve component is movably disposed between the substrate and the upper cover. The lower sleeve component is rotated relative to the substrate at a level direction and switched between a first angle position and a second angle position. The lower sleeve component has a first bottom surface and a second bottom surface, and the first bottom surface is lower than the second bottom surface. The recovering component is disposed between the substrate and the lower sleeve component and adapted to upwardly move the lower sleeve component. The first bottom surface abuts the first top surface, and upward and downward motion of the lower sleeve component provides a first travel distance while the lower sleeve component contacts against the substrate in the first angle position. The first bottom surface abuts the second top surface or the second bottom surface abuts the first top surface, and upward and downward motion of the lower sleeve component provides a second travel distance while the lower sleeve component contacts against the substrate in the second angle position, the second travel distance is greater than the first travel distance.

According to the claimed invention, a keyswitch capable of assembling with a keycap includes a substrate, an upper sleeve component, a lower sleeve component and a recovering component. The substrate has an electrode module. The upper cover is disposed on the substrate. The upper sleeve component is disposed on the upper cover in a movable manner at a vertical direction, and the upper sleeve component has a keycap connecting portion assembled with the keycap. The lower sleeve component is movably disposed between the substrate and the upper cover. The lower sleeve component is rotated relative to the substrate at a level direction and switched between a first angle position and a second angle position. The lower sleeve component has a first vertical lateral surface and a second vertical lateral surface, and a shape of the first vertical lateral surface is different from a shape of the second vertical lateral surface. The first vertical lateral surface includes a first sectional inclined surface, and the second vertical lateral surface includes a second sectional inclined surface lower than the first sectional inclined surface. The recovering component is disposed between the substrate and the lower sleeve component and adapted to upwardly move the lower sleeve component. The second vertical lateral surface is separated from the electrode module and the first vertical lateral surface is interfered with the electrode module while the lower sleeve component is moved relative to the substrate in the first angle position. The first vertical lateral surface is separated from the electrode module and the second vertical lateral surface is interfered with the electrode module while the lower sleeve component is moved relative to the substrate in the second angle position. While the lower sleeve component is moved relative to the substrate in the first angle position, the electrode module is electrified as the lower sleeve component is located in a lower position; while the lower sleeve component is moved relative to the substrate in the second angle position, the electrode module is electrified as the lower sleeve component is located in a higher position.

The keyswitch in the first embodiment of the present invention disposes the concave and convex structures between the upper sleeve component and the lower sleeve component, the required actuation force quantity of the recovering component is varied, and the keyswitch can provide the hand feeling modes with different feedback by the same triggering travel distance; the keyswitch in the second embodiment disposes the concave and convex structures between the lower sleeve component and the substrate, the possible pressing depth of the lower sleeve component is varied, so that the pressing travel distance of the keyswitch can be adjusted for different hand feeling modes; the keyswitch in the third embodiment designs stage variation by the inclined surfaces on the outer surface of the lower sleeve component, so that the keyswitch can provide different triggering travel distances via the identical required actuation force condition; the keyswitch in the fourth embodiment disposes the resistance protrusion on position of the lower sleeve component corresponding to the electrode module, the resistance protrusion can touch or be distant from the electrode module according to the left and right turn of the lower sleeve component, which results in the hand feeling mode of non-clicky and linear feedback and the hand feeling mode of non-clicky and tactile feedback; the keyswitch in the fifth embodiment disposes the resilient arm unit on the substrate, and further disposes the resistance protrusion on the lower sleeve component corresponding to the resilient arm unit, which results in the hand feeling mode of non-clicky and linear feedback and the hand feeling mode of clicky sound and tactile feedback; the keyswitch in the sixth embodiment disposes two resistance protrusions on the lower sleeve component for the hand feeling mode of clicky and tactile feedback and the hand feeling mode of non-clicky and tactile feedback. The keyboard can utilize the adjusting component to manually or automatically switch the keyswitch into different hand feeling modes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
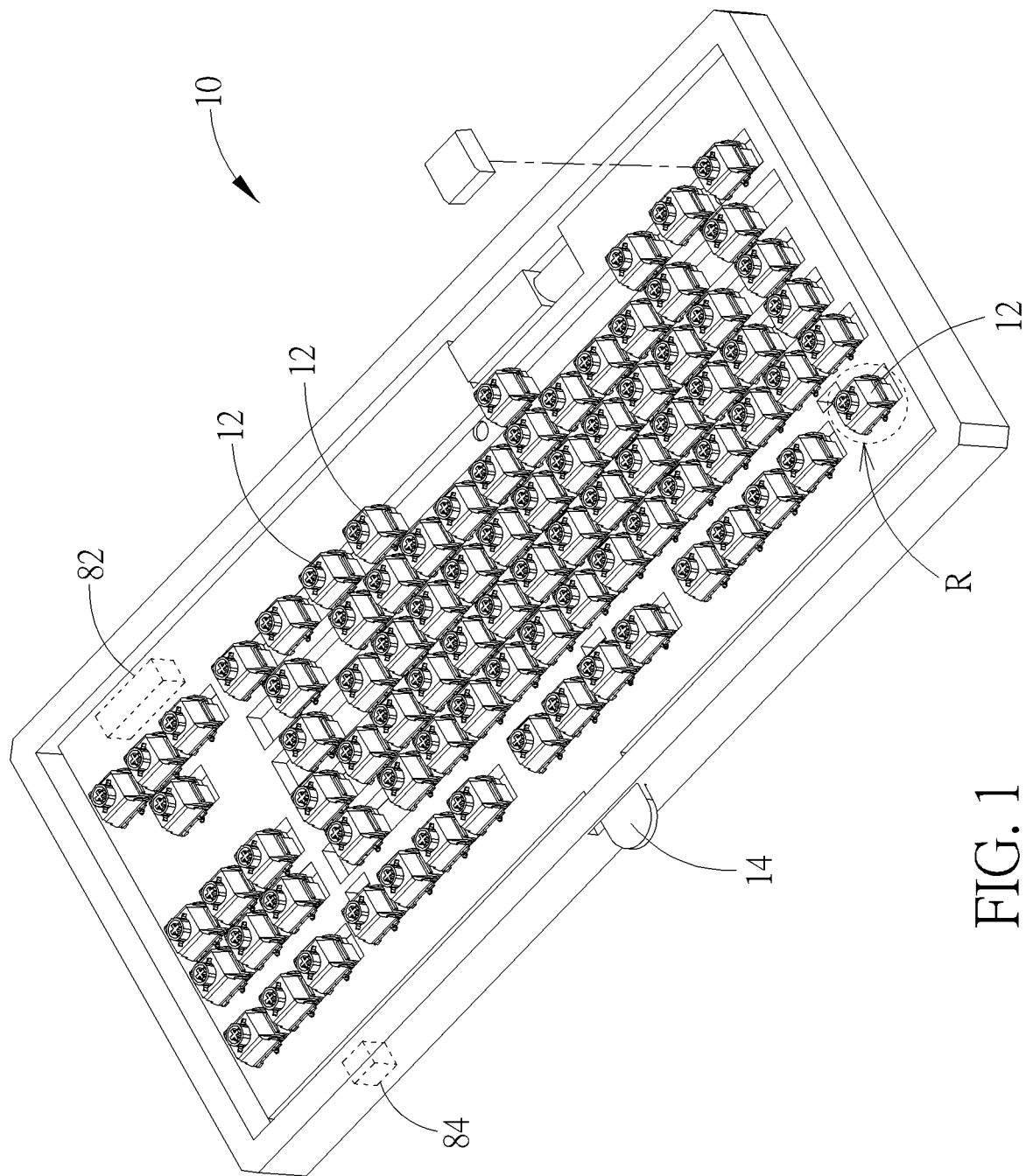
FIG. 1 is a diagram of a keyboard according to an embodiment of the present invention.
Figure 2:
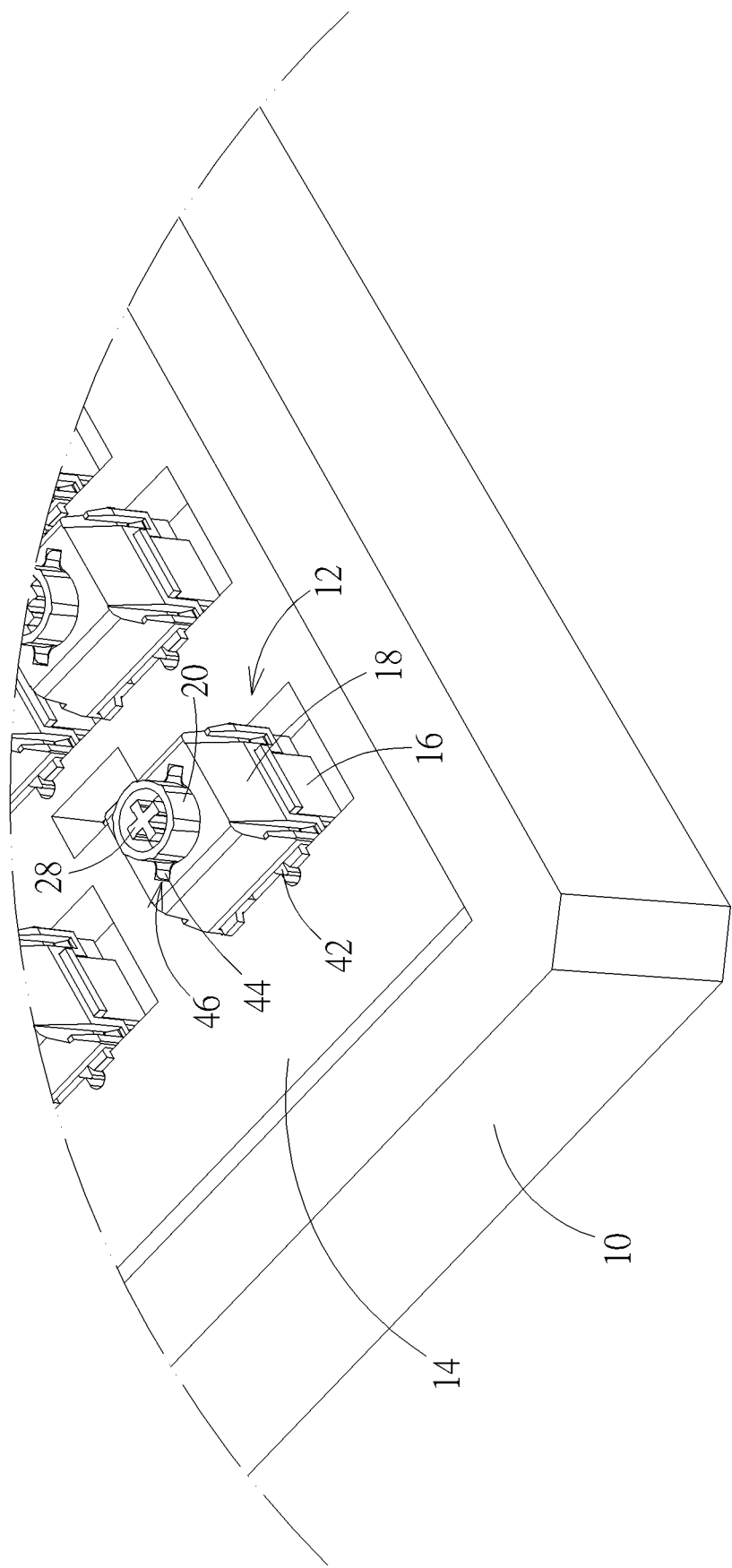
FIG. 2 is an enlarged diagram of a region R shown in FIG. 1.

Please refer to FIG. 1 and FIG. 2. FIG. 1 is a diagram of a keyboard 10 according to an embodiment of the present invention. FIG. 2 is an enlarged diagram of a region R shown in FIG. 1. The keyboard 10 includes a plurality of keyswitches 12 and an adjusting component 14, and the adjusting component 14 is connected to the plurality of keyswitches 12 simultaneously. A user can move the adjusting component 14 to simultaneously switch the plurality of keyswitches 12 between different hand feeling modes. The keyswitch 12 has several possible embodiments, and the user can operate the adjusting component 14 to determine how the hand feeling mode of the keyboard 10 is manually switched according to actual demand.

Figure 3:
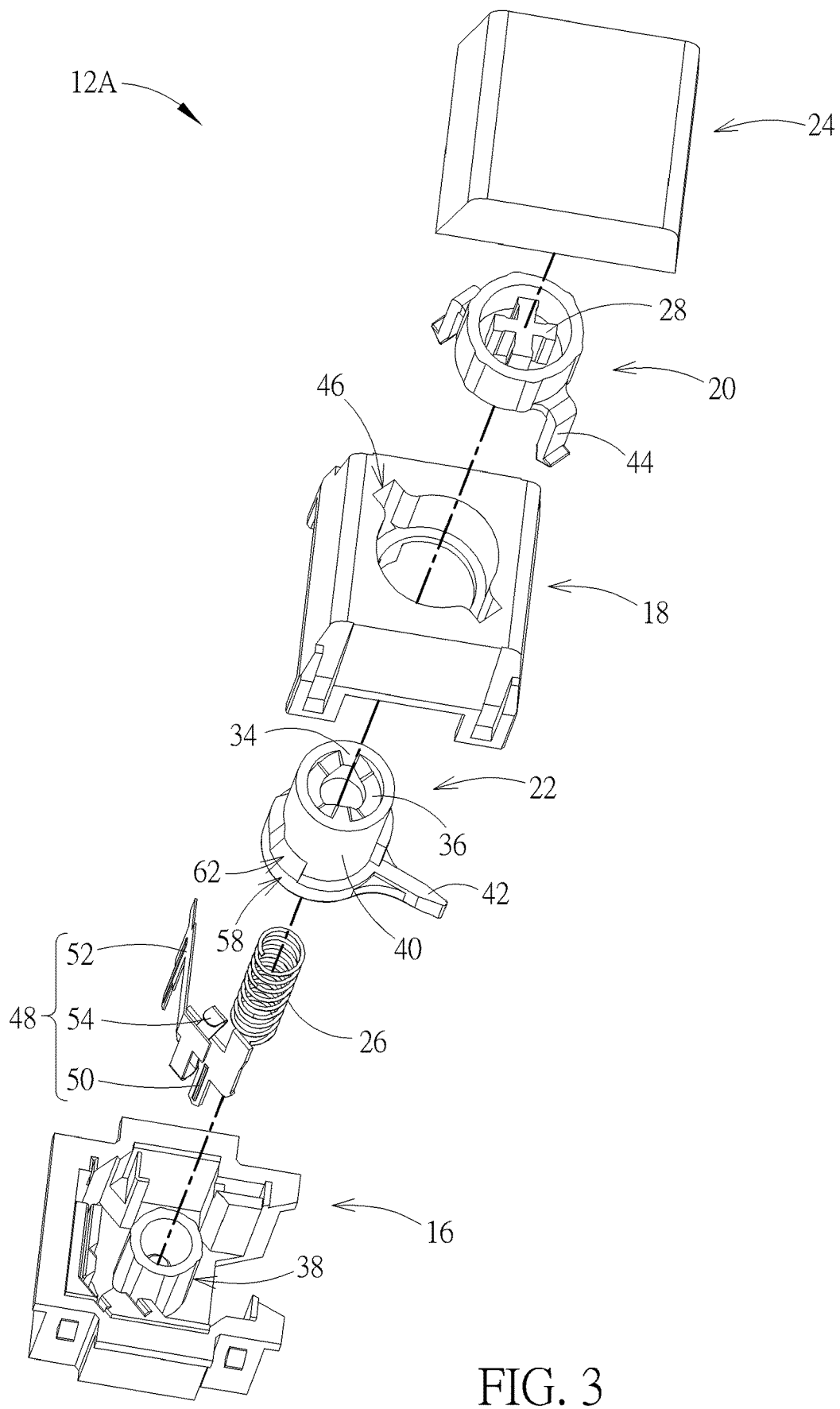
FIG. 3 and FIG. 4 respectively are exploded diagrams of the keyswitch in different views according to a first embodiment of the present invention.
Figure 4:
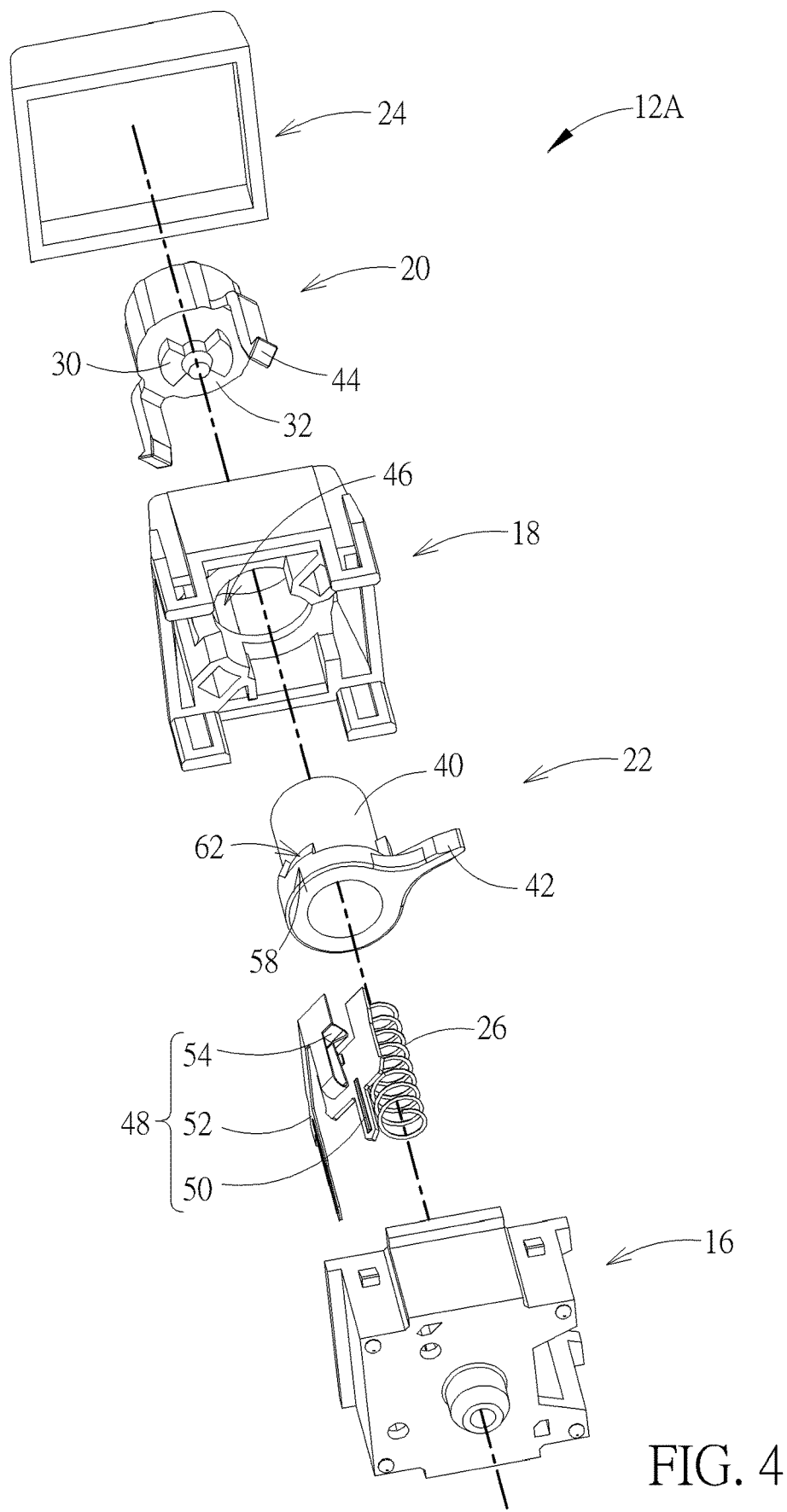
Figure 5:
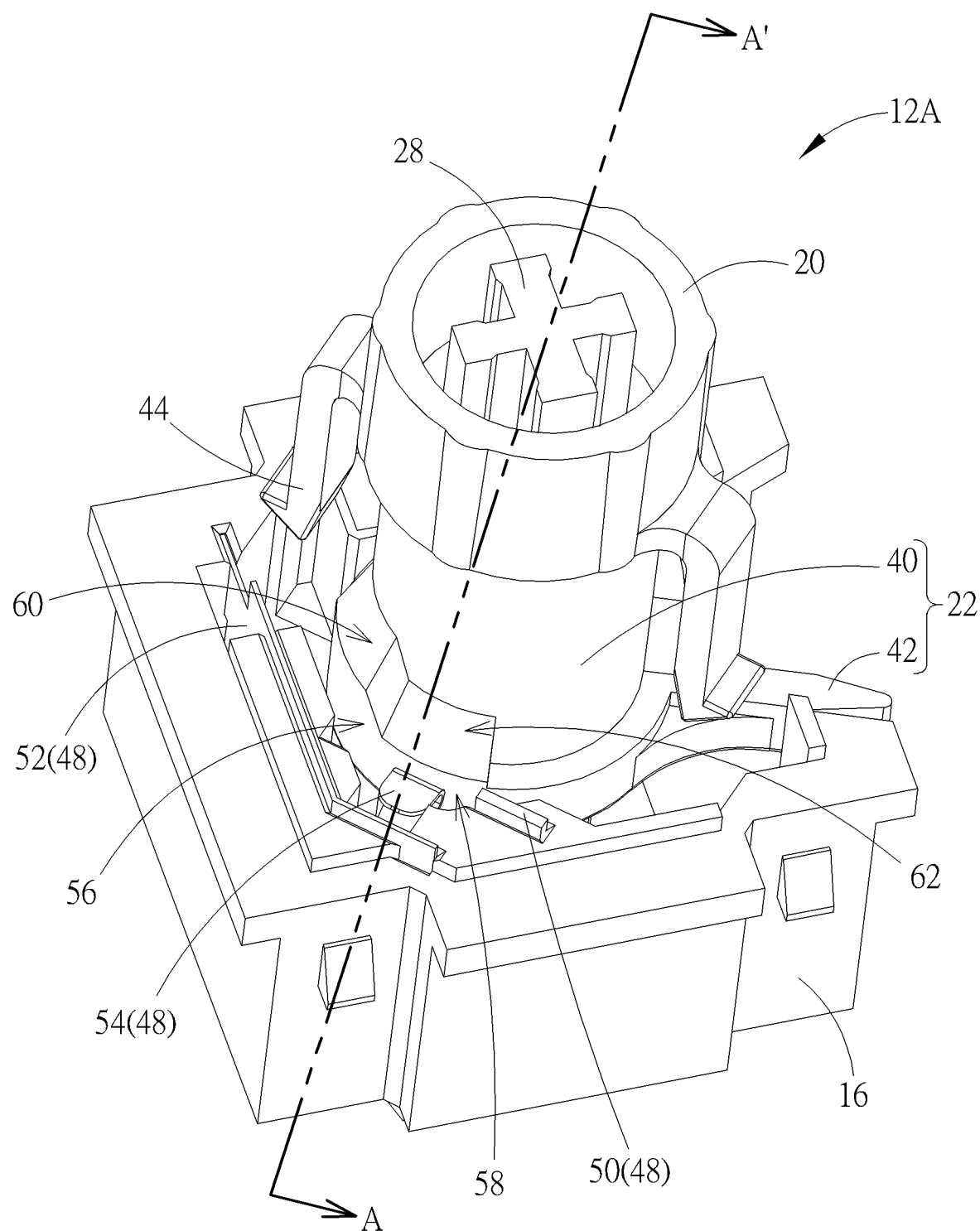
FIG. 5 and FIG. 6 respectively are diagrams of the keyswitch without an upper cover in different hand feeling modes according to the first embodiment of the present invention.
Figure 6:
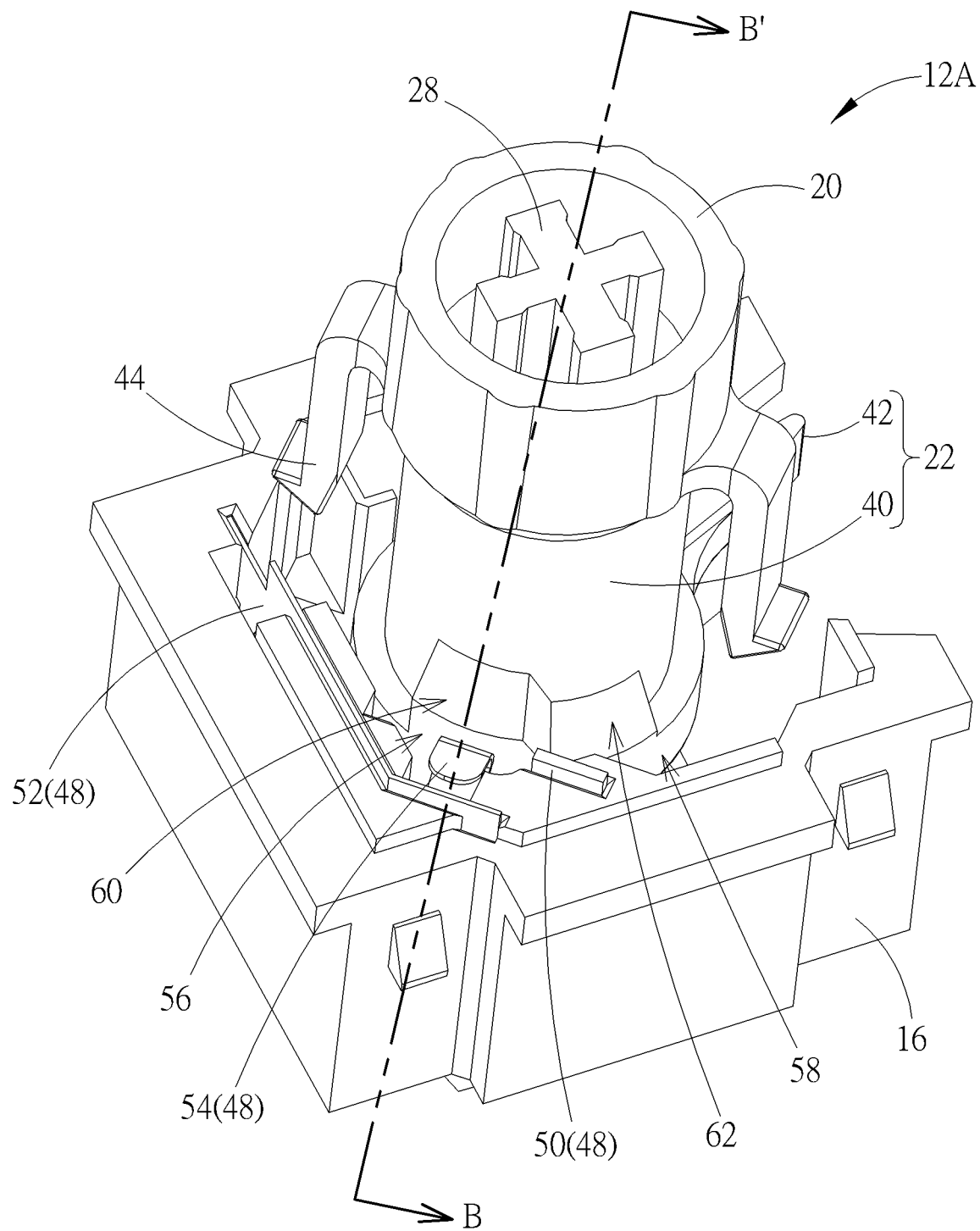
Figure 7:
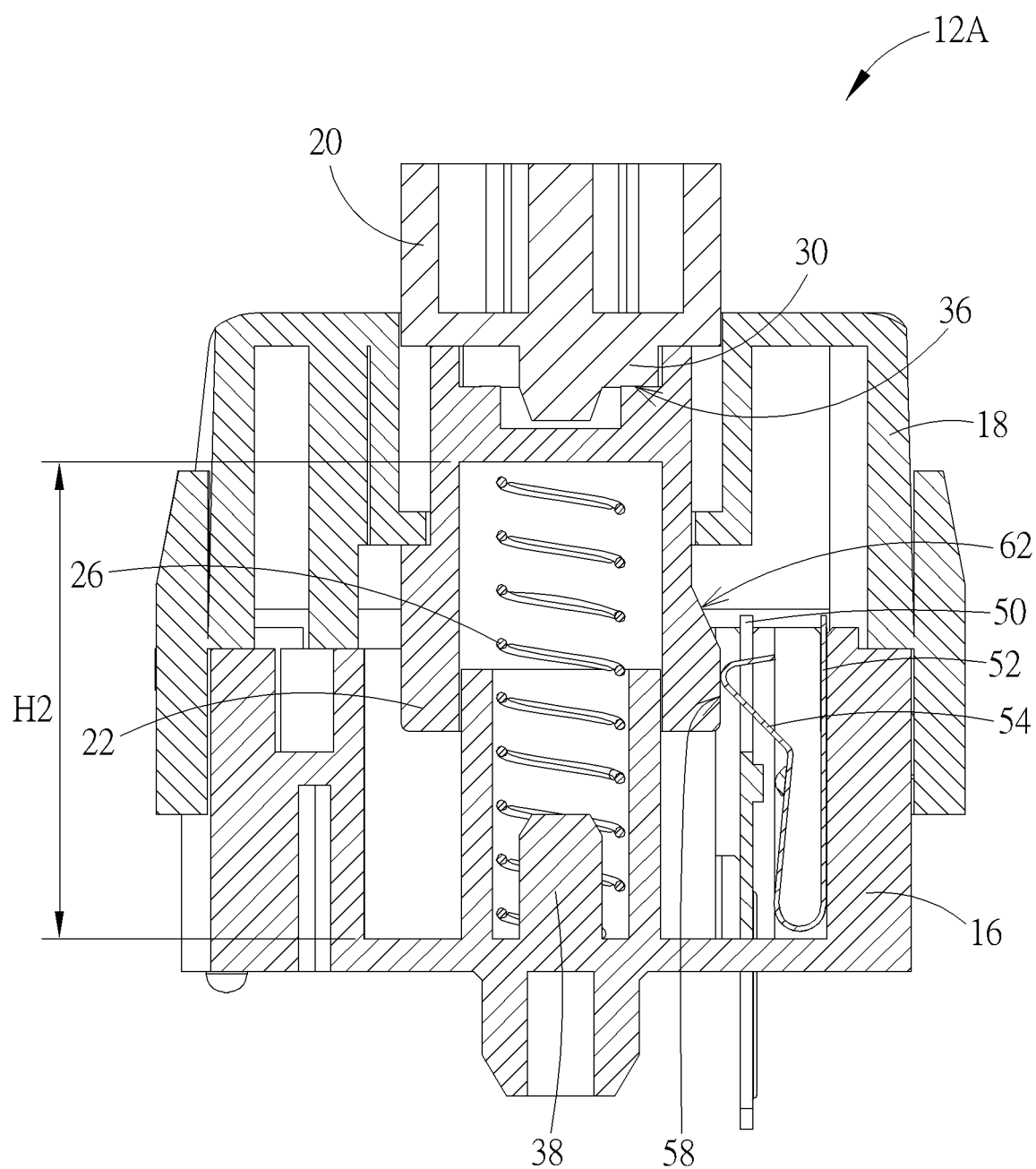
FIG. 7 and FIG. 8 respectively are sectional views of the keyswitch with the upper cover in different pressing modes along line A-A' shown in FIG. 5.
Figure 8:
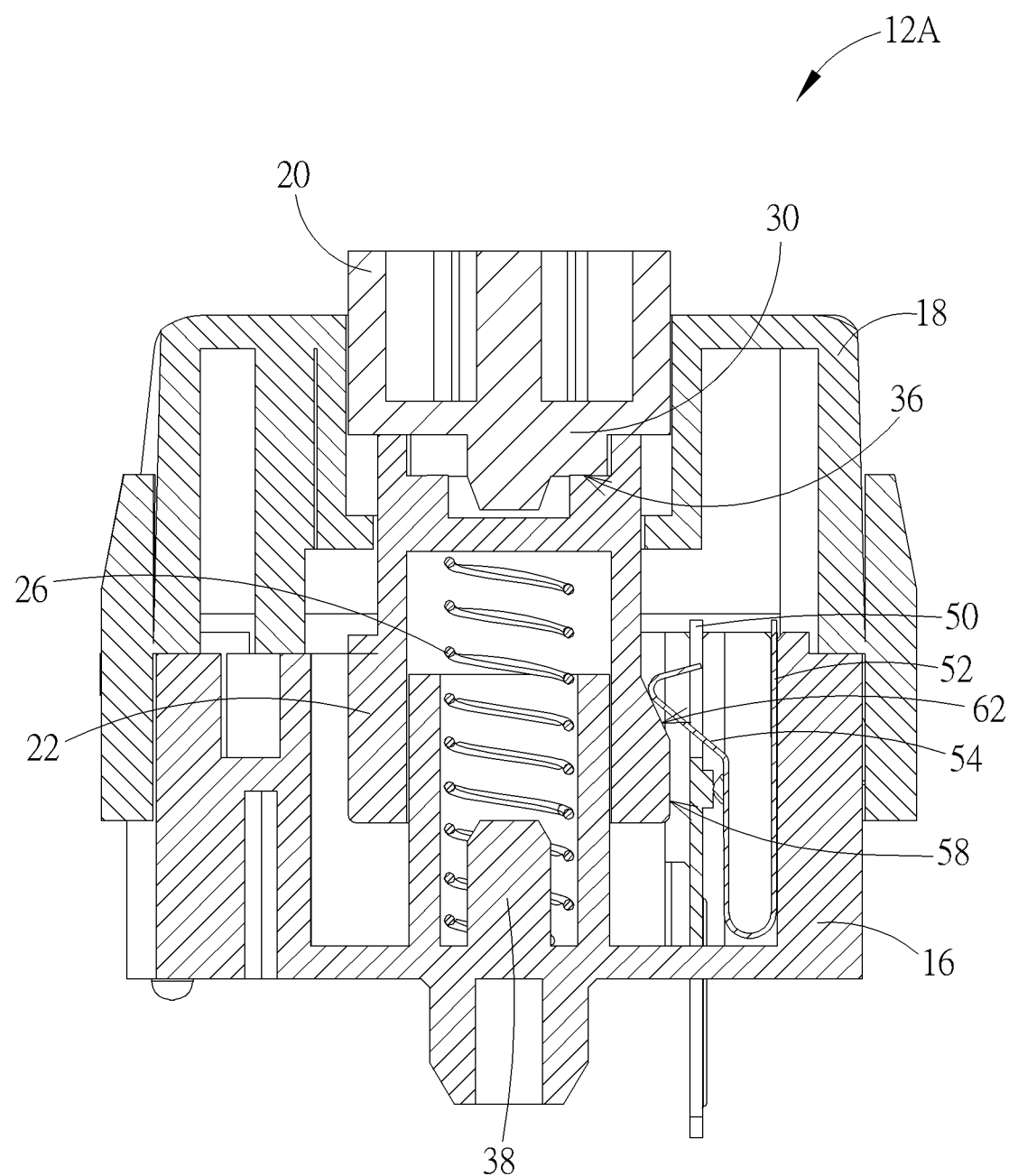
Figure 9:
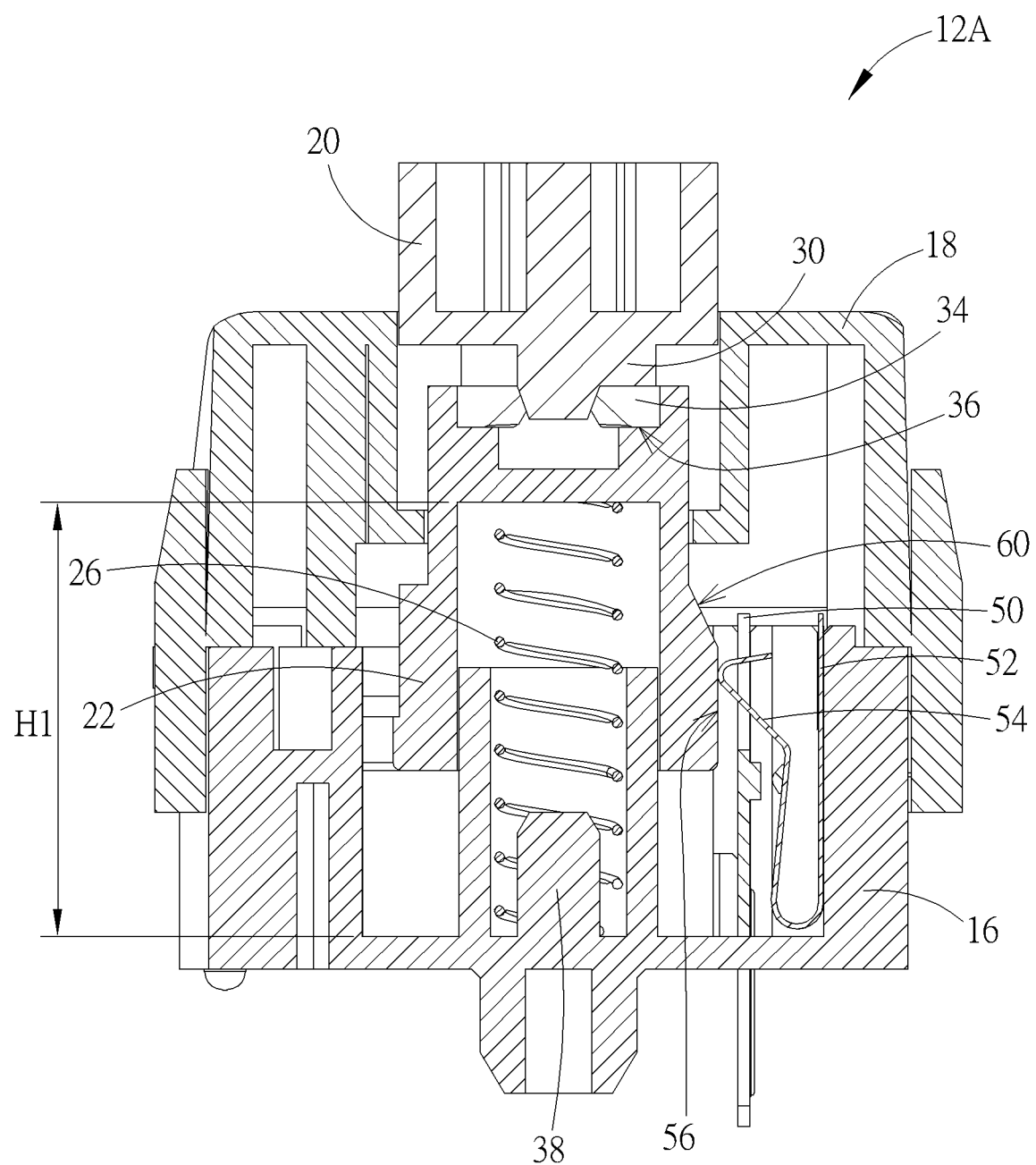
FIG. 9 and FIG. 10 respectively are sectional views of the keyswitch with the upper cover in different pressing modes along line B-B' shown in FIG. 6.
Figure 10:
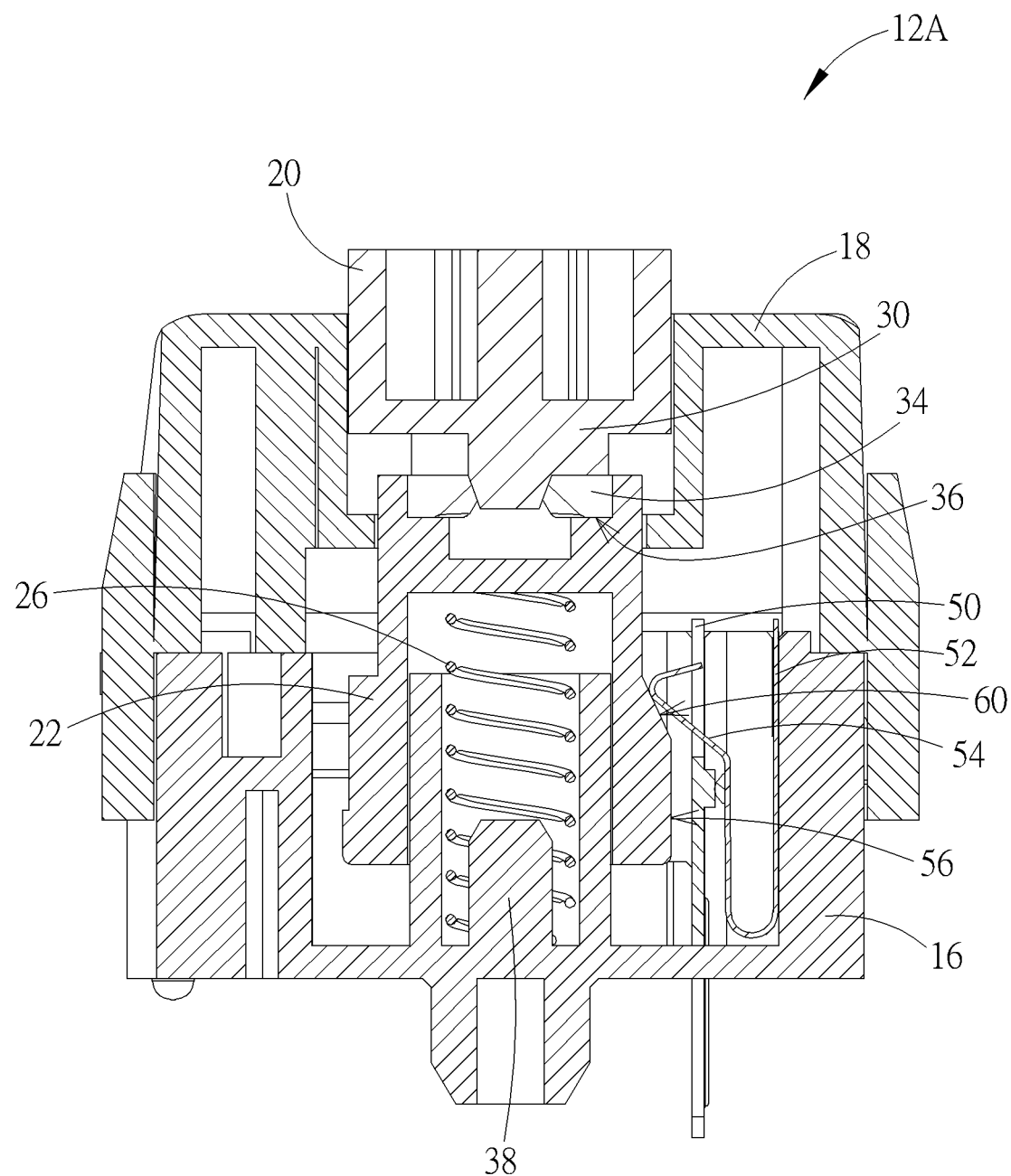

Please refer to FIG. 3 to FIG. 10. FIG. 3 and FIG. 4 respectively are exploded diagrams of the keyswitch 12A in different views according to a first embodiment of the present invention. FIG. 5 and FIG. 6 respectively are diagrams of the keyswitch 12A without an upper cover 18 in different hand feeling modes according to the first embodiment of the present invention. FIG. 7 and FIG. 8 respectively are sectional views of the keyswitch 12A with the upper cover 18 in different pressing modes along line A-A' shown in FIG. 5. FIG. 9 and FIG. 10 respectively are sectional views of the keyswitch 12A with the upper cover 18 in different pressing modes along line B-B' shown in FIG. 6.

The keyswitch 12A includes a substrate 16, the upper cover 18, an upper sleeve component 20, a lower sleeve component 22, a keycap 24 and a recovering component 26. The substrate 16 is disposed on a bottom of the keyboard 10 or a printed circuit board. The upper cover 18 is disposed on the substrate 16. The upper sleeve component 20 is disposed on the upper cover 18 in an upwardly and downwardly movable manner at a vertical direction. The lower sleeve component 22 is movably disposed between the substrate 16 and the upper cover 18, and the recovering component 26 is disposed between the substrate 16 and the lower sleeve component 22. The recovering component 26 is used to upwardly push the lower sleeve component 20. The upper sleeve component 20 includes a keycap connecting portion 28, a first bottom surface 30 and a second bottom surface 32. The keycap connecting portion 28 can be assembled with the keycap 24. The first bottom surface 30 is lower than the second bottom surface 32, which means the first bottom surface 30 can protrude from the second bottom surface 32. In addition, the lower sleeve component 22 includes a first top surface 34 and a second top surface 36, and the first top surface 34 is higher than the second top surface 36, which means the first top surface 34 is stuck out of the second top surface 36.

The substrate 16 includes a constraining pillar 38. The lower sleeve component 22 includes a main body 40 and a pushing portion 42. The main body 40 is movably disposed on the constraining pillar 38, and the pushing portion 42 stretches from a surface of the main body 40 to be partly exposed out of the substrate 16. Therefore, when the user manually presses the pushing portion 42 of each of the plurality of keyswitches 12, or utilizes the adjusting component 14 to simultaneously push the pushing portions 42 of the plurality of keyswitches 12, the main body 40 is guided by the pushing portion 42 and can be levelly rotated relative to the constraining pillar 38 at a right direction and a left direction. Besides, the upper sleeve component 20 further includes a sliding portion 44 movably disposed inside a sliding slot 46 formed on the upper cover 18. While the keycap 24 is manually pressed, the keycap 24 can be moved relative to the upper cover 18 via the sliding portion 44 upwardly and downwardly at the vertical direction; the sliding slot 46 further can be used to prevent the upper sleeve component 20 from being levelly rotated relative to the upper cover 18.

The substrate 16 further includes an electrode module 48, and the electrode module 48 includes a first electrode sheet 50 and a second electrode sheet 52. The first electrode sheet 50 is inserted into a bottom inside the substrate 16, and the second electrode sheet 52 is pasted on an inner wall of the substrate 16 and located between the first electrode sheet 50 and the lower sleeve component 22. The second electrode sheet 52 includes an elastic portion 54 movably contacting against the lower sleeve component 22. The lower sleeve component 22 can be interfered with the electrode module 48 while the lower sleeve component 22 is moved relative to the constraining pillar 38 of the substrate 16 vertically. That is to say, the elastic portion 54 of the second electrode sheet 52 can contact against and be separated from the first electrode sheet 50 in accordance with upward and downward motion of the lower sleeve component 22 for triggering the keyswitch 12A.

The lower sleeve component 22 further includes a first vertical lateral surface 56 and a second vertical lateral surface 58, and a shape of the first vertical lateral surface 56 is different form a shape of the second vertical lateral surface 58. The first vertical lateral surface 56 is connected to the first sectional inclined surface 60, the second vertical lateral surface 58 is connected to the second sectional inclined surface 62, and a distance between the first sectional inclined surface 60 and bottom of the main body 40 is greater than a distance between the second sectional inclined surface 62 and the bottom of the main body 40, which means the first sectional inclined surface 60 can be higher than the second sectional inclined surface 62. While the elastic portion 54 of the second electrode sheet 52 contacts against the first vertical lateral surface 56 or the second vertical lateral surface 58, the second electrode sheet 52 is not electrified by the first electrode sheet 50; while the elastic portion 54 contacts against the first sectional inclined surface 60 or the second sectional inclined surface 62, the second electrode sheet 52 and the first electrode sheet 50 are electrified.

The lower sleeve component 22 can be levelly rotated relative to the constraining pillar 38 of the substrate 16, so as to switch between a first angle position shown in FIG. 6 and a second angle position shown in FIG. 5. When the lower sleeve component 22 is set in the first angle position, the lower sleeve component 22 contacts against the upper sleeve component 20, the first bottom surface 30 abuts the first top surface 34, the second bottom surface 32 does not abut the second top surface 36, a gap between the substrate 16 and bottom of the lower sleeve component 22 is smaller, so that the recovering component 26 has a first length H1; in the meantime, the elastic portion 54 contacts against the first vertical lateral surface 56, as shown in FIG. 9. When the keyswitch 12A is pressed, the recovering component 26 is compressed accordingly and compression is stopped until the bottom of the lower sleeve component 22 contacts the substrate 16. The elastic portion 54 is moved from the first vertical lateral surface 56 to the first sectional inclined surface 60, and the electrode module 48 is electrified to generate a control signal of the keyswitch 12A, as shown in FIG. 10. In this hand feeling mode, the keyswitch 12A provides shorter pressing travel distance, the user exerts large force upon the keyswitch 12A for downward motion because the recovering component 26 has greater required actuation force quantity, which means heavy hand feeling is acquired.

When the lower sleeve component 22 is set in the second angle position, the lower sleeve component 22 contacts against the upper sleeve component 20, the first bottom surface 30 abuts the second top surface 36, the second bottom surface 32 abuts the first top surface 34, the gap between the substrate 16 and bottom of the lower sleeve component 22 is larger, so that the recovering component 26 has a second length H2; meanwhile, the elastic portion 54 contacts against the second vertical lateral surface 58, as shown in FIG. 7, and the second length H2 is greater than the first length H1. When the keyswitch 12A is pressed, the recovering component 26 is compressed accordingly and compression is stopped until the bottom of the lower sleeve component 22 contacts the substrate 16, the elastic portion 54 is moved from the second vertical lateral surface 58 to the second sectional inclined surface 62, and the electrode module 48 is electrified to generate the control signal of the keyswitch 12A, as shown in FIG. 8. In this hand feeling mode, the keyswitch 12A can provide longer pressing travel distance, the recovering component 26 has smaller required actuation force quantity, and the user exerts large force upon the keyswitch 12A for downward motion.

Thus, the first embodiment of the present invention disposes the first bottom surface 30 and the second bottom surface 32 on the bottom of the upper sleeve component 20, disposes the first top surface 34 and the second top surface 36 corresponding to the bottom surfaces 30 and 32 on top of the lower sleeve component 22, the upper sleeve component 20 is constrained by the upper cover 18 and cannot be rotated levelly. Rotation of the lower sleeve component 22 can change the gap between the upper sleeve component 20 and the lower sleeve component 22, an initial height of the lower sleeve component 22 relative to the substrate 16 is adjustable, so that the recovering component 26 has dissimilar required actuation force quantity for providing different hand feeling modes. An outer surface of the lower sleeve component 22 has the first vertical lateral surface 56 and the first sectional inclined surface 60 matched with the first angle position, and further has the second vertical lateral surface 58 and the second sectional inclined surface 62 matched with the second angle position, hence the keyswitch 12A can provide identical trigger travel distance at any angle position.

Figure 11:
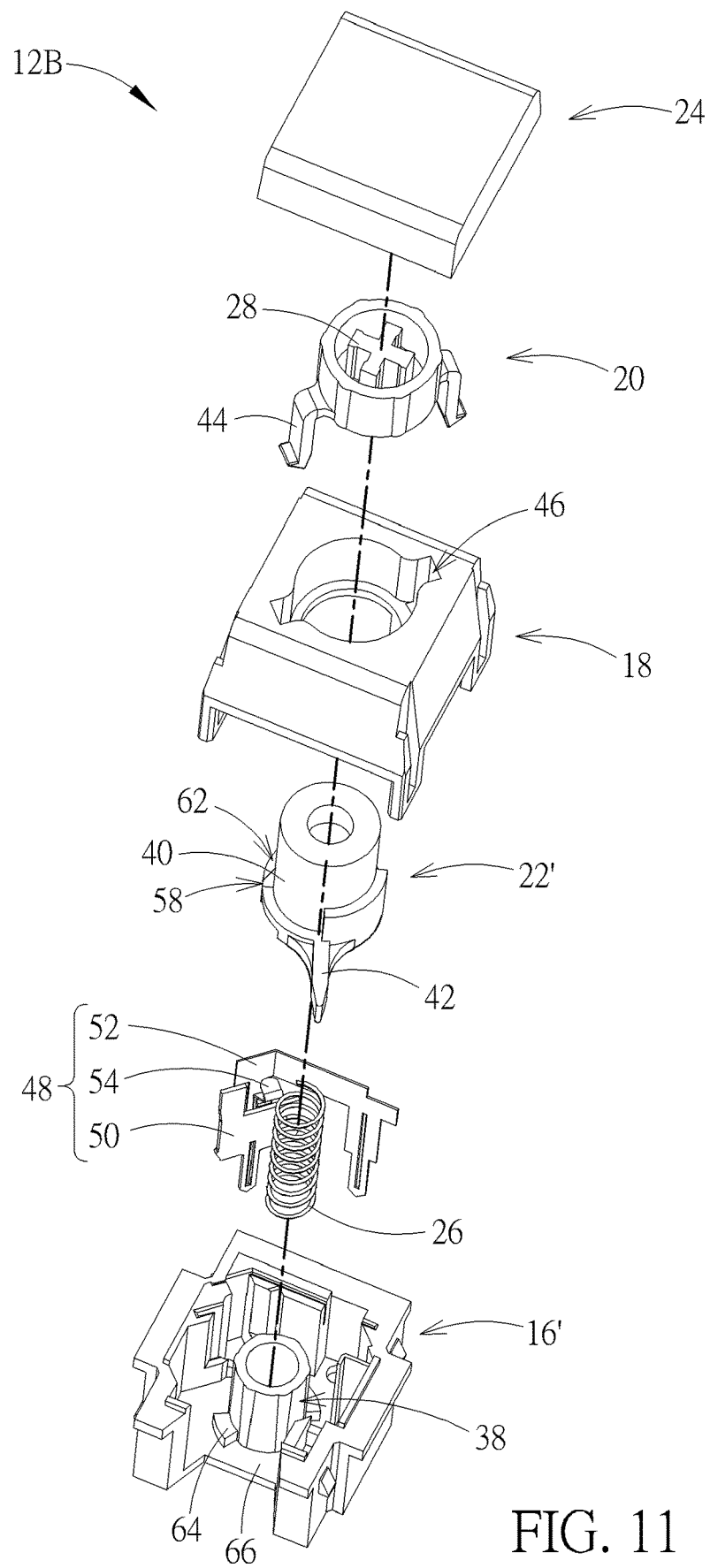
FIG. 11 and FIG. 12 respectively are exploded diagrams of the keyswitch in different views according to a second embodiment of the present invention.
Figure 12:
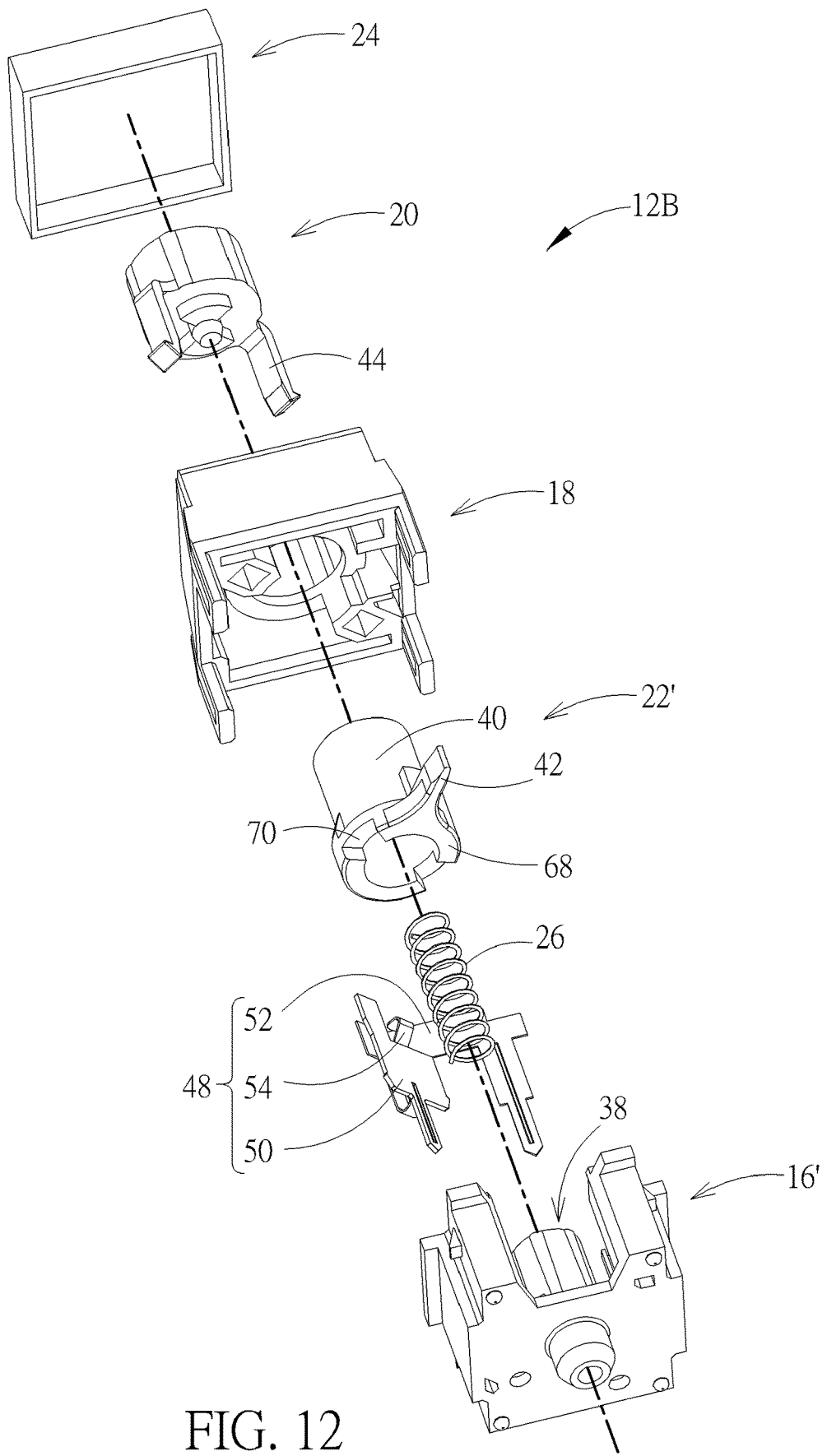
Figure 13:
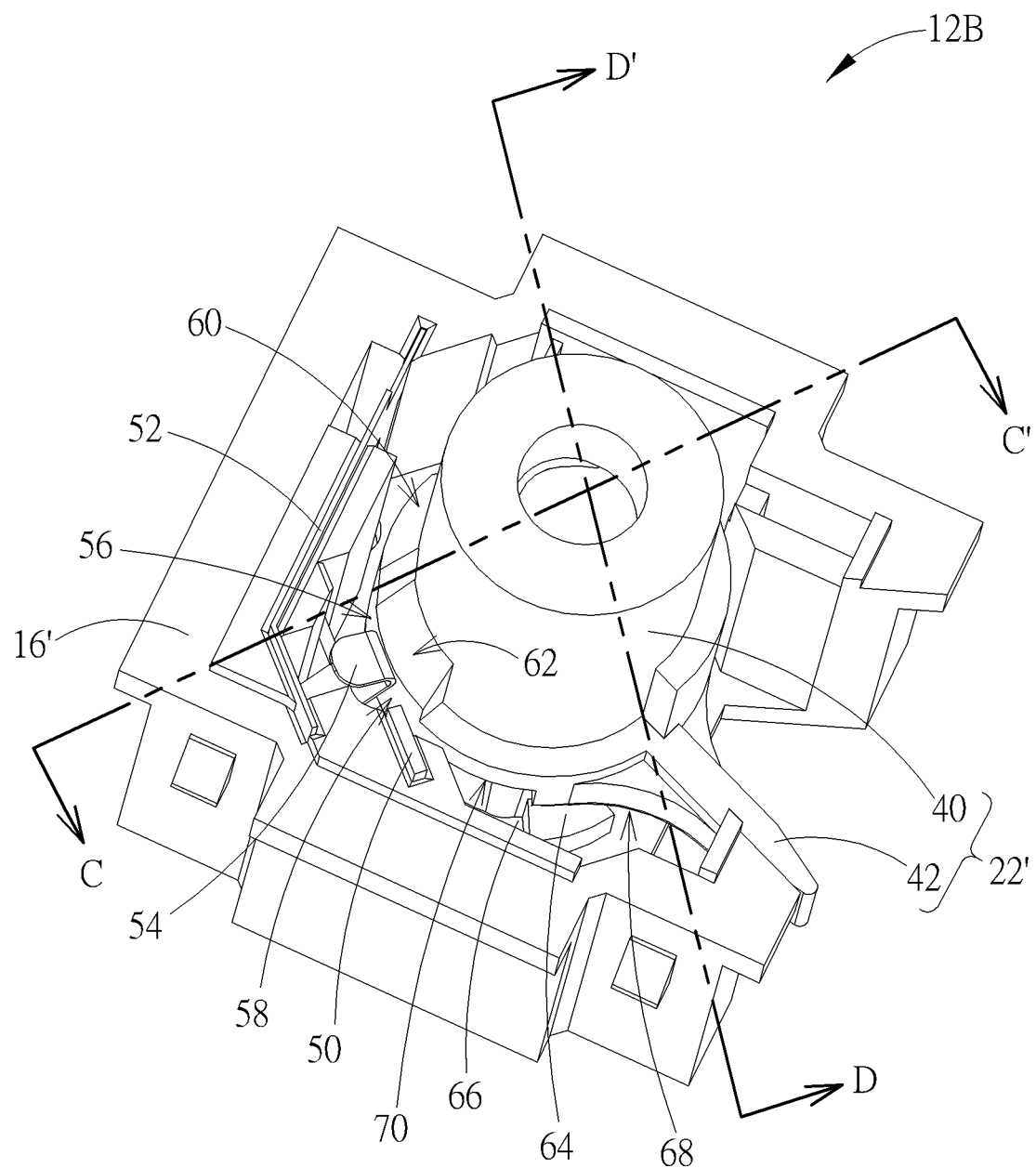
FIG. 13 and FIG. 14 respectively are diagrams of the keyswitch without the upper cover in different hand feeling modes according to the second embodiment of the present invention.
Figure 14:
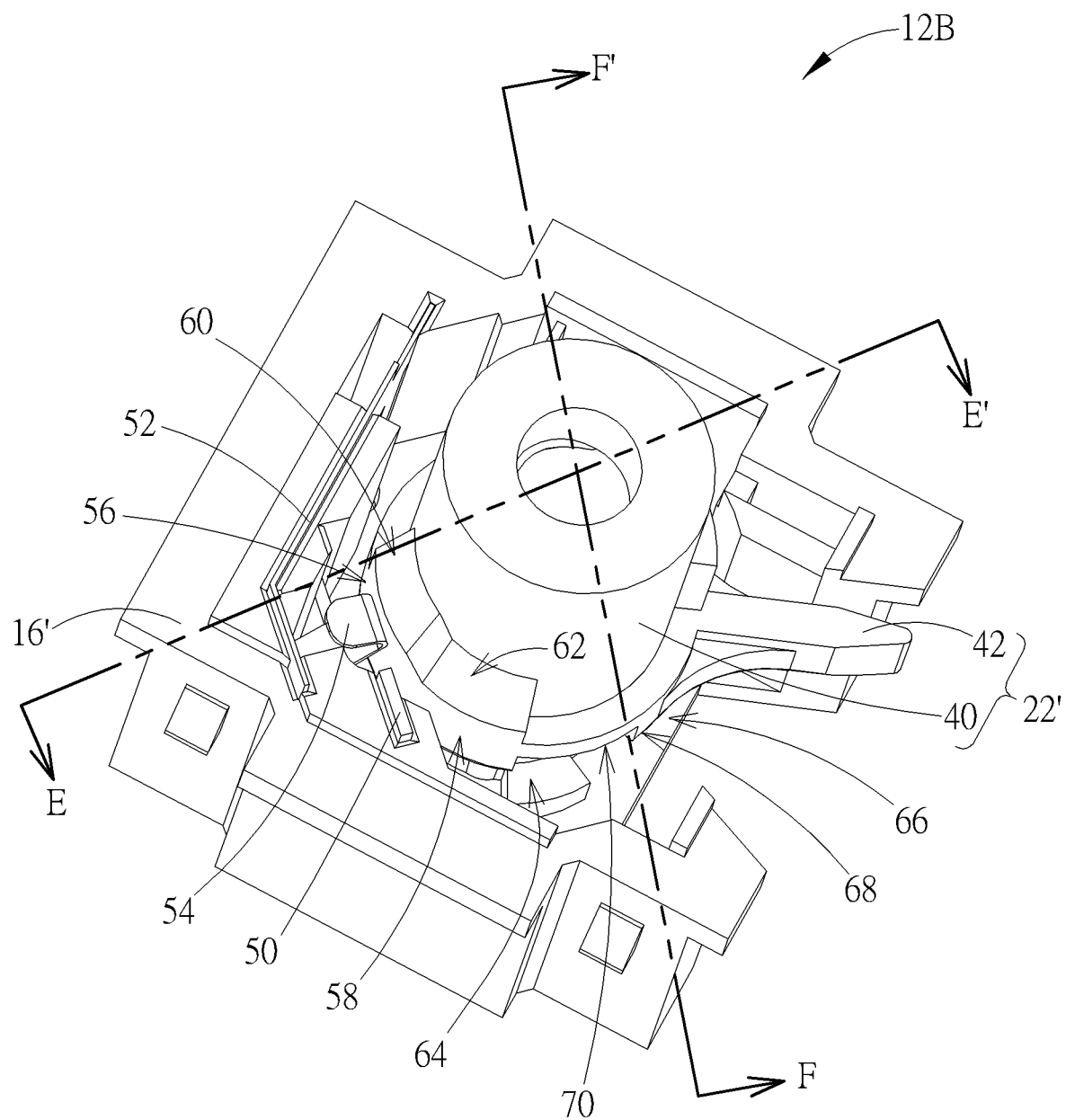
Figure 15:
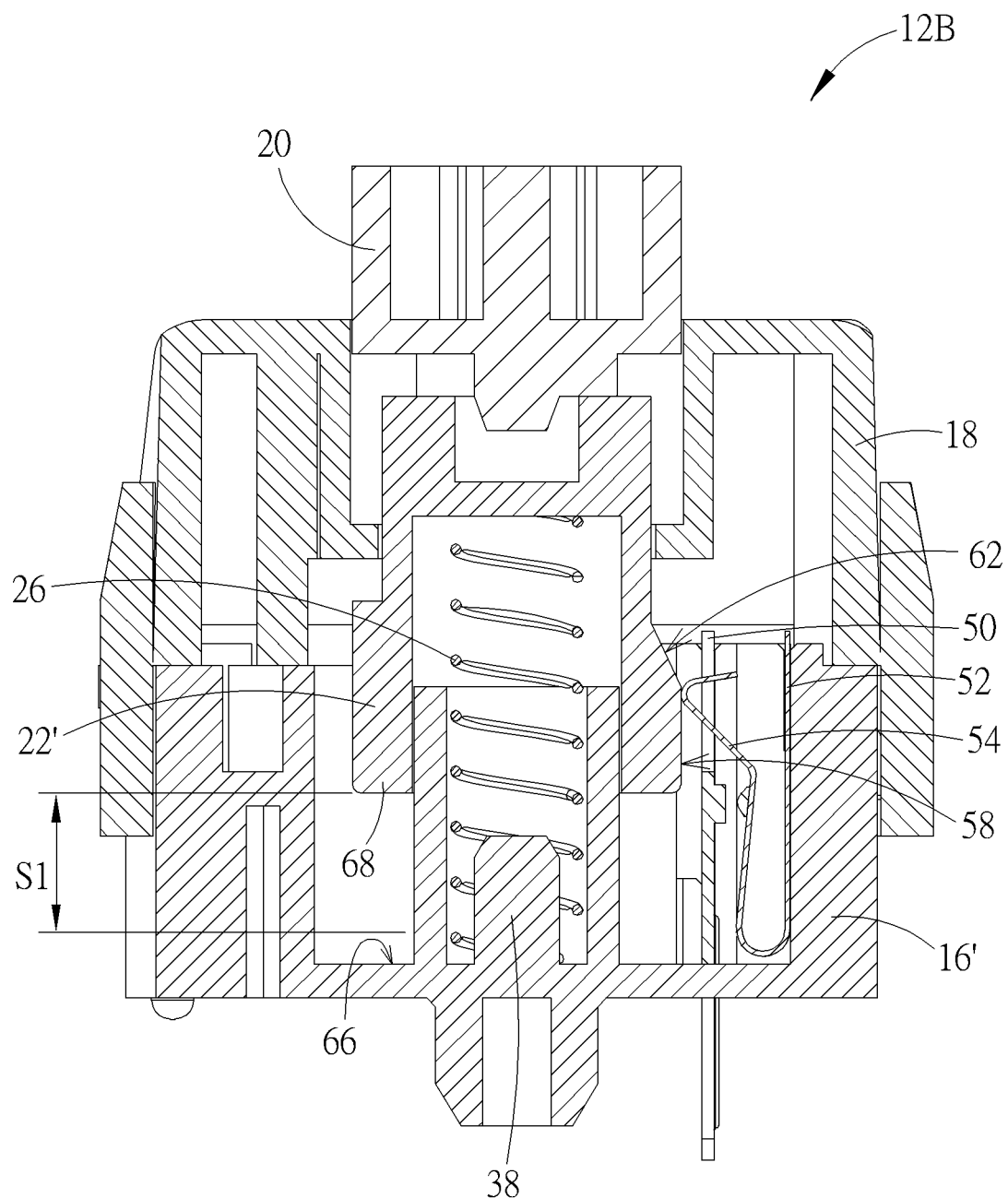
FIG. 15 is a sectional view of the keyswitch with the upper cover along line C-C' shown in FIG. 13.
Figure 16:
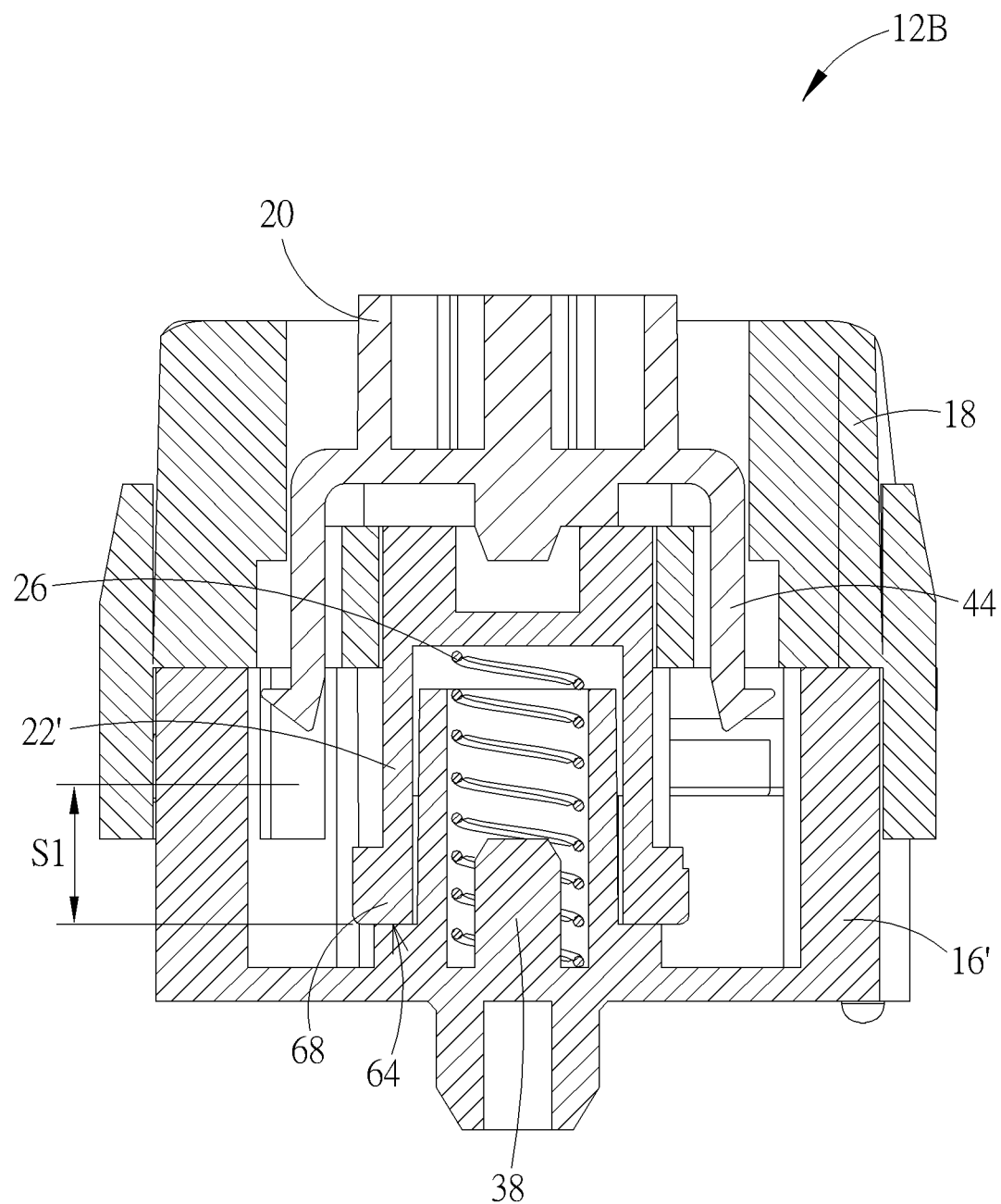
FIG. 16 is a sectional view of the keyswitch with the upper cover along line D-D' shown in FIG. 13.
Figure 17:
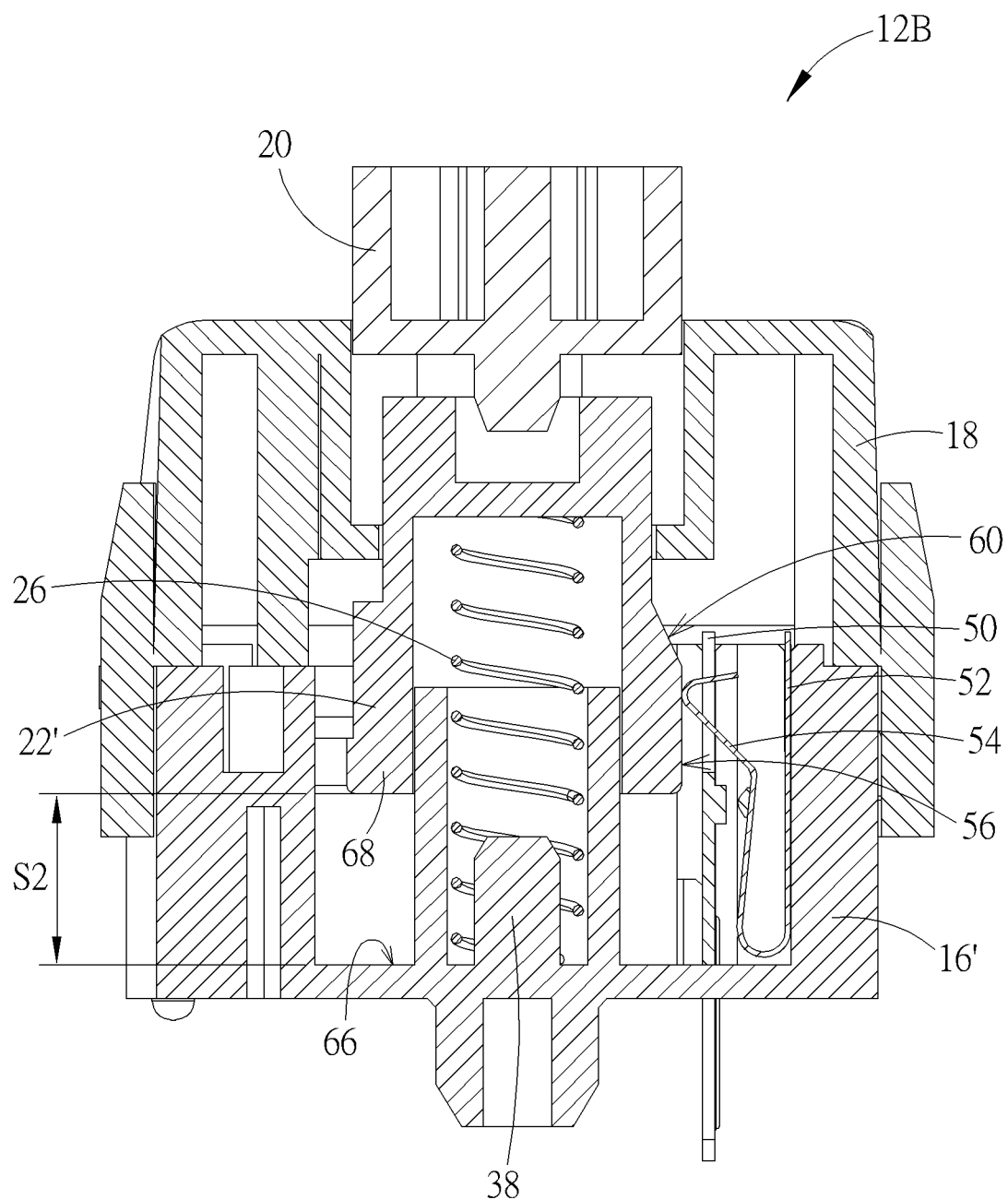
FIG. 17 is a sectional view of the keyswitch with the upper cover along line E-E' shown in FIG. 14.
Figure 18:
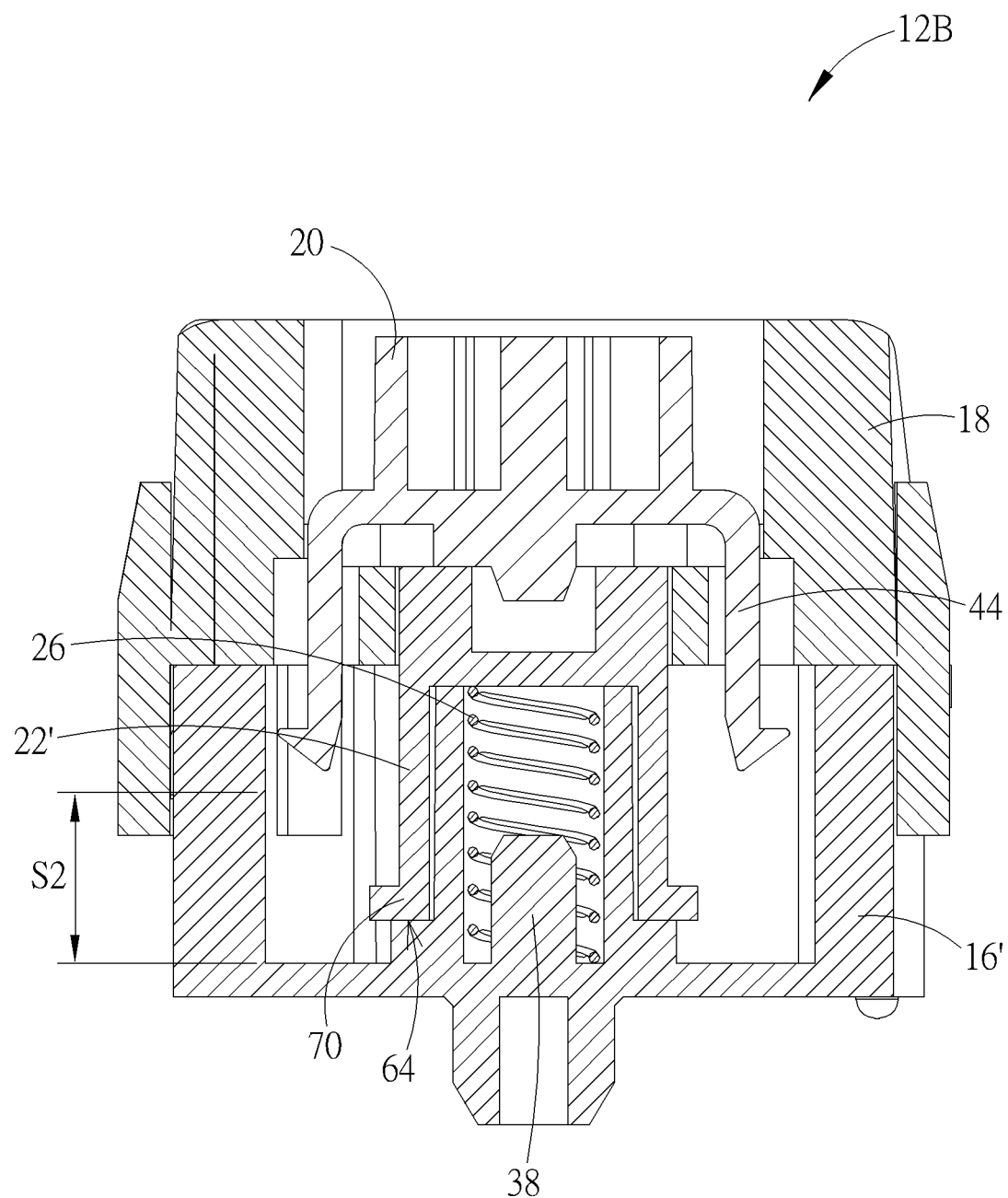
FIG. 18 is a sectional view of the keyswitch with the upper cover along line F-F' shown in FIG. 14.

Please refer to FIG. 11 to FIG. 18. FIG. 11 and FIG. 12 respectively are exploded diagrams of the keyswitch 12B in different views according to a second embodiment of the present invention. FIG. 13 and FIG. 14 respectively are diagrams of the keyswitch 12B without the upper cover 18 in different hand feeling modes according to the second embodiment of the present invention. FIG. 15 is a sectional view of the keyswitch 12B with the upper cover 18 along line C-C' shown in FIG. 13. FIG. 16 is a sectional view of the keyswitch 12B with the upper cover 18 along line D-D' shown in FIG. 13. FIG. 17 is a sectional view of the keyswitch 12B with the upper cover 18 along line E-E' shown in FIG. 14. FIG. 18 is a sectional view of the keyswitch 12B with the upper cover 18 along line F-F' shown in FIG. 14.

The keyswitch 12B includes the substrate 16', the upper cover 18, the upper sleeve component 20, the lower sleeve component 22', the keycap 24 and the recovering component 26. The substrate 16' is disposed on the bottom of the keyboard 10 or the printed circuit board. The upper cover 18 is disposed on the substrate 16'. The substrate 16' includes a first top surface 64 and a second top surface 66, and the first top surface 64 protrudes from the second top surface 66, so that the first top surface 64 is higher than the second top surface 66. The upper sleeve component 20 is disposed on the upper cover 18 in an upwardly and downwardly movable manner at the vertical direction. The lower sleeve component 22' is movably disposed between the substrate 16' and the upper cover 18, and the recovering component 26 is movably disposed between the substrate 16' and the lower sleeve component 22'. The lower sleeve component 22' includes a first bottom surface 68 and a second bottom surface 70, and the second bottom surface 70 is sunk in the first bottom surface 68, which means the first bottom surface 68 is lower than the second bottom surface 70. The recovering component 26 is used to upwardly push the lower sleeve component 20. The upper sleeve component 20 includes the keycap connecting portion 28, and the keycap connecting portion 28 can be assembled with the keycap 24.

The substrate 16' includes the constraining pillar 38. The lower sleeve component 22' includes the main body 40 and the pushing portion 42, the main body 40 is movably disposed on the constraining pillar 38, and the pushing portion 42 stretches from the surface of the main body 40 to be partly exposed out of the substrate 16'. Therefore, when the user manually presses the pushing portion 42 of each of the plurality of keyswitches 12, or utilizes the adjusting component 14 to simultaneously push the pushing portions 42 of the plurality of keyswitches 12, the main body 40 is guided by the pushing portion 42 and can be levelly rotated relative to the constraining pillar 38. Moreover, the upper sleeve component 20 further includes the sliding portion 44 movably disposed inside the sliding slot 46 formed on the upper cover 18. While the keycap 24 is pressed, the keycap 24 can be moved relative to the upper cover 18 via the sliding portion 44 upwardly and downwardly at the vertical direction; the sliding slot 46 further can be utilized to prevent the upper sleeve component 20 from being levelly rotated relative to the upper cover 18.

The substrate 16' further includes the electrode module 48, and the electrode module 48 includes the first electrode sheet 50 and the second electrode sheet 52. The first electrode sheet 50 is inserted into the bottom inside the substrate 16, and the second electrode sheet 52 is pasted on the inner wall of the substrate 16 and located between the first electrode sheet 50 and the lower sleeve component 22'. The second electrode sheet 52 includes the elastic portion 54 movably contacting against the lower sleeve component 22'. The lower sleeve component 22' can be interfered with the electrode module 48 while the lower sleeve component 22' is moved relative to the constraining pillar 38 of the substrate 16 vertically. That is, the elastic portion 54 of the second electrode sheet 52 can contact against and be separated from the first electrode sheet 50 in accordance with upward and downward motion of the lower sleeve component 22' for an aim of triggering the keyswitch 12B.

The lower sleeve component 22' further includes the first vertical lateral surface 56 and the second vertical lateral surface 58, and the shape of the first vertical lateral surface 56 is different form the shape of the second vertical lateral surface 58. The first vertical lateral surface 56 is connected to the first sectional inclined surface 60, the second vertical lateral surface 58 is connected to the second sectional inclined surface 62, and the distance between the first sectional inclined surface 60 and the bottom of the main body 40 is greater than the distance between the second sectional inclined surface 62 and the bottom of the main body 40, which means the first sectional inclined surface 60 can be higher than the second sectional inclined surface 62. While the elastic portion 54 of the second electrode sheet 52 contacts against the first vertical lateral surface 56 or the second vertical lateral surface 58, the second electrode sheet 52 is not electrified by the first electrode sheet 50; while the elastic portion 54 contacts against the first sectional inclined surface 60 or the second sectional inclined surface 62, the second electrode sheet 52 and the first electrode sheet 50 are electrified.

The lower sleeve component 22' can be levelly rotated relative to the constraining pillar 38 of the substrate 16, so as to switch between the first angle position shown in FIG. 13 and the second angle position shown in FIG. 14. When the lower sleeve component 22' is set in the first angle position, the second bottom surface 70 of the lower sleeve component 22' does not align with the first top surface 64 of the substrate 16'; if the keyswitch 12B is pressed, the lower sleeve component 22' can be moved downward until the first bottom surface 68 abuts the first top surface 64, the elastic portion 54 is moved from the second vertical lateral surface 58 to the second sectional inclined surface 62, and the electrode module 48 is electrified to trigger the keyswitch, as shown in FIG. 15 and FIG. 16, and upward and downward motion of the lower sleeve component 22' has a first travel distance S1. When the lower sleeve component 22' is set in the second angle position, the second bottom surface 70 of the lower sleeve component 22' aligns with the first top surface 64 of the substrate 16', and the first bottom surface 68 aligns with the second top surface 66; when the keyswitch 12B is pressed, the lower sleeve component 22' is moved downwardly and downward motion is stopped until the first bottom surface 68 abuts the second top surface 66 and the second bottom surface 70 abuts the first top surface 64, the elastic portion 54 can be moved from the first vertical lateral surface 56 to the first sectional inclined surface 60, the electrode module 48 is electrified to trigger the keyswitch, as shown in FIG. 17 and FIG. 18, upward and downward motion of the lower sleeve component 22' has a second travel distance S2, and the second travel distance S2 is greater than the first travel distance S1.

The keyswitch 12B of the second embodiment disposes the first top surface 64 and the second top surface 66 with stage variation on the substrate 16', and disposes the first bottom surface 68 and the second bottom surface 70 on the lower sleeve component 22'. While the lower sleeve component 22' is switched between the first angle position and the second angle position, the gap between the lower sleeve component 22' and the upper sleeve component 20 is not changed, and the lower sleeve component 22' may only contact against the first top surface 64 or simultaneously contact against the first top surface 64 and the second top surface 66 when the lower sleeve component 22' is moved downwardly. Therefore, the second embodiment can adjust a possible pressing depth or the pressing travel distance of the keyswitch 12B by rotation of the lower sleeve component 22'.

Figure 19:
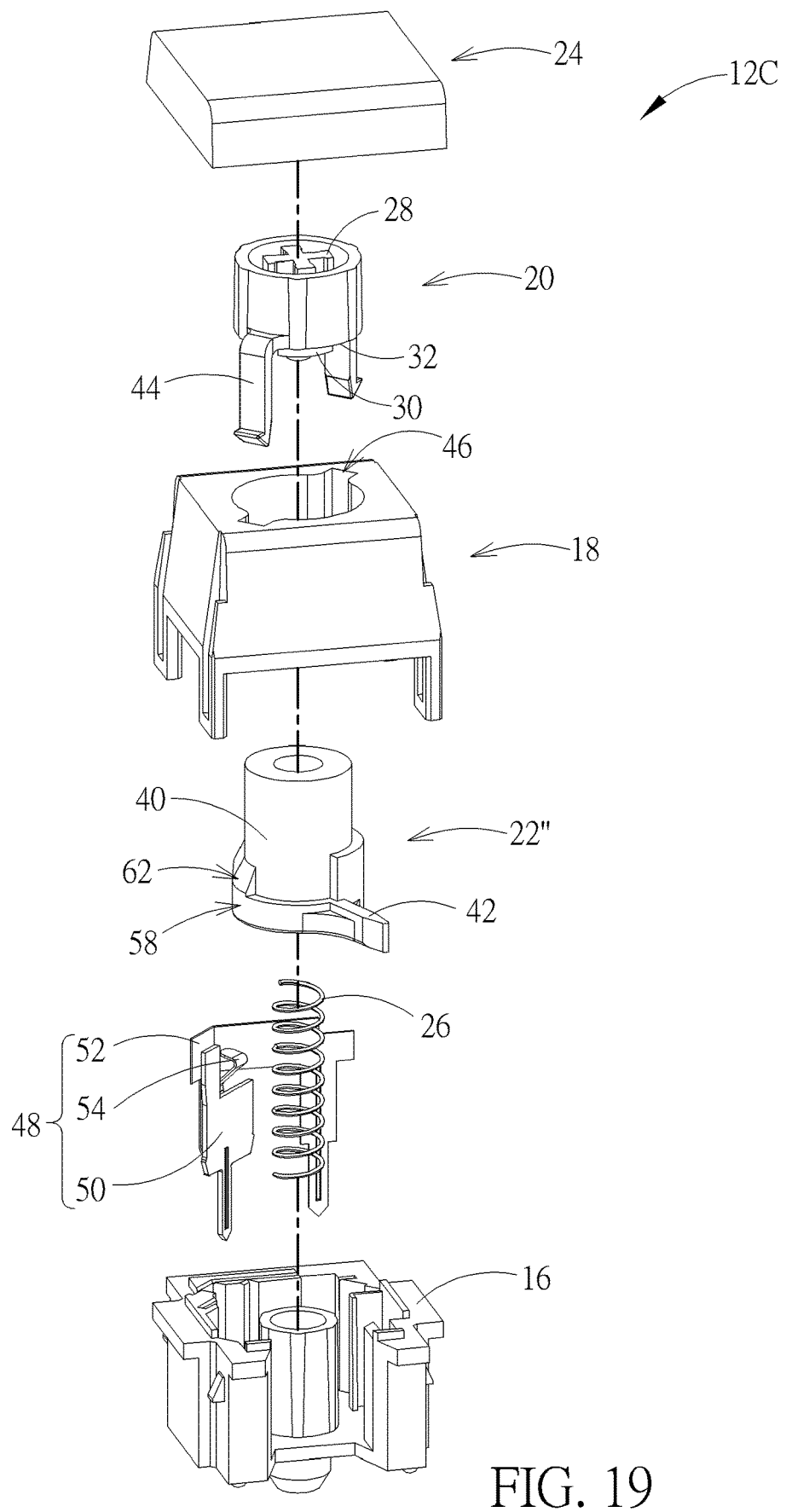
FIG. 19 and FIG. 20 respectively are exploded diagrams of the keyswitch in different views according to a third embodiment of the present invention.
Figure 20:
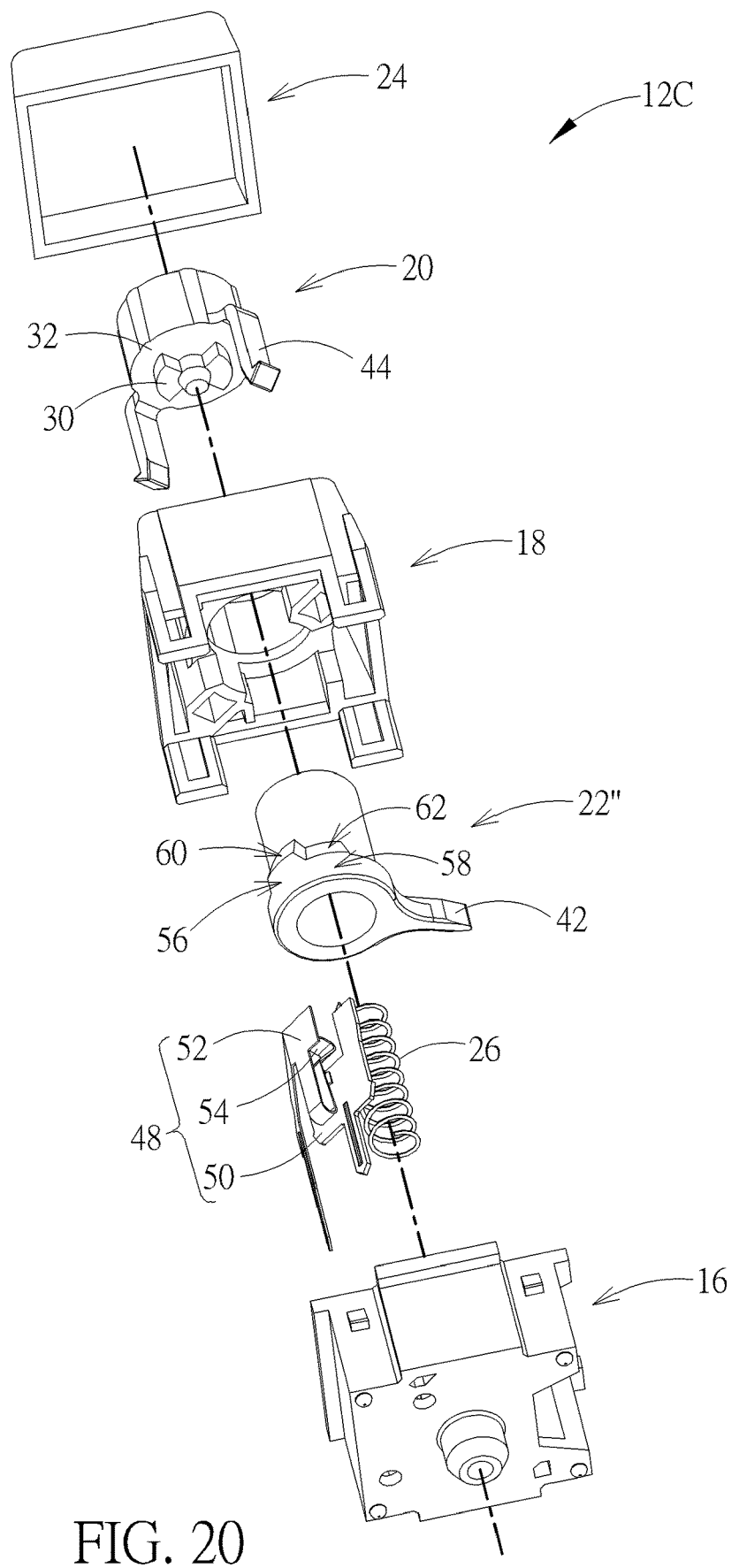
Figure 21:
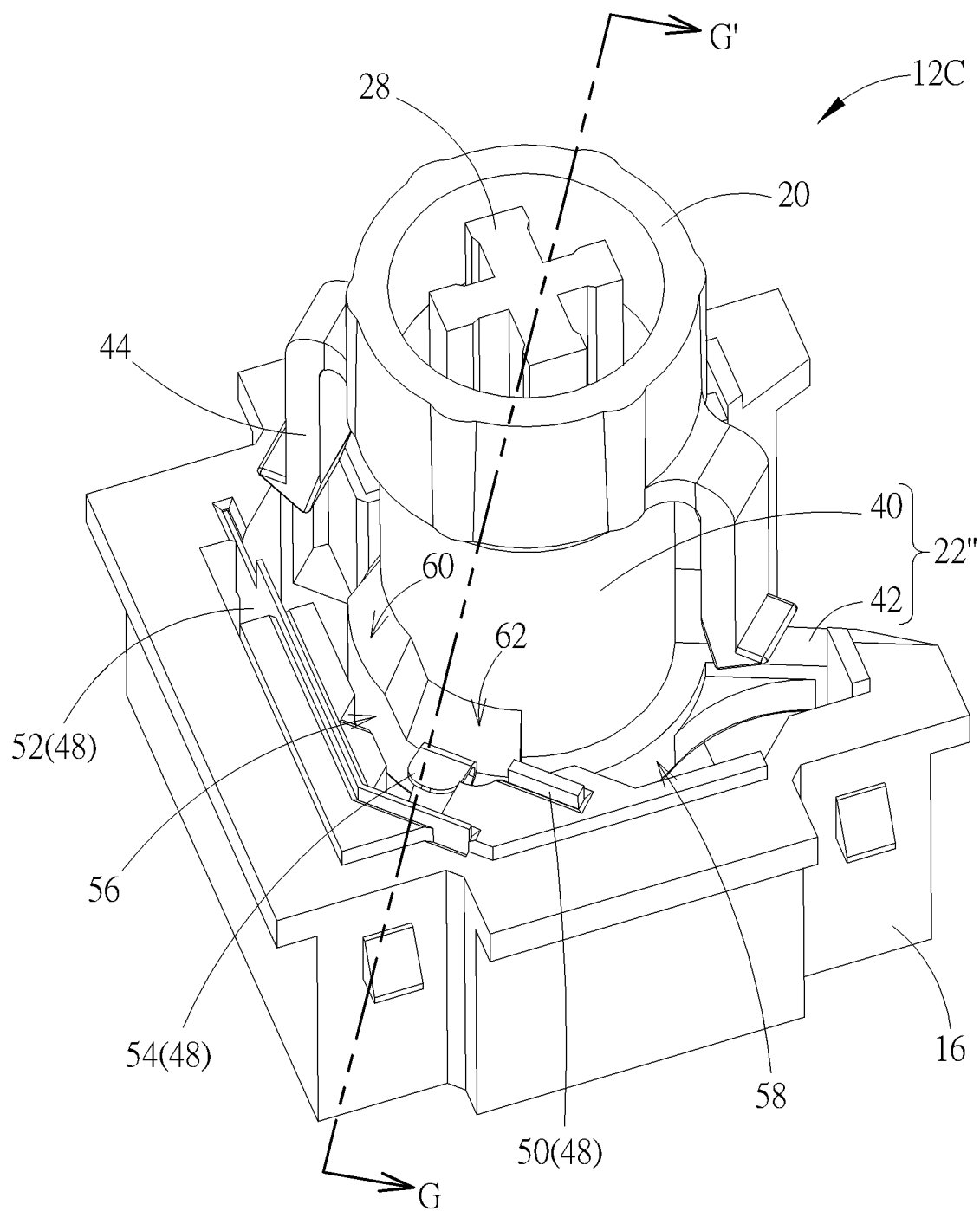
FIG. 21 and FIG. 22 respectively are diagrams of the keyswitch without the upper cover in different hand feeling modes according to the third embodiment of the present invention.
Figure 22:
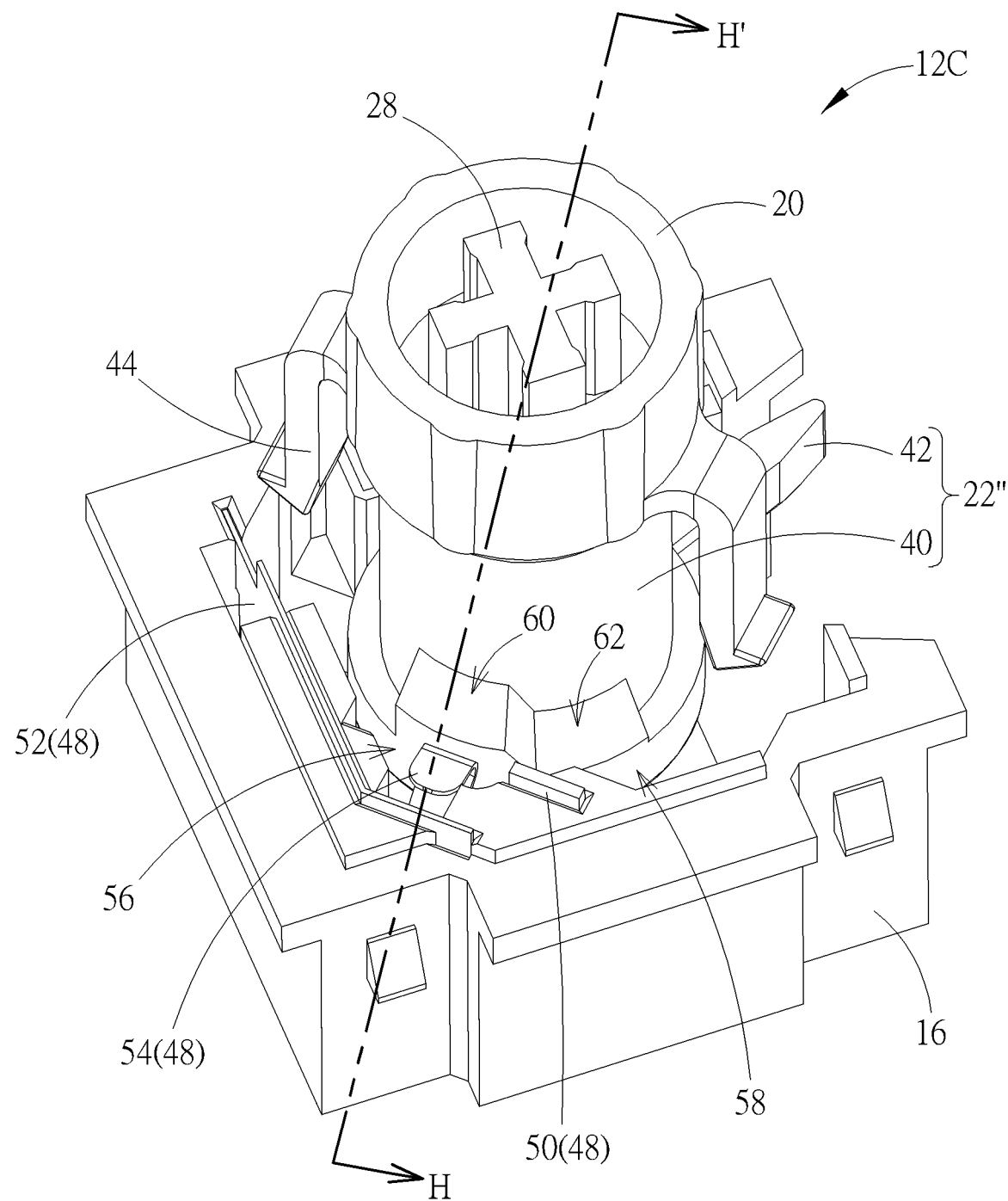
Figure 23:
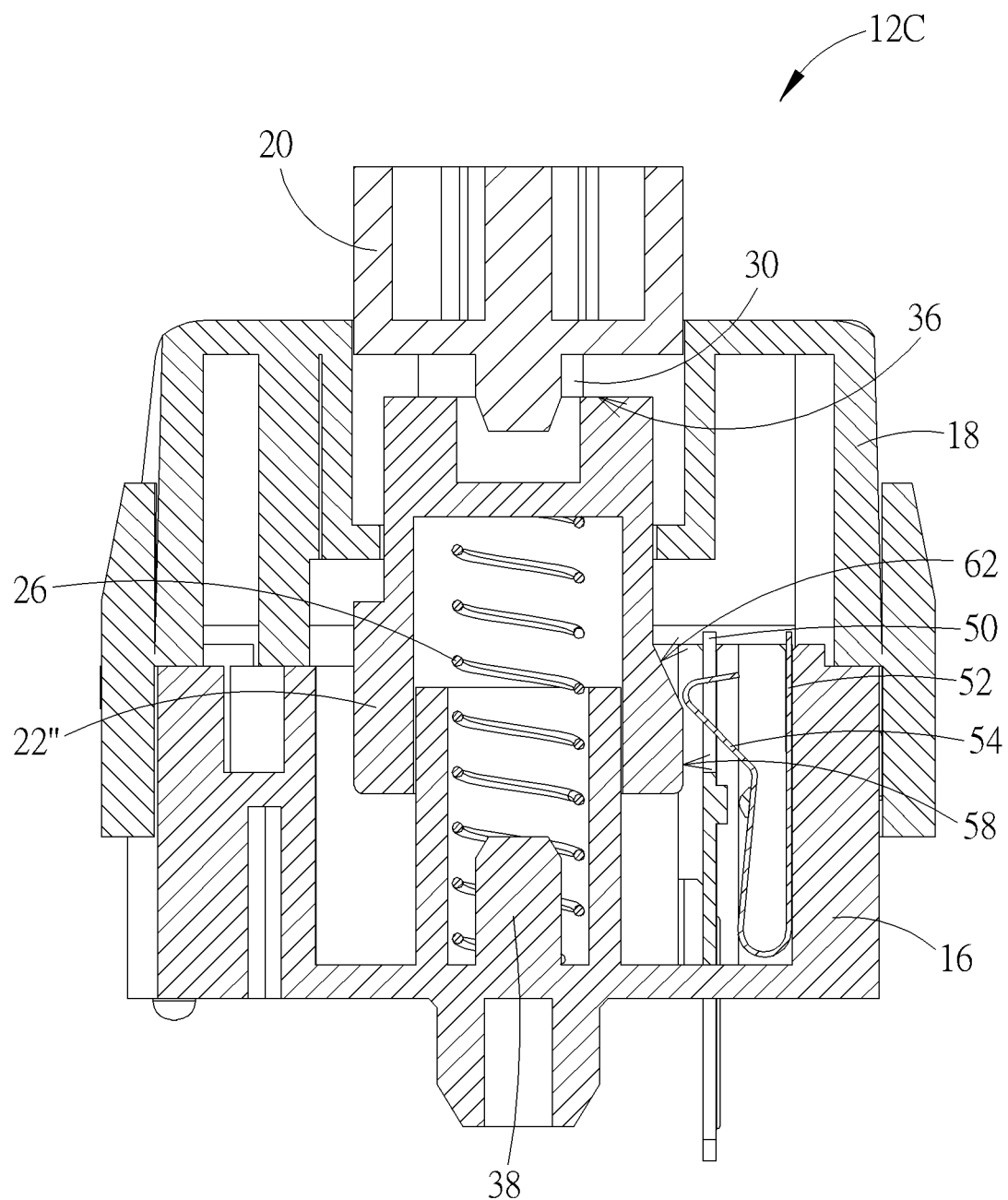
FIG. 23 is a sectional view of the keyswitch with the upper cover along line G-G' shown in FIG. 21.
Figure 24:
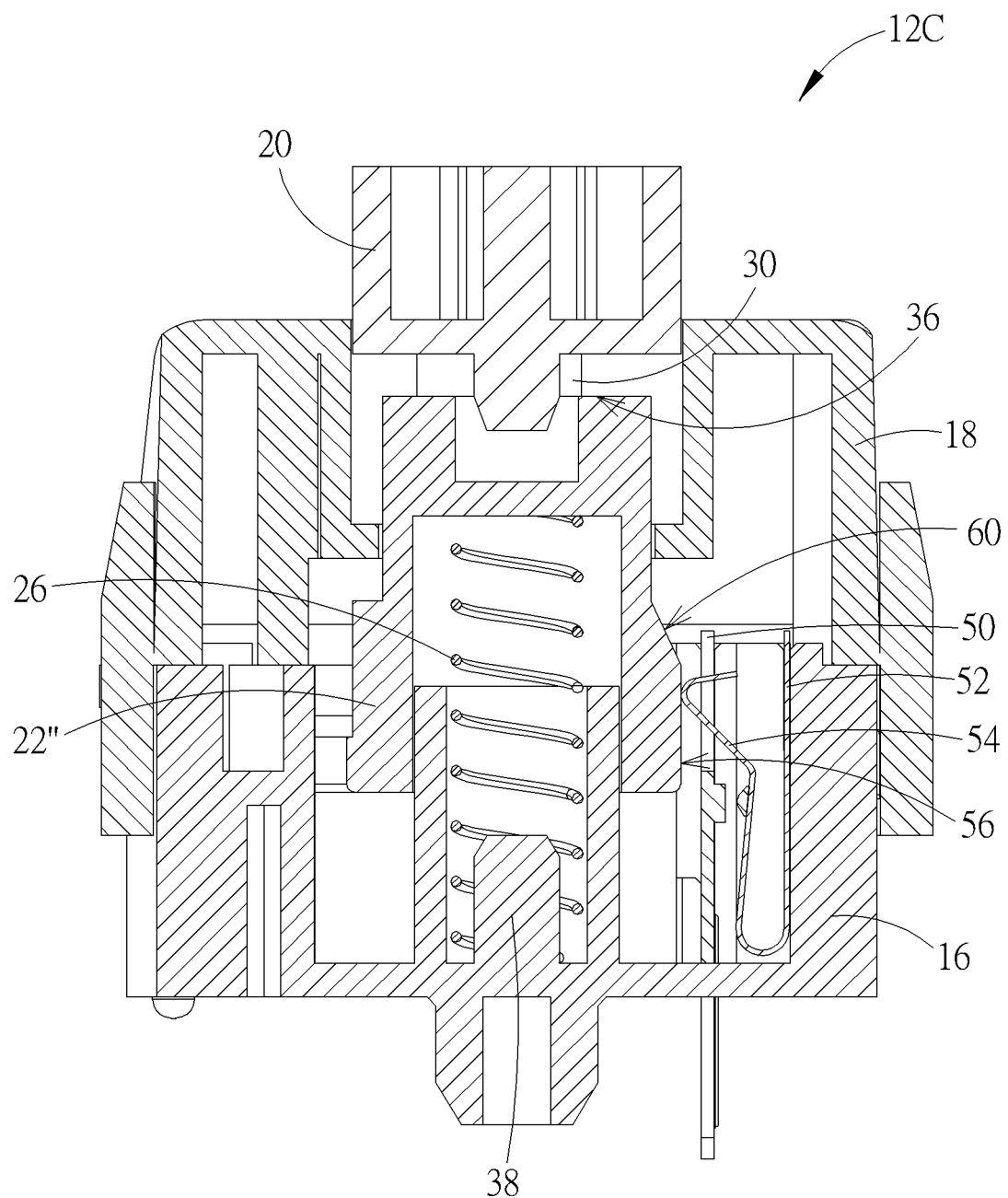
FIG. 24 is a sectional view of the keyswitch with the upper cover along line H-H' shown in FIG. 22.

Please refer to FIG. 19 to FIG. 24. FIG. 19 and FIG. 20 respectively are exploded diagrams of the keyswitch 12C in different views according to a third embodiment of the present invention. FIG. 21 and FIG. 22 respectively are diagrams of the keyswitch 12C without the upper cover 18 in different hand feeling modes according to the third embodiment of the present invention. FIG. 23 is a sectional view of the keyswitch 12C with the upper cover 18 along line G-G' shown in FIG. 21. FIG. 24 is a sectional view of the keyswitch 12C with the upper cover 18 along line H-H' shown in FIG. 22.

The keyswitch 12C includes the substrate 16, the upper cover 18, the upper sleeve component 20, the lower sleeve component 22", the keycap 24 and the recovering component 26. The substrate 16 is disposed on the bottom of the keyboard 10 or the printed circuit board. The upper cover 18 is disposed on the substrate 16. The upper sleeve component 20 is disposed on the upper cover 18 in an upwardly and downwardly movable manner at the vertical direction. The lower sleeve component 22" is movably disposed between the substrate 16 and the upper cover 18, and the recovering component 26 is disposed between the substrate 16 and the lower sleeve component 22". The recovering component 26 is used to move the lower sleeve component 20 upwardly. The upper sleeve component 20 includes the keycap connecting portion 28, the first bottom surface 30 and the second bottom surface 32. The keycap connecting portion 28 can be assembled with the keycap 24. The first bottom surface 30 is lower than the second bottom surface 32, which means the first bottom surface 30 can protrude from the second bottom surface 32; however, the first bottom surface 30 and the second bottom surface 32 are optional design, the upper sleeve component 20 may have no bottom surfaces with stage variation, and can directly utilize the same flat surface to contact against the top of the lower sleeve component 22".

The substrate 16 includes the constraining pillar 38. The lower sleeve component 22" includes the main body 40 and the pushing portion 42. The main body 40 is movably disposed on the constraining pillar 38, and the pushing portion 42 stretches from the surface of the main body 40 to be partly exposed out of the substrate 16. Therefore, when the user manually presses the pushing portion 42 of each of the plurality of keyswitches 12, or utilizes the adjusting component 14 to simultaneously push the pushing portions 42 of the plurality of keyswitches 12, the main body 40 is guided by the pushing portion 42 and can be levelly rotated relative to the constraining pillar 38. Besides, the upper sleeve component 20 further includes the sliding portion 44 movably disposed inside the sliding slot 46 formed on the upper cover 18. While the keycap 24 is pressed, the keycap 24 can be moved relative to the upper cover 18 via the sliding portion 44 in an upwardly and downwardly movable manner at the vertical direction; the sliding slot 46 further can be used to prevent the upper sleeve component 20 from being levelly rotated relative to the upper cover 18.

The substrate 16 further includes the electrode module 48, and the electrode module 48 includes the first electrode sheet 50 and the second electrode sheet 52. The first electrode sheet 50 is inserted into the bottom inside the substrate 16, and the second electrode sheet 52 is pasted on the inner wall of the substrate 16 and located between the first electrode sheet 50 and the lower sleeve component 22". The second electrode sheet 52 includes the elastic portion 54 movably contacting against the lower sleeve component 22". The lower sleeve component 22" can be interfered with the electrode module 48 while the lower sleeve component 22" is moved relative to the constraining pillar 38 of the substrate 16 vertically. Thus, the elastic portion 54 of the second electrode sheet 52 can contact against and be separated from the first electrode sheet 50 in accordance with upward and downward motion of the lower sleeve component 22" for triggering the keyswitch 12C.

The lower sleeve component 22" further includes the first vertical lateral surface 56 and the second vertical lateral surface 58, and the shape of the first vertical lateral surface 56 is different form the shape of the second vertical lateral surface 58. The first vertical lateral surface 56 is connected to the first sectional inclined surface 60, the second vertical lateral surface 58 is connected to the second sectional inclined surface 62, and the distance between the first sectional inclined surface 60 and the bottom of the main body 40 is greater than the distance between the second sectional inclined surface 62 and the bottom of the main body 40, which means the first sectional inclined surface 60 can be higher than the second sectional inclined surface 62. While the elastic portion 54 of the second electrode sheet 52 contacts against the first vertical lateral surface 56 or the second vertical lateral surface 58, the second electrode sheet 52 is not electrified by the first electrode sheet 50; while the elastic portion 54 contacts against the first sectional inclined surface 60 or the second sectional inclined surface 62, the second electrode sheet 52 and the first electrode sheet 50 are electrified.

The lower sleeve component 22" can be levelly rotated relative to the constraining pillar 38 of the substrate 16, so as to switch between the first angle position shown in FIG. 22 and the second angle position shown in FIG. 21. When the lower sleeve component 22" is set in the first angle position, the keyswitch 12C is manually pressed, the elastic portion 54 is moved from the first vertical lateral surface 56 to the first sectional inclined surface 60, and the electrode module 48 is electrified to trigger the keyswitch 12C, as shown in FIG. 24. When the lower sleeve component 22" is set in the second angle position, the keyswitch 12C is manually pressed, and the elastic portion 54 is moved from the second vertical lateral surface 58 to the second sectional inclined surface 62, so that the electrode module 48 is electrified to trigger the keyswitch 12C, as shown in FIG. 23. In the third embodiment, the keyswitch 12C has the identical pressing depth travel distance while being switched to the first angle position and the second angle position, rotation of the lower sleeve component 22" does not affect the required actuation force quantity of the recovering component 26. However, the outer surface of the lower sleeve component 22" has the inclined surfaces with stage difference, the elastic portion 54 in the first angle position is electrified by the electrode module 48 while the lower sleeve component 22" is moved deeper (such as a lower position), the user may press the keyswitch 12C to a lowest position for outputting the control signal; the elastic portion 54 in the second angle position can be electrified by the electrode module 48 while the lower sleeve component 22" is moved in the shallow (such as a higher position), the user can press the keyswitch 12C to a middle position for outputting the control signal, and the middle position is higher than the lowest position.

Figure 25:
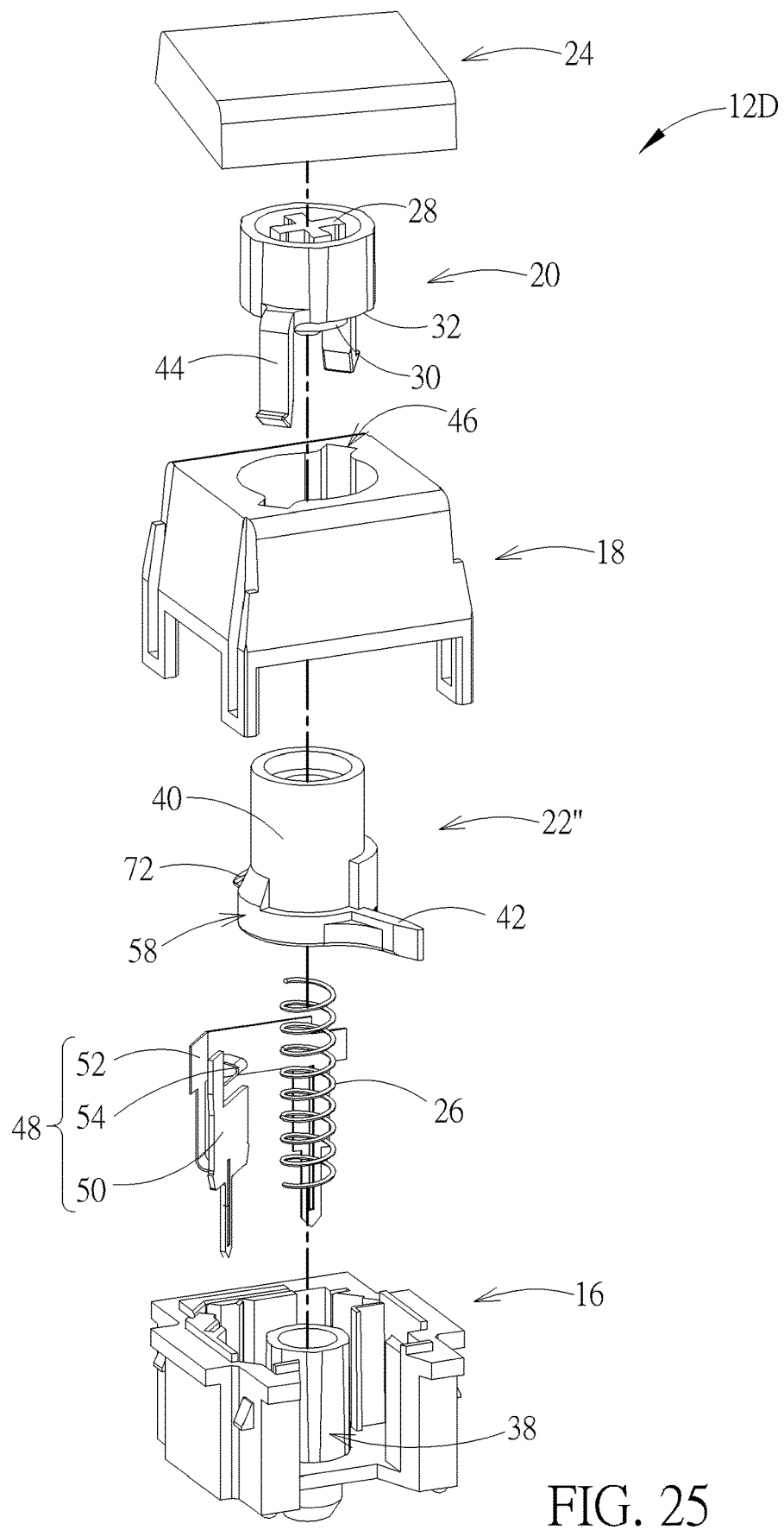
FIG. 25 is an exploded diagram of the keyswitch according to a fourth embodiment of the present invention.
Figure 26:
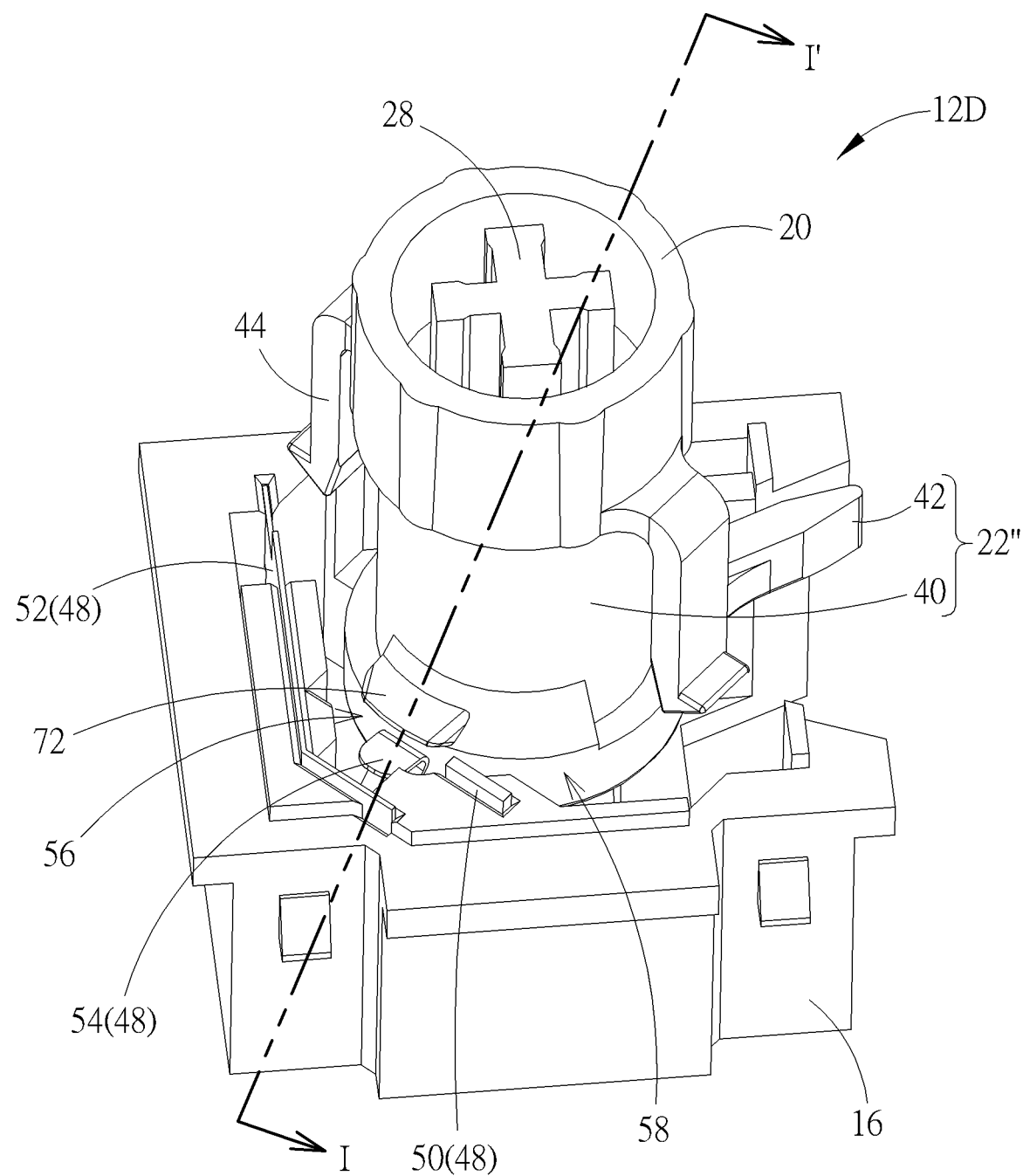
FIG. 26 and FIG. 27 respectively are diagrams of the keyswitch without the upper cover in different hand feeling modes according to the fourth embodiment of the present invention.
Figure 27:
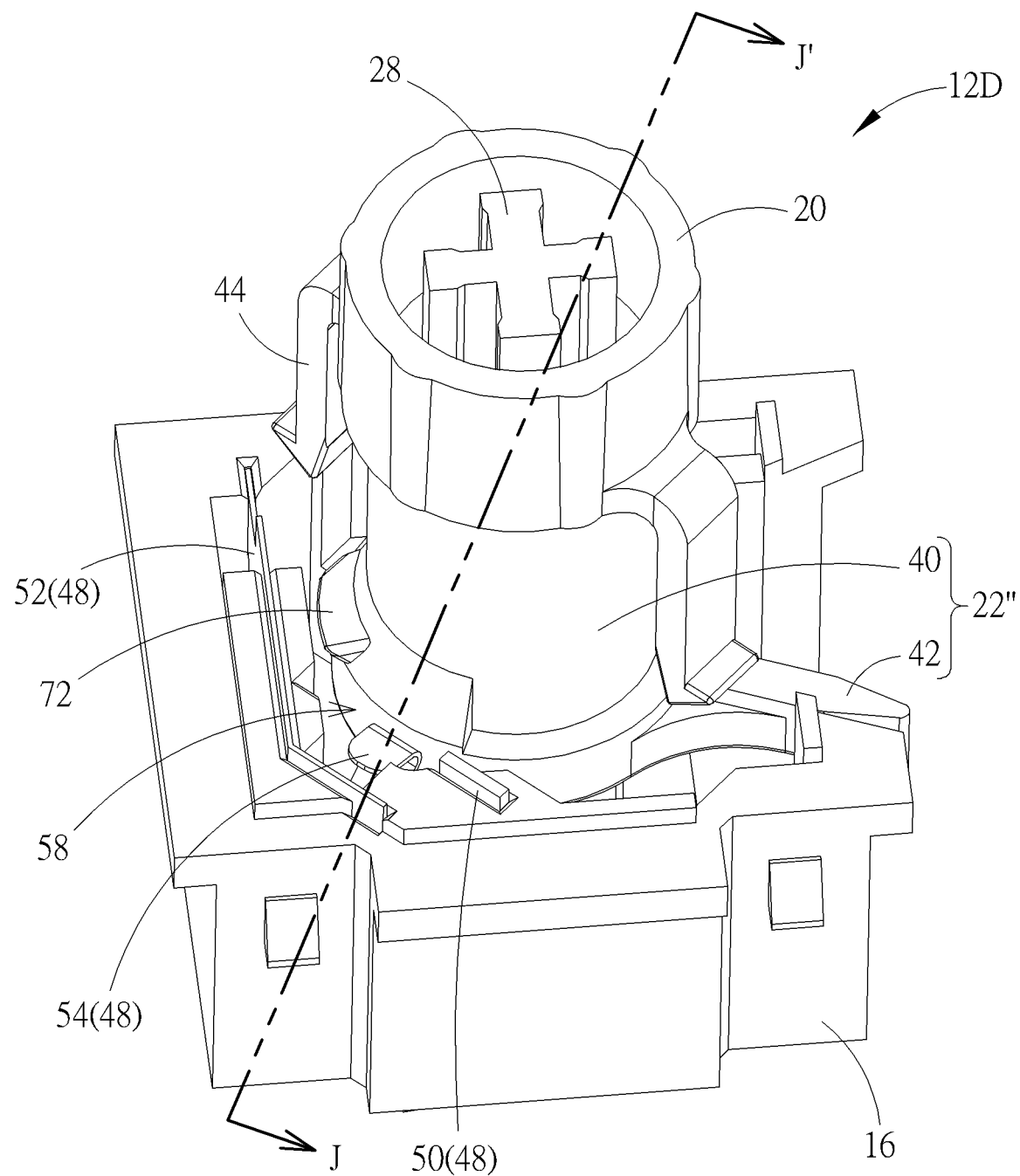
Figure 28:
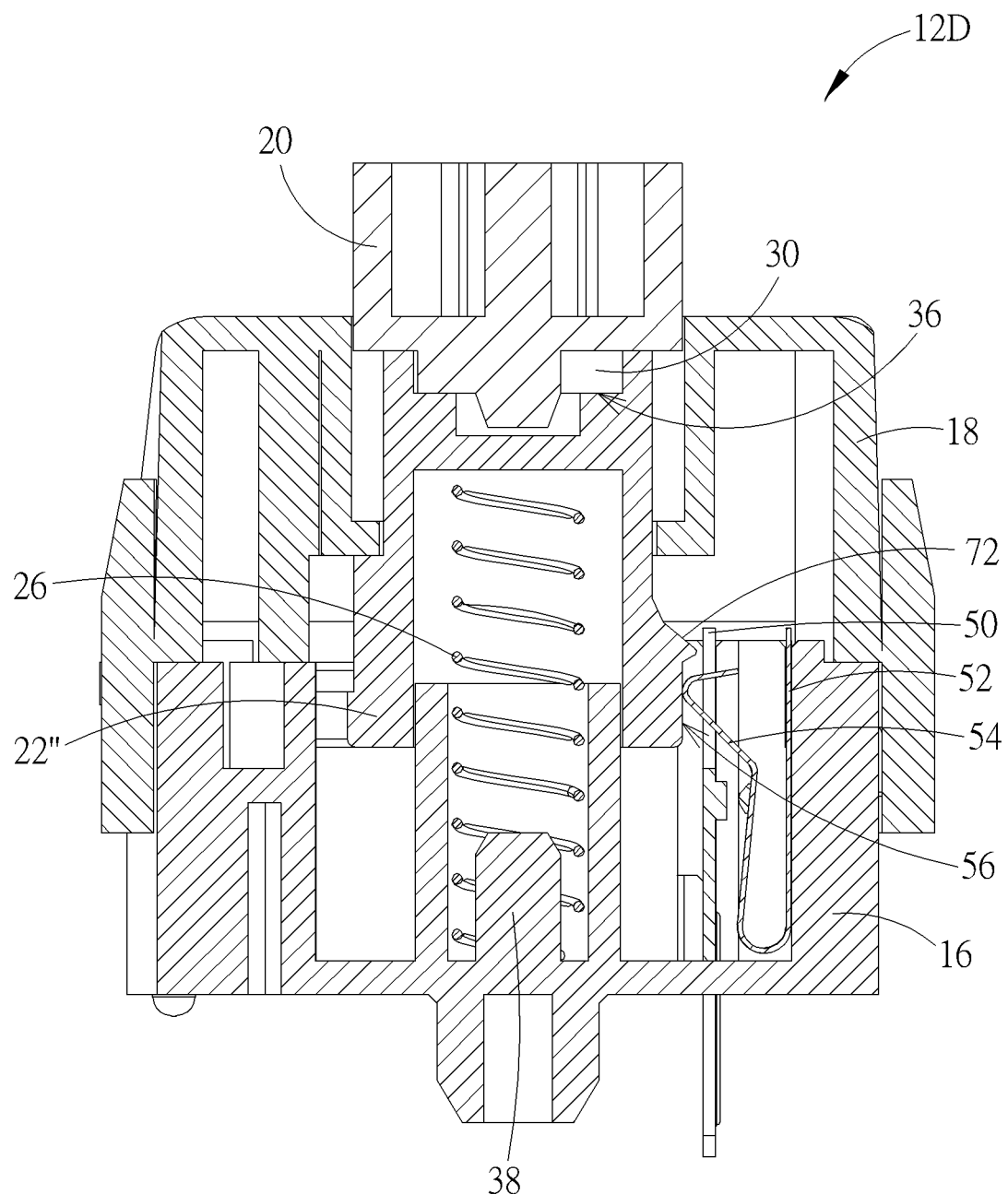
FIG. 28 is a sectional view of the keyswitch with the upper cover along line I-I' shown in FIG. 26.
Figure 29:
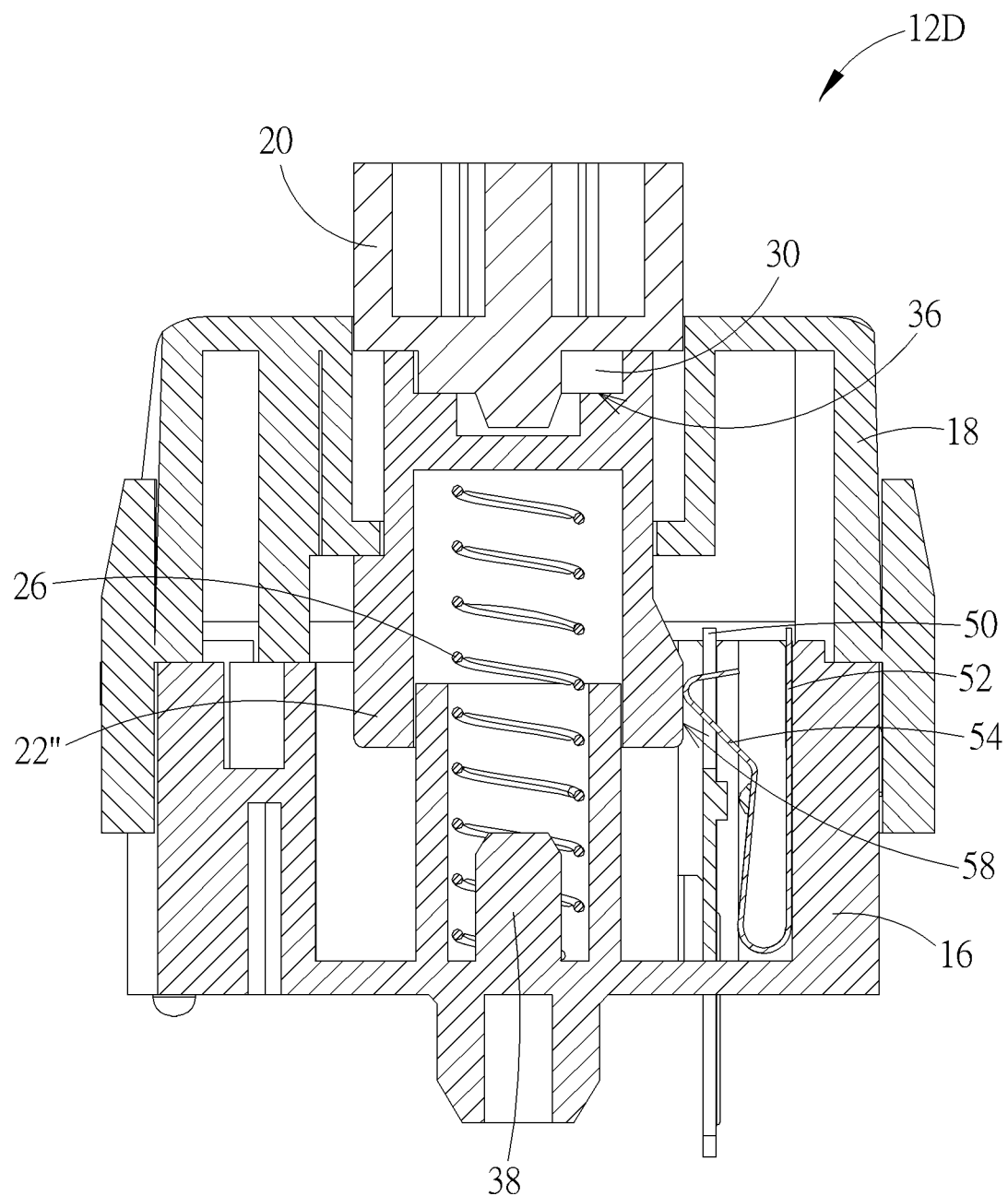
FIG. 29 is a sectional view of the keyswitch with the upper cover along line J-J' shown in FIG. 27.

Please refer to FIG. 25 to FIG. 29. FIG. 25 is an exploded diagram of the keyswitch 12D according to a fourth embodiment of the present invention. FIG. 26 and FIG. 27 respectively are diagrams of the keyswitch 12D without the upper cover 18 in different hand feeling modes according to the fourth embodiment of the present invention. FIG. 28 is a sectional view of the keyswitch 12D with the upper cover 18 along line I-I' shown in FIG. 26. FIG. 29 is a sectional view of the keyswitch 12D with the upper cover 18 along line J-J' shown in FIG. 27.

The keyswitch 12D includes the substrate 16, the upper cover 18, the upper sleeve component 20, the lower sleeve component 22", the keycap 24 and the recovering component 26. The substrate 16 is disposed on the bottom of the keyboard 10 or the printed circuit board. The upper cover 18 is disposed on the substrate 16. The upper sleeve component 20 is disposed on the upper cover 18 in an upwardly and downwardly movable manner at the vertical direction. The lower sleeve component 22" is movably disposed between the substrate 16 and the upper cover 18, and the recovering component 26 is disposed between the substrate 16 and the lower sleeve component 22". The recovering component 26 is used to push the lower sleeve component 20 upwardly. The upper sleeve component 20 includes the keycap connecting portion 28, and the keycap connecting portion 28 can be assembled with the keycap 24.

The substrate 16 includes the constraining pillar 38. The lower sleeve component 22" includes the main body 40 and the pushing portion 42, the main body 40 is movably disposed on the constraining pillar 38, and the pushing portion 42 stretches from the surface of the main body 40 to be partly exposed out of the substrate 16. Therefore, when the user manually presses the pushing portion 42 of each of the plurality of keyswitches 12, or utilizes the adjusting component 14 to simultaneously push the pushing portions 42 of the plurality of keyswitches 12, the main body 40 is guided by the pushing portion 42 and can be levelly rotated relative to the constraining pillar 38. Furthermore, the upper sleeve component 20 may include the sliding portion 44 movably disposed inside the sliding slot 46 formed on the upper cover 18. While the keycap 24 is pressed, the keycap 24 can be moved relative to the upper cover 18 via the sliding portion 44 upwardly and downwardly at the vertical direction; the sliding slot 46 further can be used to prevent the upper sleeve component 20 from being levelly rotated relative to the upper cover 18.

The substrate 16 further includes the electrode module 48, and the electrode module 48 includes the first electrode sheet 50 and the second electrode sheet 52. The first electrode sheet 50 is inserted into the bottom inside the substrate 16, and the second electrode sheet 52 is pasted on the inner wall of the substrate 16 and located between the first electrode sheet 50 and the lower sleeve component 22". The second electrode sheet 52 includes the elastic portion 54 movably contacting against the lower sleeve component 22". The lower sleeve component 22" can be interfered with the electrode module 48 while the lower sleeve component 22" is moved relative to the constraining pillar 38 of the substrate 16 upwardly and downwardly. The elastic portion 54 of the second electrode sheet 52 can contact against and be separated from the first electrode sheet 50 in accordance with upward and downward motion of the lower sleeve component 22 for triggering the keyswitch 12D.

The lower sleeve component 22" further includes the first vertical lateral surface 56 and the second vertical lateral surface 58, and the shape of the first vertical lateral surface 56 is different form the shape of the second vertical lateral surface 58. The first vertical lateral surface 56 has a resistance protrusion 72, and the second vertical lateral surface 58 is a flat surface. The lower sleeve component 22" can be rotated relative to the constraining pillar 38 of the substrate 16 levelly at the right direction and the left direction, so as to switch between the first angle position shown in FIG. 26 and the second angle position shown in FIG. 27. While the lower sleeve component 22" is set in the first angle position, the keyswitch 12D is pressed, the lower sleeve component 22" is moved vertically along the constraining pillar 38, the elastic portion 54 can be slid on the first vertical lateral surface 56 to move across the resistance protrusion 72 for electrifying the electrode module 48, as shown in FIG. 28, which means function between the electrode module 48 and the resistance protrusion 72 can generate the tactile feedback similar to collapse of the rubber dome or the metal dome. While the lower sleeve component 22" is set in the second angle position, the keyswitch 12D is pressed to vertically move the lower sleeve component 22" along the constraining pillar 38, the elastic portion 54 is slide on the flat second vertical lateral surface 58 smoothly, as shown in FIG. 29, so that the elastic portion 54 being electrified by the electrode module 48 does not generate the tactile feedback.

Figure 30:
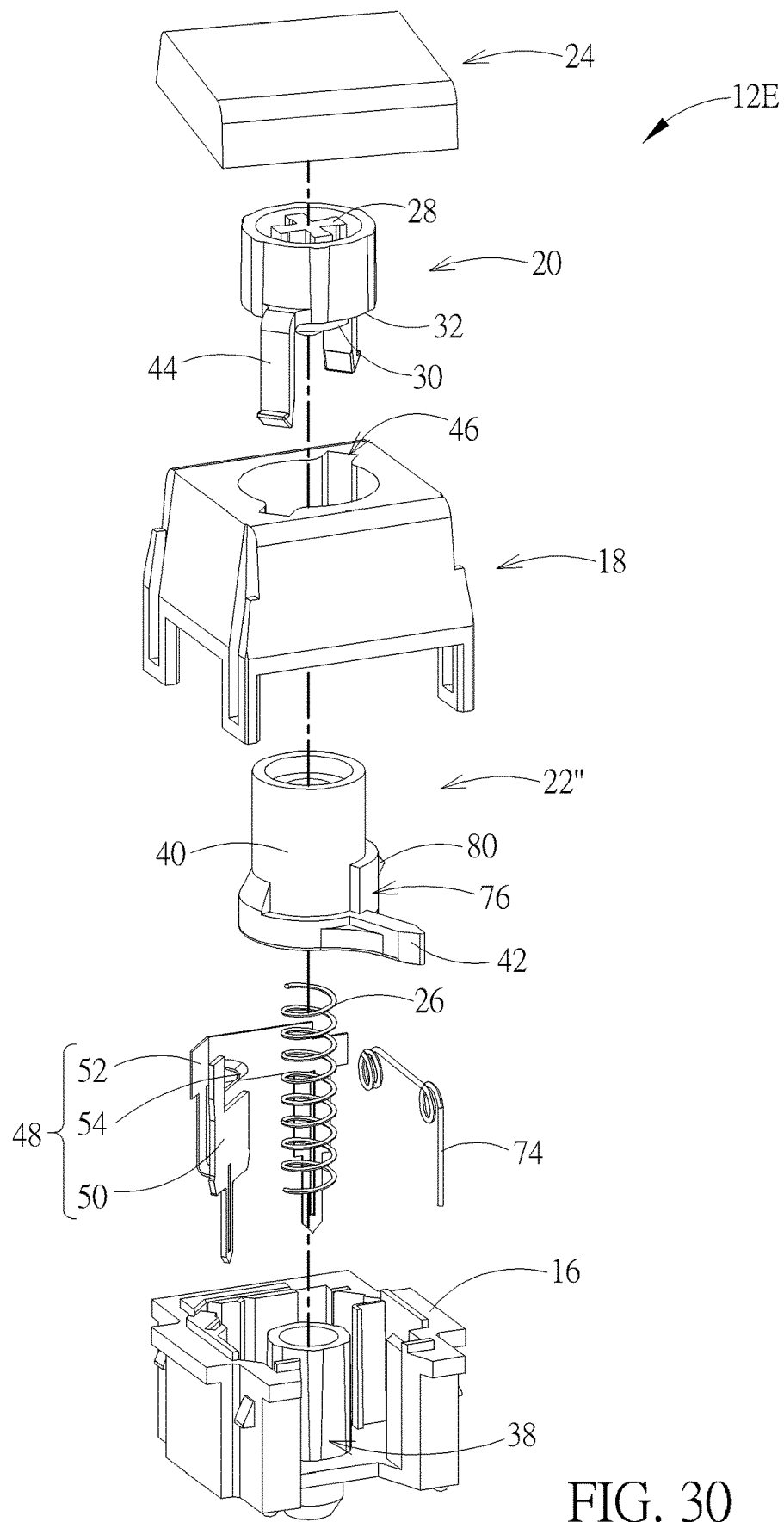
FIG. 30 is an exploded diagram of the keyswitch according to a fifth embodiment of the present invention.
Figure 31:
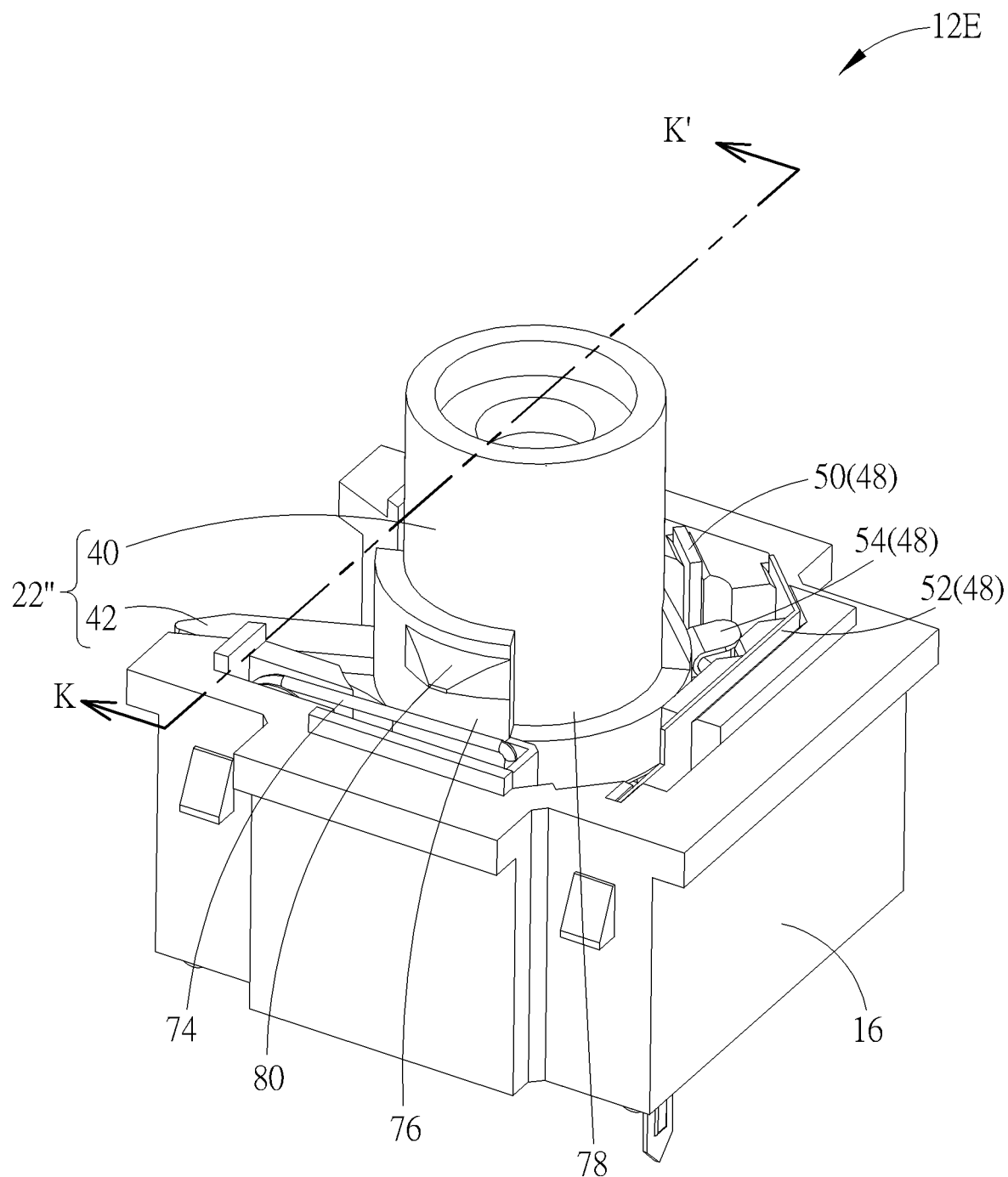
FIG. 31 and FIG. 32 respectively are diagrams of the keyswitch without the upper cover and the upper sleeve component in different hand feeling modes according to the fifth embodiment of the present invention.
Figure 32:
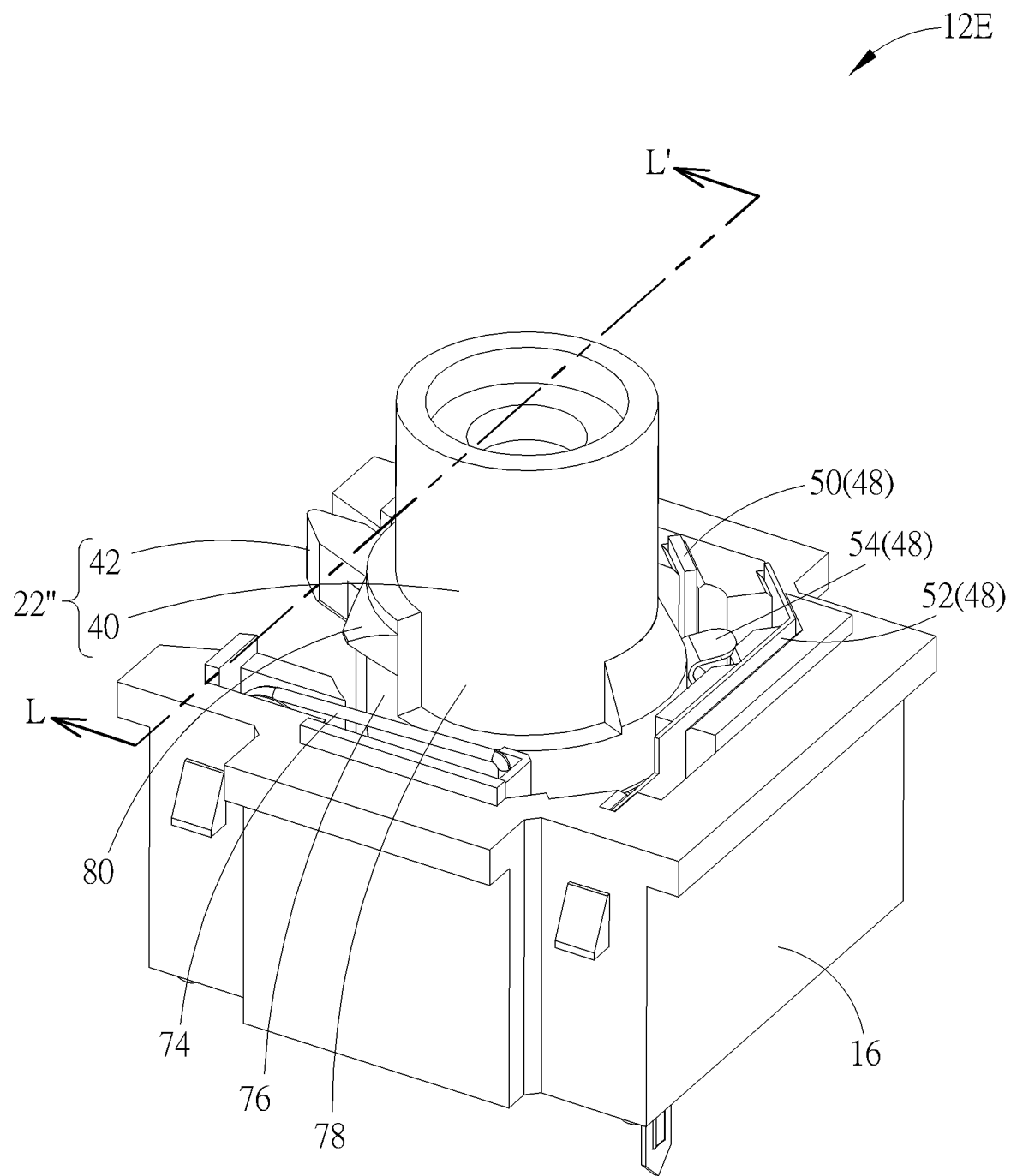
Figure 33:
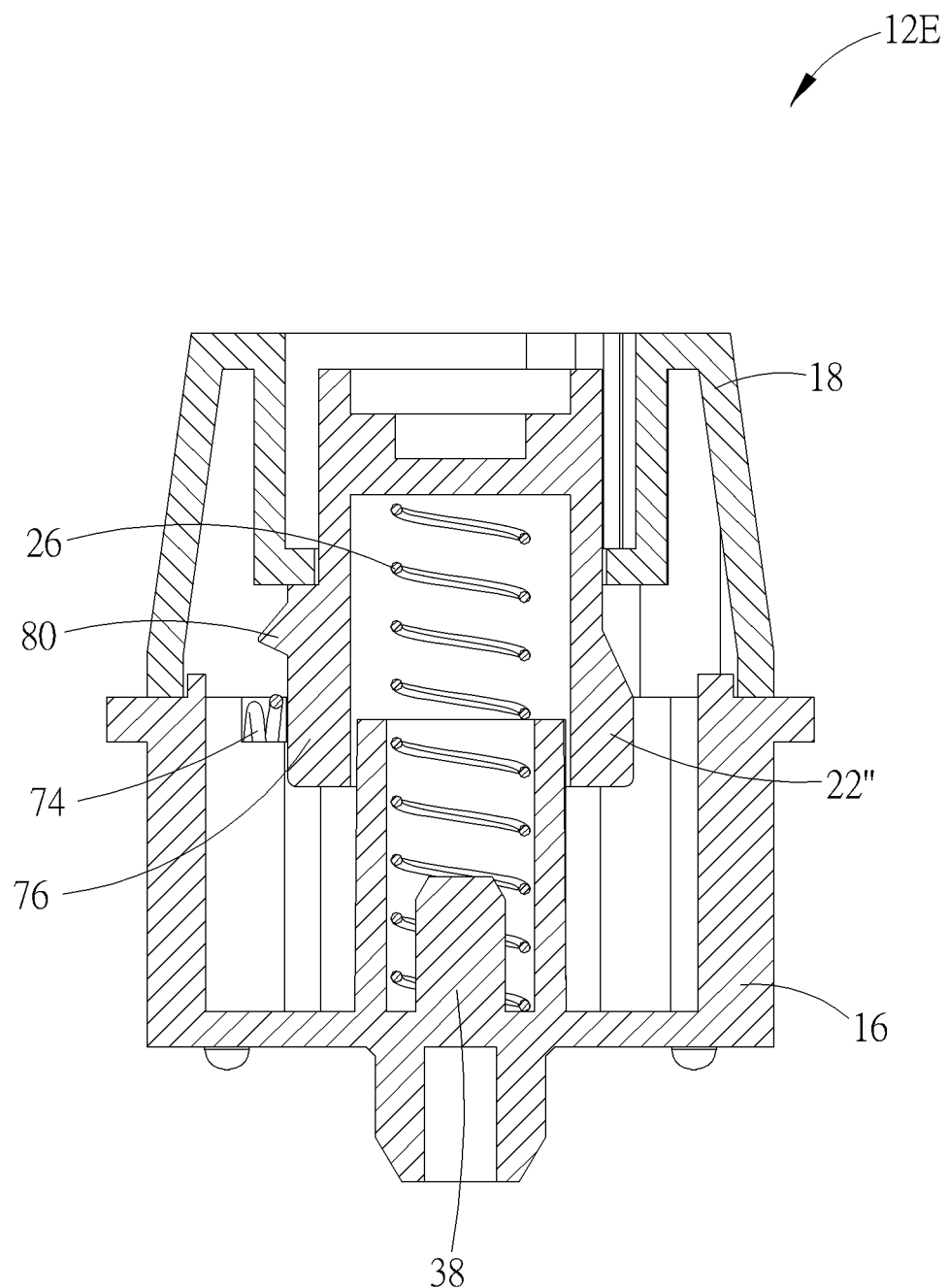
FIG. 33 is a sectional view of the keyswitch with the upper cover along line K-K' shown in FIG. 31.
Figure 34:
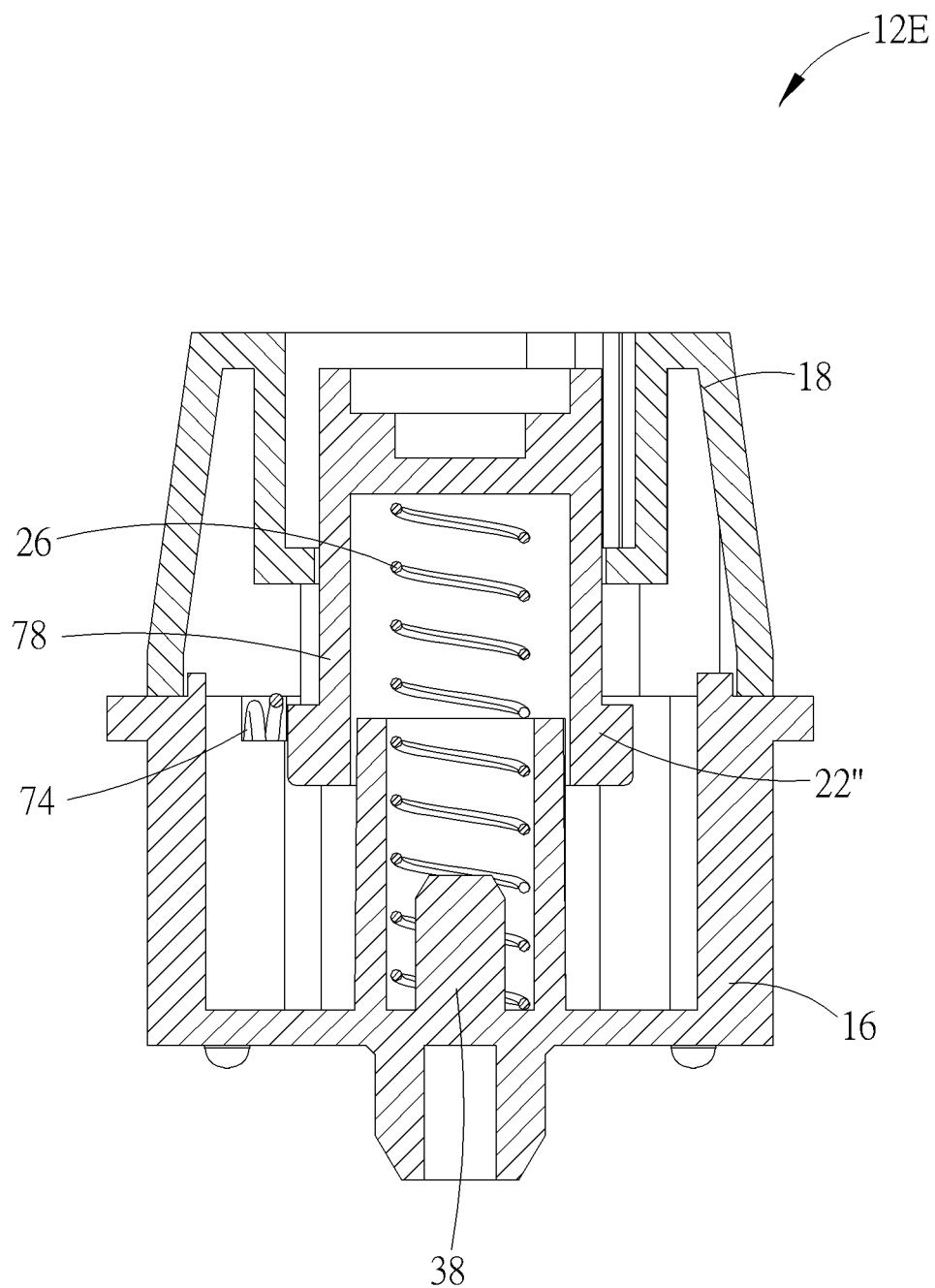
FIG. 34 is a sectional view of the keyswitch with the upper cover along line L-L' shown in FIG. 32.

Please refer to FIG. 30 to FIG. 34. FIG. 30 is an exploded diagram of the keyswitch 12E according to a fifth embodiment of the present invention. FIG. 31 and FIG. 32 respectively are diagrams of the keyswitch 12E without the upper cover 18 and the upper sleeve component 20 in different hand feeling modes according to the fifth embodiment of the present invention. FIG. 33 is a sectional view of the keyswitch 12E with the upper cover 18 along line K-K' shown in FIG. 31. FIG. 34 is a sectional view of the keyswitch 12E with the upper cover 18 along line L-L' shown in FIG. 32.

The keyswitch 12E includes the substrate 16, the upper cover 18, the upper sleeve component 20, the lower sleeve component 22", the keycap 24 and the recovering component 26. The substrate 16 is disposed on the bottom of the keyboard 10 or the printed circuit board. The upper cover 18 is disposed on the substrate 16. The substrate 16 has a resilient arm unit 74 disposed on an inner wall of the substrate 16. The resilient arm unit 74 is compressed and deformed while the keyswitch 12E is manually pressed, and the resilient arm unit 74 can be recovered to hit the upper cover 18 to generate noise while an external force applied to the keyswitch 12E is removed. The upper sleeve component 20 is disposed on the upper cover 18 in an upwardly and downwardly movable manner at the vertical direction. The lower sleeve component 22" is movably disposed between the substrate 16 and the upper cover 18, and the recovering component 26 is disposed between the substrate 16 and the lower sleeve component 22". The recovering component 26 is used to upwardly move the lower sleeve component 20. The upper sleeve component 20 includes the keycap connecting portion 28, and the keycap connecting portion 28 can be assembled with the keycap 24.

The substrate 16 includes the constraining pillar 38. The lower sleeve component 22" includes the main body 40 and the pushing portion 42. The main body 40 is movably disposed on the constraining pillar 38, and the pushing portion 42 stretches from the surface of the main body 40 to be partly exposed out of the substrate 16. Therefore, when the user manually presses the pushing portion 42 of each of the plurality of keyswitches 12, or utilizes the adjusting component 14 to simultaneously push the pushing portions 42 of the plurality of keyswitches 12, the main body 40 is guided by the pushing portion 42 and can be levelly rotated relative to the constraining pillar 38. In addition, the upper sleeve component 20 may include the sliding portion 44 movably disposed inside the sliding slot 46 formed on the upper cover 18. While the keycap 24 is manually pressed, the keycap 24 can be moved relative to the upper cover 18 via the sliding portion 44 in an upwardly and downwardly movable manner at the vertical direction; the sliding slot 46 further can be used to prevent the upper sleeve component 20 from being levelly rotated relative to the upper cover 18.

The substrate 16 further includes the electrode module 48, and the electrode module 48 includes the first electrode sheet 50 and the second electrode sheet 52. The first electrode sheet 50 is inserted into the bottom inside the substrate 16, and the second electrode sheet 52 is pasted on the inner wall of the substrate 16 and located between the first electrode sheet 50 and the lower sleeve component 22". The second electrode sheet 52 includes the elastic portion 54 movably contacting against the lower sleeve component 22". The lower sleeve component 22" can be interfered with the electrode module 48 while the lower sleeve component 22" is vertically moved relative to the constraining pillar 38 of the substrate 16. That is to say, the elastic portion 54 of the second electrode sheet 52 can contact against and be separated from the first electrode sheet 50 in accordance with upward and downward motion of the lower sleeve component 22" for triggering the keyswitch 12E.

The lower sleeve component 22" further includes a third vertical lateral surface 76 and a fourth vertical lateral surface 78, and a shape of the third vertical lateral surface 76 is different form a shape of the fourth vertical lateral surface 78. For example, the third vertical lateral surface 76 has a resistance protrusion 80, and the fourth vertical lateral surface 78 is a flat surface. The lower sleeve component 22" can be levelly rotated relative to the constraining pillar 38 of the substrate 16 at the right direction and the left direction, so as to switch between the first angle position shown in FIG. 31 and the second angle position shown in FIG. 32. While the lower sleeve component 22" is set in the first angle position, the third vertical lateral surface 76 faces the resilient arm unit 74, the fourth vertical lateral surface 78 is distant from the resilient arm unit 74, the keyswitch 12E is pressed to downwardly move the lower sleeve component 22" along the constraining pillar 38, the resilient arm unit 74 is affected by the resistance protrusion 80 to generate the tactile feedback. When the resilient arm unit 74 is moved across the resistance protrusion 80 for recovery, the resilient arm unit 74 can hit one of the upper cover 18 and the substrate 16 to generate noise, as shown in FIG. 33.

While the lower sleeve component 22" is set in the second angle position, the third vertical lateral surface 76 is distant from the resilient arm unit 74, the fourth vertical lateral surface 78 faces the resilient arm unit 74, the keyswitch 12E is pressed to downwardly move the lower sleeve component 22" along the constraining pillar 38, and the resilient arm unit is spaced from the flat fourth vertical lateral surface 78, as shown in FIG. 34, so the tactile feedback is not generated. Thus, the keyswitch 12E set in the first angle position provides the hand feeling of clicky and tactile feedback, and the keyswitch 12E set in the second angle position provides the hand feeling of non-clicky and linear feedback.

Figure 35:
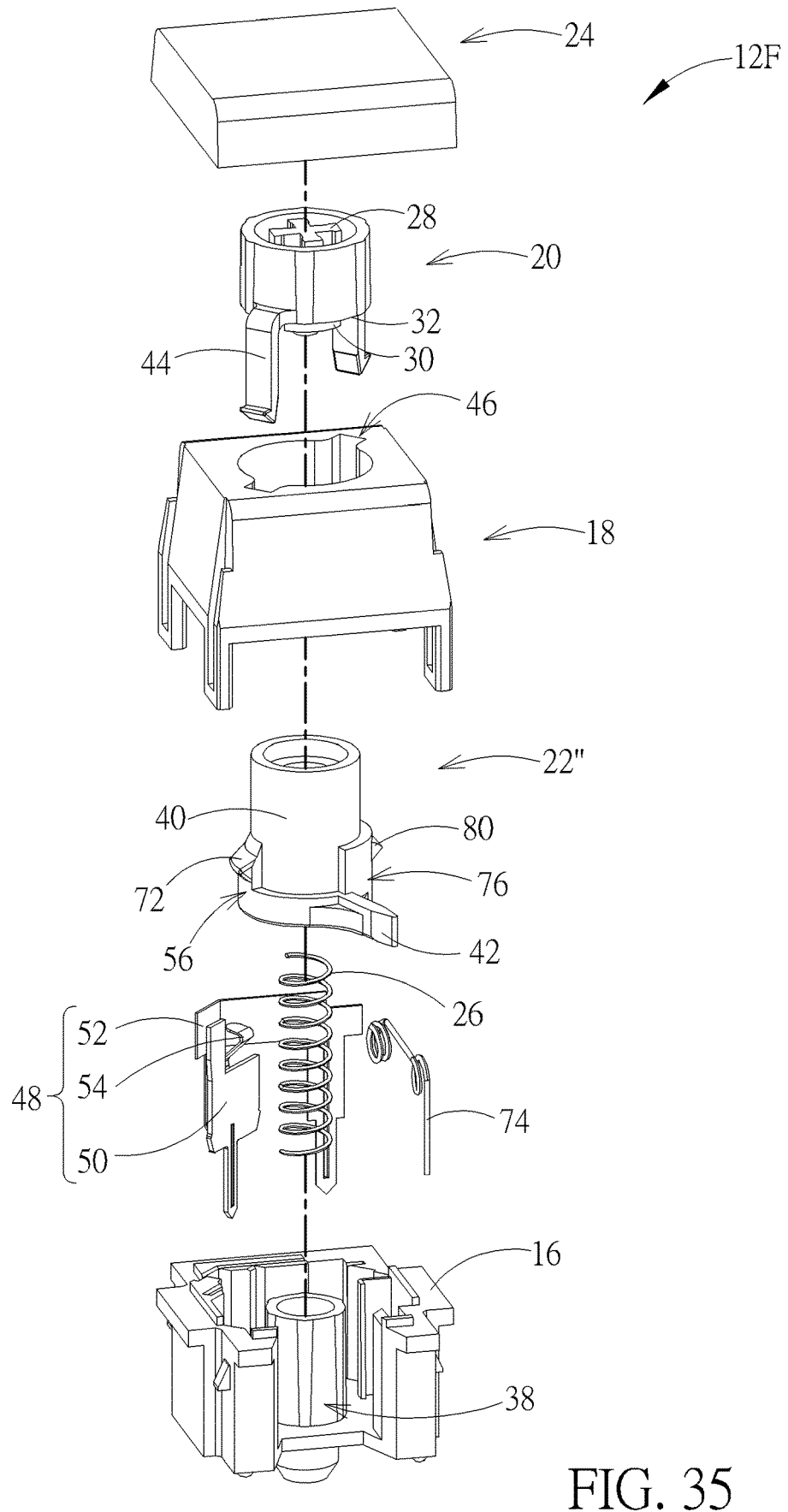
FIG. 35 is an exploded diagram of the keyswitch according to a sixth embodiment of the present invention.
Figure 36:
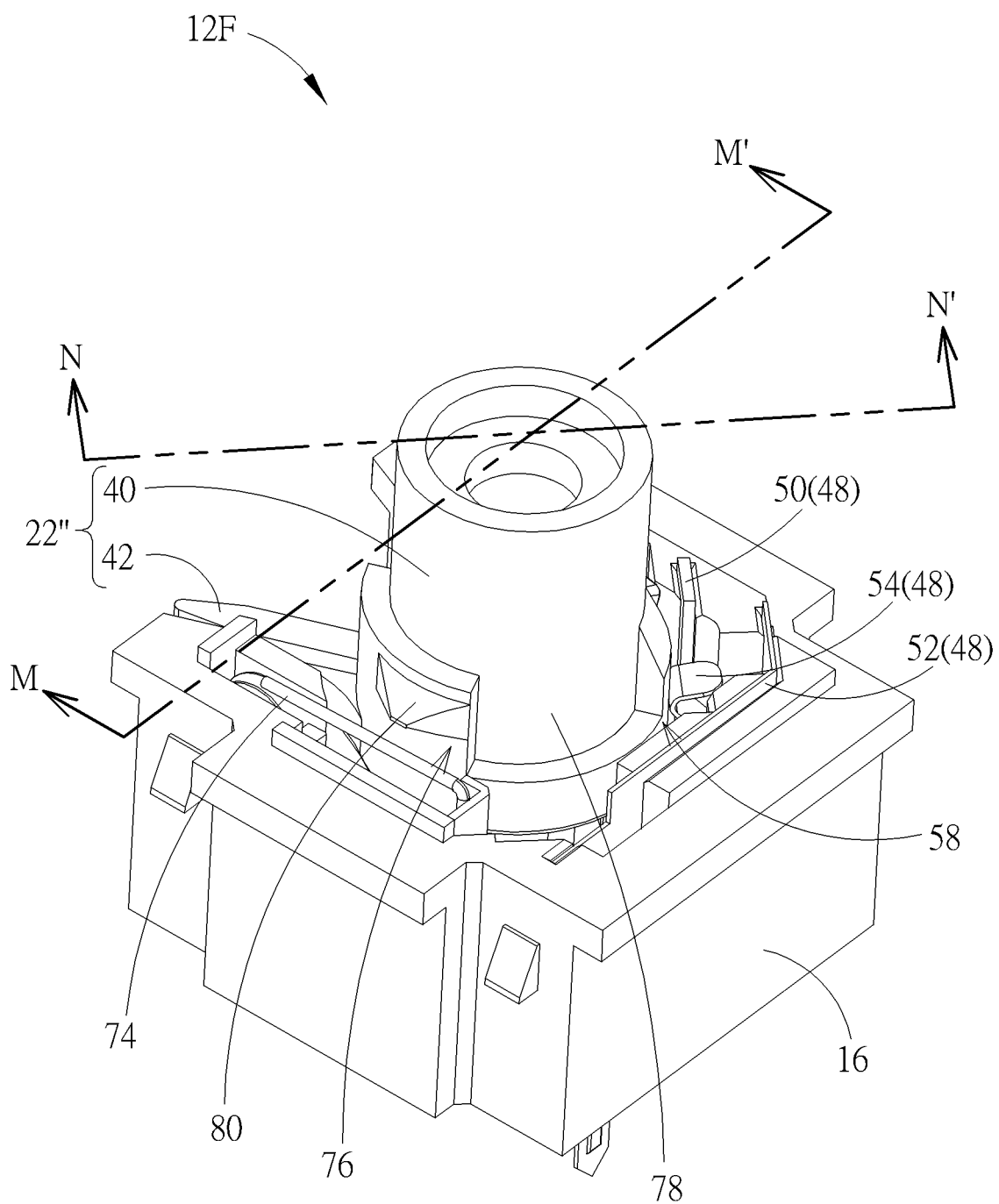
FIG. 36 and FIG. 37 respectively are diagrams of the keyswitch without the upper cover and the upper sleeve component in different hand feeling modes according to the sixth embodiment of the present invention.
Figure 37:
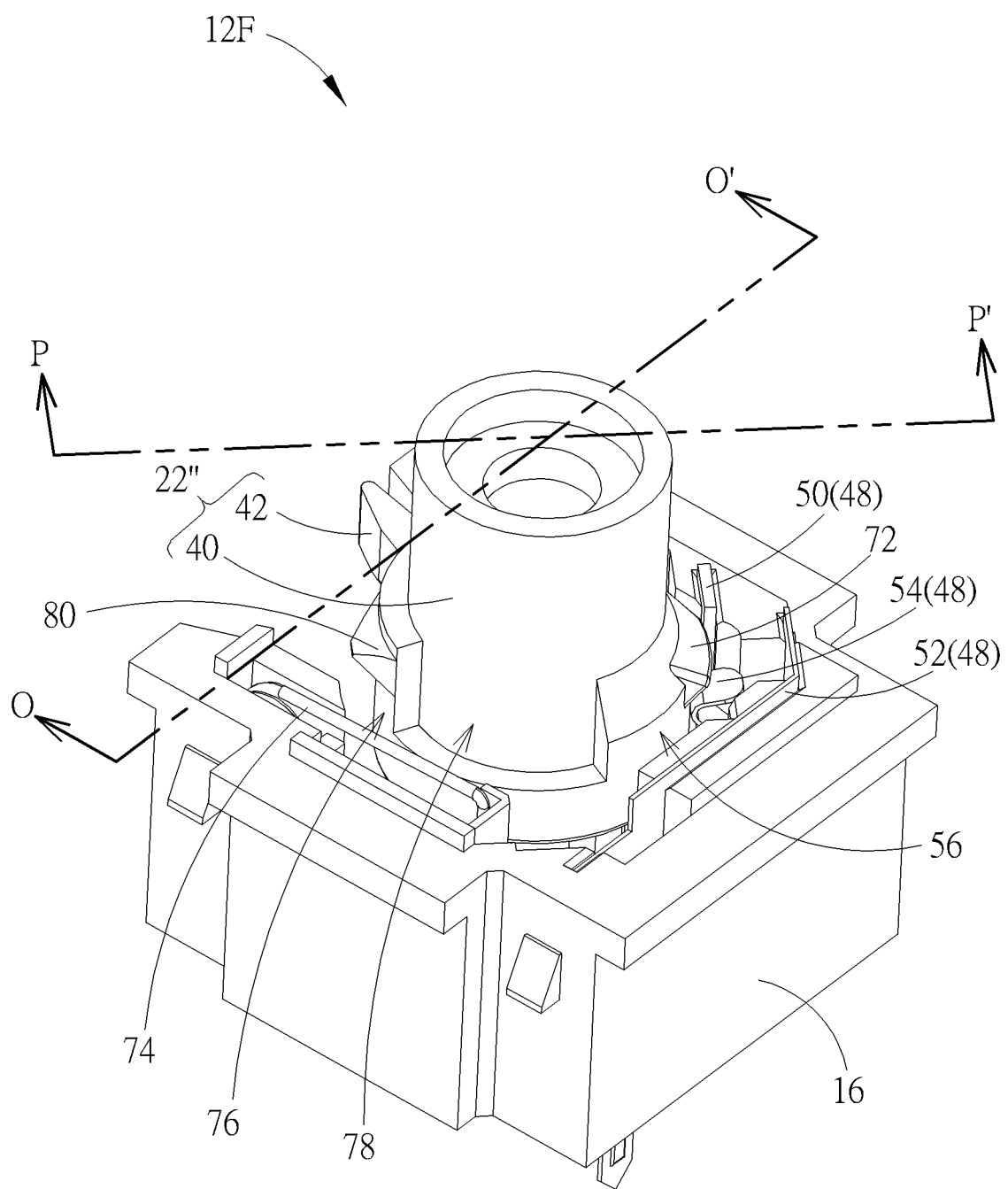
Figure 38:
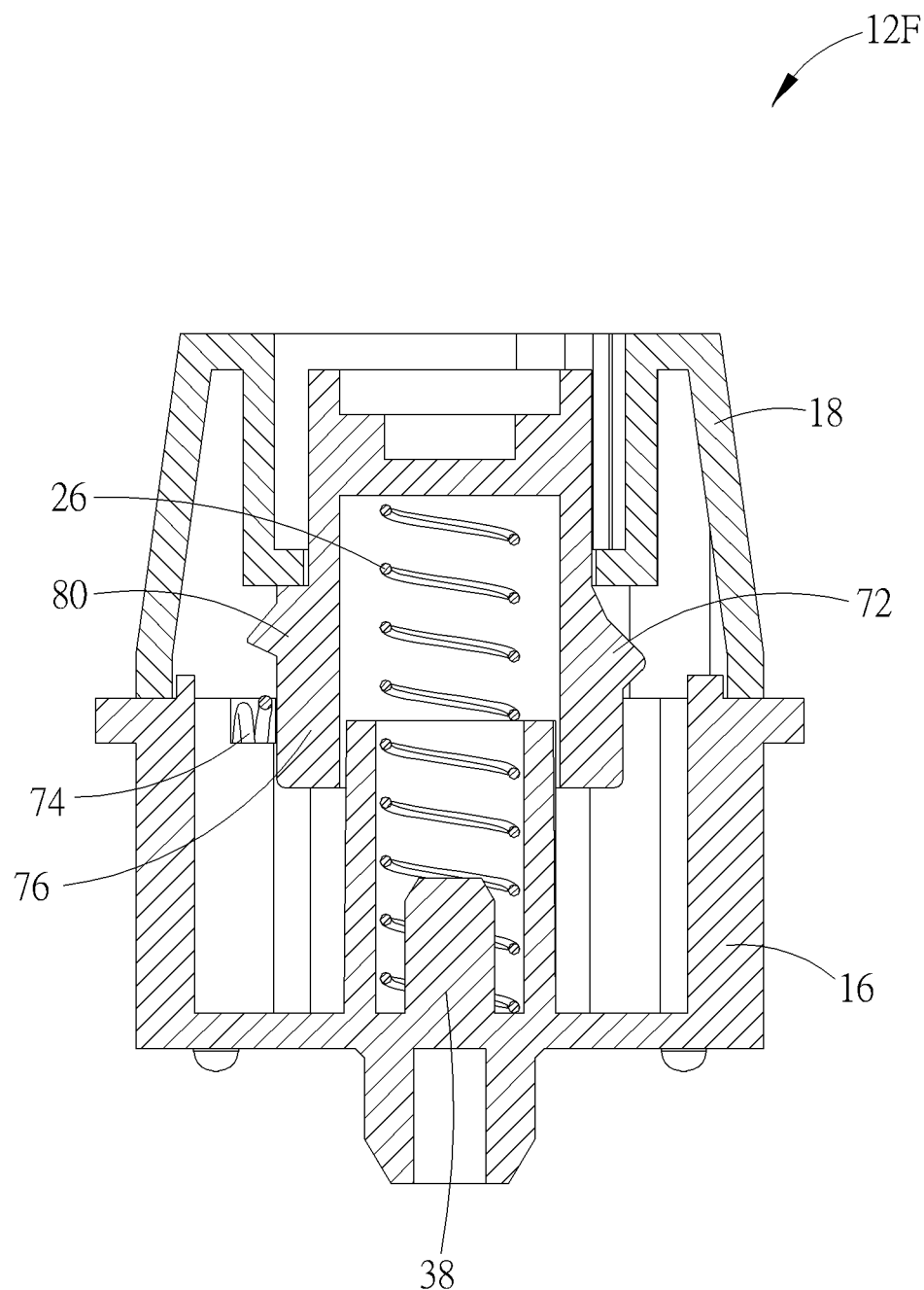
FIG. 38 is a sectional view of the keyswitch with the upper cover along line M-M' shown in FIG. 36.
Figure 39:
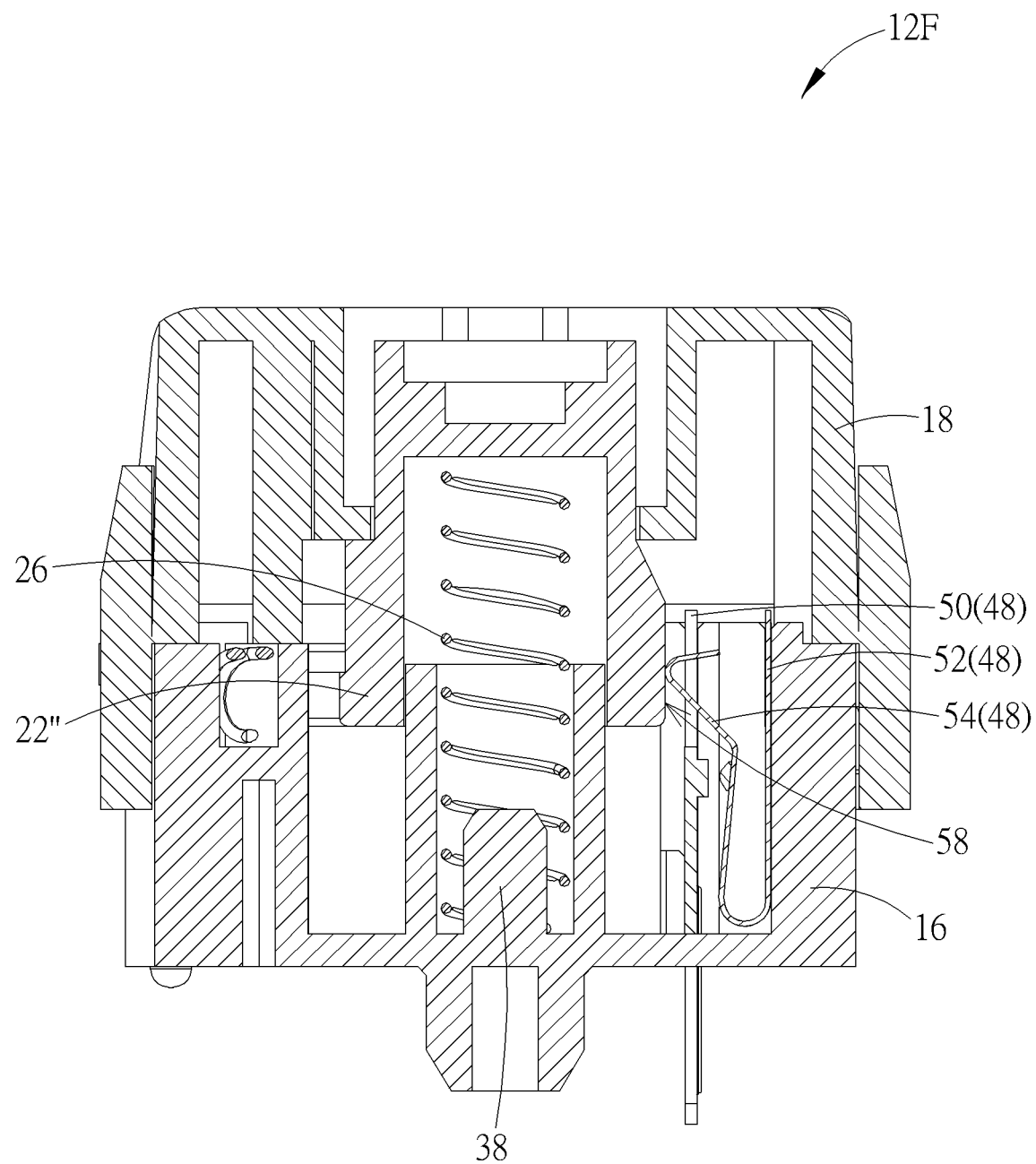
FIG. 39 is a sectional view of the keyswitch with the upper cover along line N-N' shown in FIG. 36.
Figure 40:
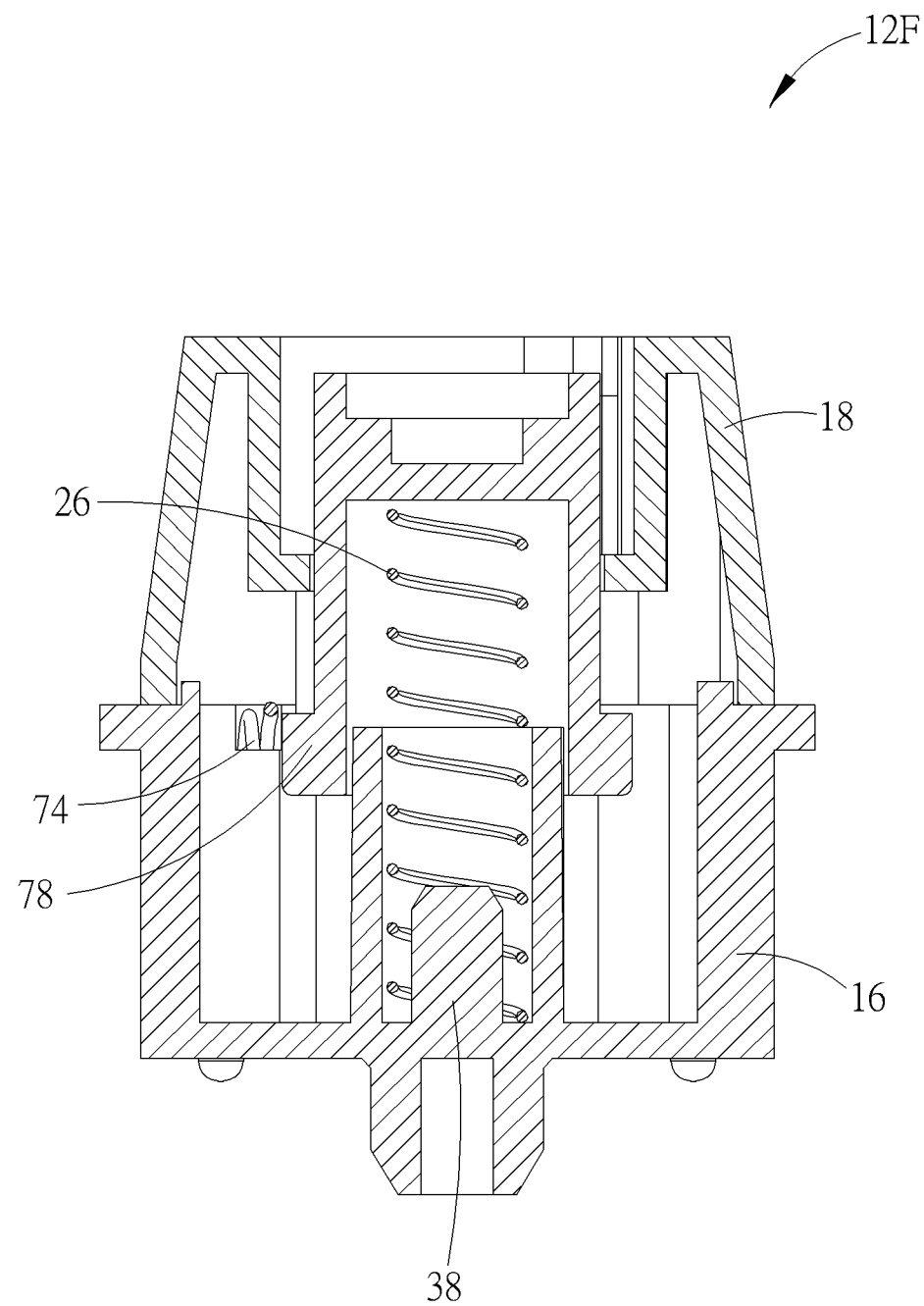
FIG. 40 is a sectional view of the keyswitch with the upper cover along line O-O' shown in FIG. 37.
Figure 41:
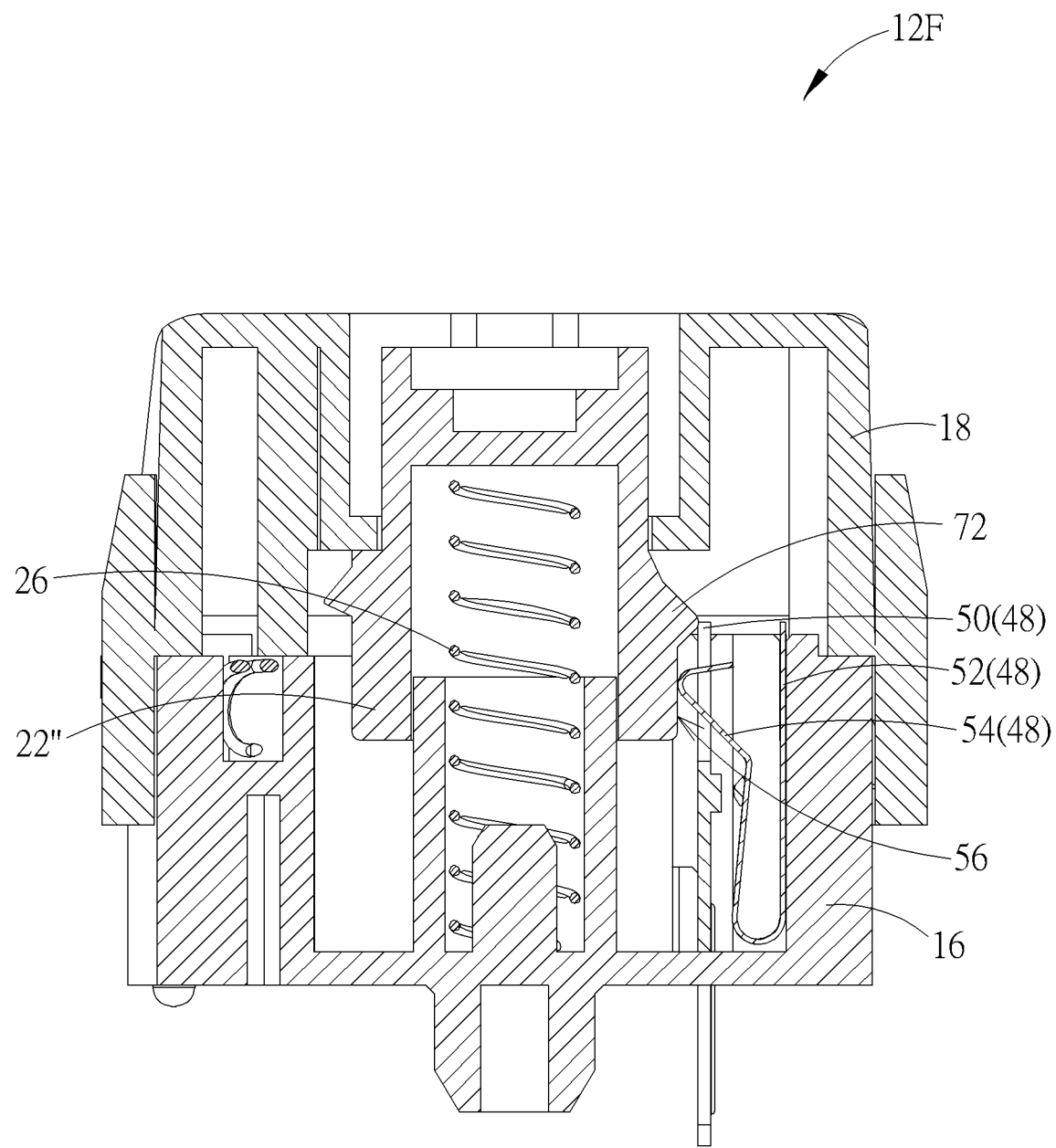
FIG. 41 is a sectional view of the keyswitch with the upper cover along line P-P' shown in FIG. 37.

Please refer to FIG. 35 to FIG. 41. FIG. 35 is an exploded diagram of the keyswitch 12F according to a sixth embodiment of the present invention. FIG. 36 and FIG. 37 respectively are diagrams of the keyswitch 12F without the upper cover 18 and the upper sleeve component 20 in different hand feeling modes according to the sixth embodiment of the present invention. FIG. 38 is a sectional view of the keyswitch 12F with the upper cover 18 along line M-M' shown in FIG. 36. FIG. 39 is a sectional view of the keyswitch 12F with the upper cover 18 along line N-N' shown in FIG. 36. FIG. 40 is a sectional view of the keyswitch 12F with the upper cover 18 along line O-O' shown in FIG. 37. FIG. 41 is a sectional view of the keyswitch 12F with the upper cover 18 along line P-P' shown in FIG. 37.

The keyswitch 12F includes the substrate 16, the upper cover 18, the upper sleeve component 20, the lower sleeve component 22", the keycap 24 and the recovering component 26. The substrate 16 is disposed on the bottom of the keyboard 10. The upper cover 18 is disposed on the substrate 16. The substrate 16 has the resilient arm unit 74 disposed on the inner wall of the substrate 16. The resilient arm unit 74 is compressed and deformed while the keyswitch 12F is pressed, and the resilient arm unit 74 can be recovered to rapidly hit the upper cover 18 for generating noise while the external force applied to the keyswitch 12E is removed. The upper sleeve component 20 is disposed on the upper cover 18 in an upwardly and downwardly movable manner at the vertical direction. The lower sleeve component 22" is movably disposed between the substrate 16 and the upper cover 18, and the recovering component 26 is disposed between the substrate 16 and the lower sleeve component 22". The recovering component 26 is used to upwardly move the lower sleeve component 20. The upper sleeve component 20 includes the keycap connecting portion 28, and the keycap connecting portion 28 can be assembled with the keycap 24.

The substrate 16 includes the constraining pillar 38. The lower sleeve component 22 includes the main body 40 and the pushing portion 42, and the main body 40 is movably disposed on the constraining pillar 38. The pushing portion 42 stretches from the surface of the main body 40 to be partly exposed out of the substrate 16. Thus, when the pushing portion 42 is pushed by the external force, such as the user manually pressing the pushing portion 42 of each of the plurality of keyswitches 12 or utilizing the adjusting component 14 to push the pushing portions 42 of the plurality of keyswitches 12, the main body 40 is guided by the pushing portion 42 and can be levelly rotated relative to the constraining pillar 38. Besides, the upper sleeve component 20 can include the sliding portion 44 movably disposed inside the sliding slot 46 formed on the upper cover 18. While the keycap 24 is manually pressed, the keycap 24 can be moved relative to the upper cover 18 via the sliding portion 44 upwardly and downwardly at the vertical direction. The sliding slot 46 further can be used to prevent the upper sleeve component 20 from being levelly rotated relative to the upper cover 18.

The substrate 16 further includes the electrode module 48, and the electrode module 48 includes the first electrode sheet 50 and the second electrode sheet 52. The first electrode sheet 50 is inserted into the bottom inside the substrate 16, and the second electrode sheet 52 is pasted on the inner wall of the substrate 16 and located between the first electrode sheet 50 and the lower sleeve component 22". The second electrode sheet 52 includes the elastic portion 54 movably contacting against the lower sleeve component 22". The lower sleeve component 22" can be interfered with the electrode module 48 while the lower sleeve component 22" is moved relative to the constraining pillar 38 of the substrate 16 upwardly and downwardly. Therefore, the elastic portion 54 of the second electrode sheet 52 can contact against and be separated from the first electrode sheet 50 in accordance with upward and downward motion of the lower sleeve component 22" for triggering the keyswitch 12F.

The lower sleeve component 22" further includes the first vertical lateral surface 56 and the second vertical lateral surface 58, and the shape of the first vertical lateral surface 56 is different form the shape of the second vertical lateral surface 58. The first vertical lateral surface 56 includes the resistance protrusion 72, and the second vertical lateral surface 58 is the flat surface. The lower sleeve component 22" can be levelly rotated relative to the constraining pillar 38 of the substrate 16 at the right direction and the left direction, so as to switch between different angle positions shown in FIG. 36 and FIG. 37. As in the angle position shown in FIG. 37, the keyswitch 12F is pressed, the lower sleeve component 22" is moved relative to the constraining pillar 38 vertically, the elastic portion 54 is slid upon the first vertical lateral surface 56 to move across the resistance protrusion 72 for electrifying the electrode module 48, as shown in FIG. 41, which means the electrode module 48 can be functioned with the resistance protrusion 72 to generate the tactile feedback. As in the second angle position shown in FIG. 36, the keyswitch 12F is pressed to vertically move the lower sleeve component 22" along the constraining pillar 38, the elastic portion 54 is slid on the flat second vertical lateral surface 58, as shown in FIG. 39, and the electrode module 48 is electrified without the tactile feedback The lower sleeve component 22" further can include the third vertical lateral surface 76 and the fourth vertical lateral surface 78, and the shape of the third vertical lateral surface 76 is different form the shape of the fourth vertical lateral surface 78. For example, the third vertical lateral surface 76 has the resistance protrusion 80, and the fourth vertical lateral surface 78 is the flat surface. The lower sleeve component 22" can be levelly rotated relative to the constraining pillar 38 of the substrate 16 at the right direction and the left direction, so as to switch between different angle position shown in FIG. 36 and FIG. 37. As in the angle position shown in FIG. 36, the third vertical lateral surface 76 faces the resilient arm unit 74, the fourth vertical lateral surface 78 is distant from the resilient arm unit 74, the keyswitch 12F is pressed to drive the resistance protrusion 80 functioned with the resilient arm unit 74 to generate the tactile feedback; while the resilient arm unit 74 is moved across the resistance protrusion 80 for recovery, the resilient arm unit 74 can hit one of the upper cover 18 and the substrate 16 to generate the noise, as shown in FIG. 38. As in the angle position shown in FIG. 37, the resilient arm unit 74 is spaced from the flat fourth vertical lateral surface 78 while the keyswitch 12F is pressed, as shown in FIG. 40, and the tactile feedback is not generated.

In the sixth embodiment, the keyswitch 12F switched to the angle position shown in FIG. 36 has the hand feeling of clicky and tactile feedback, the clicky and the tactile feedback are generated by function between the resistance protrusion 80 and the resilient arm unit 74; the keyswitch 12F switched to the angle position shown in FIG. 37 has the hand feeling of non-clicky and tactile feedback, the tactile feedback is generated by the resistance protrusion 72 functioned with the elastic portion 54 of the electrode module 48.

Figure 42:
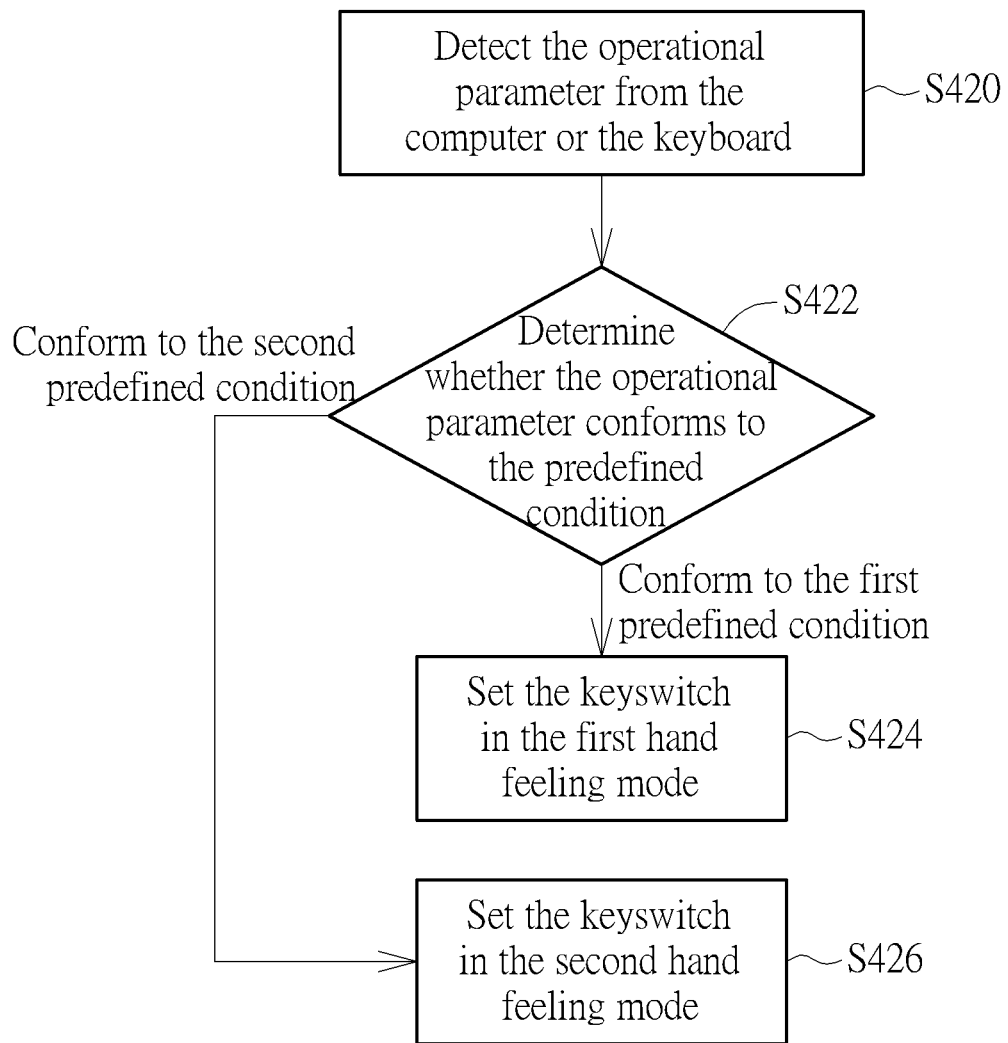
FIG. 42 is a flow chart of changing operational hand feeling of the keyboard according to the embodiment of the present invention.

Please refer to FIG. 42. FIG. 42 is a flow chart of changing operational hand feeling of the keyboard 10 according to the embodiment of the present invention. The keyboard 10 is electrically connected to an external computer (not shown in figures), and the user can use the keyboard 10 to operate an application program executed by the computer. The plurality of keyswitches 12 of the keyboard 10 can be alternatively set in the first hand feeling mode or the second hand feeling mode; additionally, a controller 82 of the keyboard 10 can pre-store a first predefined condition and a second predefined condition. With regard to the adjusting method of changing the operational hand feeling of the keyboard 10, step S420 is executed first that the controller 82 is actuated to detect an operational parameter from the computer or the keyboard 10. Then, step S422 is executed to determine whether the operational parameter conforms to the predefined condition. As the first predefined condition is conformed, step S424 is executed that the controller 82 sets the plurality of keyswitches 12 in the first hand feeling mode; as the second predefined condition is conformed, step S426 is executed that the controller 82 sets the plurality of keyswitches 12 in the second hand feeling mode.

The operational parameter can be various types, and its variation is not limited to the following embodiments, which depends on design demand. For example, the operational parameter can be a category of the application program executed by an active window of the computer, such as document program and game program. The first predefined condition may define the document program (such like Microsoft Word) belonging to the first category, and the second predefined condition may define the game program (such like Blizzard Overwatch) belonging to the second category. Therefore, while the application program executed by the computer belongs to the first category, the plurality of keyswitches 12 can be switched to the first hand feeling mode; while the application program executed by the computer belongs to the second category, the plurality of keyswitches 12 can be switched to the second hand feeling mode. The various hand feeling modes may be selected from a group consisted of working travel distance, pressing feedback, triggering depth, clicky sound, clicky resistance, and a combination thereof. The user can adjust foresaid factors in the hand feeling mode in accordance with the application program.

The operational parameter further can be set as press frequency of the plurality of keyswitches 12. The first predefined condition may define that the press frequency of the plurality of keyswitches 12 is greater than a predefined value, therefore when the press frequency of the plurality of keyswitches 12 is greater than the predefined value, such as the keyswitch 12 being pressed rapidly in high frequency, the plurality of keyswitches 12 is switched to the first hand feeling mode. The second predefined condition may define that the press frequency of the plurality of keyswitches 12 is smaller than the predefined value, when the press frequency of the plurality of keyswitches 12 is smaller than the predefined value, the keyswitch 12 is pressed slowly and occasionally, and the plurality of keyswitches 12 is switched to the second hand feeling mode.

The operational parameter further can be set as a number of pressing the plurality of keyswitches 12 within a predefined period. For instance, the first predefined condition may define that the number of pressing within the predefined period is greater than the predefined value, when the number of pressing within the predefined period is greater than the predefined value, the plurality of keyswitches 12 is switched to the first hand feeling mode; the second predefined condition may define that the number of press within the predefined period is smaller than the predefined value, when the number of pressing within the predefined period is smaller than the predefined value, the plurality of keyswitches 12 is switched to the second hand feeling mode.

Switching of the keyswitch 12 can be manually operated by the user, as shown in FIG. 1, holes on the adjusting component 14 are respectively engaged with the pushing portions 42 of the plurality of keyswitches 12, the user can push the adjusting component 14 to simultaneously switch the plurality of keyswitches 12 into the first hand feeling mode or the second hand feeling mode. Additionally, the keyboard 10 may have a driving device 84, such as an electric motor. When the controller 82 detects that the operational parameter conforms to the first predefined condition or the second predefined condition, the user can start off the driving device 84 to move the adjusting component 14, so as to simultaneously switch the plurality of keyswitches 12 into one of the first hand feeling mode and the second hand feeling mode.

In conclusion, the keyswitch in the first embodiment of the present invention disposes the concave and convex structures between the upper sleeve component and the lower sleeve component, the required actuation force quantity of the recovering component is varied, and the keyswitch can provide the hand feeling modes with different feedback by the same triggering travel distance; the keyswitch in the second embodiment disposes the concave and convex structures between the lower sleeve component and the substrate, the possible pressing depth of the lower sleeve component is varied, so that the pressing travel distance of the keyswitch can be adjusted for different hand feeling modes; the keyswitch in the third embodiment designs stage variation by the inclined surfaces on the outer surface of the lower sleeve component, so that the keyswitch can provide different triggering travel distances via the identical required actuation force condition; the keyswitch in the fourth embodiment disposes the resistance protrusion on position of the lower sleeve component corresponding to the electrode module, the resistance protrusion can touch or be distant from the electrode module according to the left and right turn of the lower sleeve component, which results in the hand feeling mode of non-clicky and linear feedback and the hand feeling mode of non-clicky and tactile feedback; the keyswitch in the fifth embodiment disposes the resilient arm unit on the substrate, and further disposes the resistance protrusion on the lower sleeve component corresponding to the resilient arm unit, which results in the hand feeling mode of non-clicky and linear feedback and the hand feeling mode of clicky sound and tactile feedback; the keyswitch in the sixth embodiment disposes two resistance protrusions on the lower sleeve component for the hand feeling mode of clicky and tactile feedback and the hand feeling mode of non-clicky and tactile feedback. The keyboard can utilize the adjusting component to manually or automatically switch the keyswitch into different hand feeling modes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyswitch capable of assembling with a keycap, the keyswitch comprising: a substrate; an upper cover disposed on the substrate; an upper sleeve component disposed on the upper cover in a movable manner at a vertical direction, the upper sleeve component having a keycap connecting portion, a first bottom surface and a second bottom surface, the first bottom surface being lower than the second bottom surface, the keycap connecting portion being assembled with the keycap; a lower sleeve component movably disposed between the substrate and the upper cover, the lower sleeve component being rotated relative to the substrate at a level direction and switched between a first angle position and a second angle position, the lower sleeve component having a first top surface and a second top surface, the first top surface being higher than the second top surface; and a recovering component disposed between the substrate and the lower sleeve component and adapted to upwardly move the lower sleeve component; wherein the first bottom surface abuts the first top surface, a gap between the lower sleeve component and the substrate is reduced and the recovering component has a first length while the lower sleeve component contacts against the upper sleeve component in the first angle position; wherein the first bottom surface abuts the second top surface or the second bottom surface abuts the first top surface, the gap between the lower sleeve component and the substrate is enlarged and the recovering component has a second length greater than the first length while the lower sleeve component contacts against the upper sleeve component in the second angle position, wherein the substrate further comprises a constraining pillar, the lower sleeve component comprises: a main body movably disposed on the constraining pillar; and a pushing portion stretching from a surface of the main body to be partly exposed out of the substrate, the pushing portion being pushed by an external force to guide level rotation of the main body.

2. The keyswitch of claim 1, wherein the upper sleeve component comprises a sliding portion movably disposed inside a sliding slot formed on the upper cover and adapted to prevent the upper sleeve component from being levelly rotated relative to the upper cover.

3. The keyswitch of claim 1, wherein the substrate has an electrode module, the lower sleeve component is interfered with the electrode module while the lower sleeve component is moved relative to the substrate vertically, the electrode module comprises:
  a first electrode sheet disposed inside the substrate; and
  a second electrode sheet spaced from the first electrode sheet, the second electrode sheet having an elastic portion movably contacting against the lower sleeve component, the elastic portion contacting against or being separated from the first electrode sheet in accordance with upward and downward motion of the lower sleeve component.

4. The keyswitch of claim 1, wherein the substrate has a resilient arm unit, the lower sleeve component is interfered with the resilient arm unit while the lower sleeve component is moved relative to the substrate vertically.

5. The keyswitch of claim 3, wherein the lower sleeve component has at least one vertical lateral surface and at least one sectional inclined surface connected to each other, the first electrode sheet and the second electrode sheet are not conducted when the elastic portion abuts against the at least one vertical lateral surface, and the first electrode sheet and the second electrode sheet are conducted when the elastic portion abuts against the at least one sectional inclined surface.

6. The keyswitch of claim 5, wherein the at least one vertical lateral surface comprises a first vertical lateral surface and a second vertical lateral surface, the at least one sectional inclined surface comprises a first sectional inclined surface and the second sectional inclined surface, a shape of the first vertical lateral surface being different from a shape of the second vertical lateral surface, the first sectional inclined surface connected to the first vertical lateral surface is higher than the second sectional inclined surface connected to the second vertical lateral surface.

7. The keyswitch of claim 6, wherein a distance between the first sectional inclined surface and a bottom of the lower sleeve component is greater than a distance between the second sectional inclined surface and the bottom of the lower sleeve component.

8. A keyswitch capable of assembling with a keycap, the keyswitch comprising: a substrate, having a first top surface and a second top surface, the first top surface being higher than the second top surface; an upper cover disposed on the substrate; an upper sleeve component disposed on the upper cover in a movable manner at a vertical direction, the upper sleeve component having a keycap connecting portion assembled with the keycap; a lower sleeve component movably disposed between the substrate and the upper cover, the lower sleeve component being rotated relative to the substrate at a level direction and switched between a first angle position and a second angle position, the lower sleeve component having a first bottom surface and a second bottom surface, the first bottom surface being lower than the second bottom surface; and a recovering component disposed between the substrate and the lower sleeve component and adapted to upwardly move the lower sleeve component; wherein the first bottom surface abuts the first top surface, and vertical motion of the lower sleeve component provides a first travel distance while the lower sleeve component contacts against the substrate in the first angle position; wherein the first bottom surface abuts the second top surface or the second bottom surface abuts the first top surface, and vertical motion of the lower sleeve component provides a second travel distance while the lower sleeve component contacts against the substrate in the second angle position, the second travel distance is greater than the first travel distance, wherein the substrate further comprises a constraining pillar, the lower sleeve component comprises: a main body movably disposed on the constraining pillar; and a pushing portion stretching from a surface of the main body to be partly exposed out of the substrate, the pushing portion being pushed by an external force to guide rotation of the main body levelly.

9. The keyswitch of claim 8, wherein the upper sleeve component comprises a sliding portion movably disposed inside a sliding slot formed on the upper cover and adapted to prevent the upper sleeve component from being levelly rotated relative to the upper cover.

10. The keyswitch of claim 8, wherein the substrate has an electrode module, the lower sleeve component is interfered with the electrode module while the lower sleeve component is moved relative to the substrate vertically, the electrode module comprises:
  a first electrode sheet disposed inside the substrate; and
  a second electrode sheet spaced from the first electrode sheet, the second electrode sheet having an elastic portion movably contacting against the lower sleeve component, the elastic portion contacting against or being separated from the first electrode sheet in accordance with upward and downward motion of the lower sleeve component.

11. The keyswitch of claim 8, wherein the substrate further has a resilient arm unit, the lower sleeve component is interfered with the resilient arm unit while the lower sleeve component is moved relative to the substrate vertically.

12. The keyswitch of claim 10, wherein the lower sleeve component has at least one vertical lateral surface and at least one sectional inclined surface connected to each other, the first electrode sheet and the second electrode sheet are not conducted when the elastic portion abuts against the at least one vertical lateral surface, and the first electrode sheet and the second electrode sheet are conducted when the elastic portion abuts against the at least one sectional inclined surface.

13. The keyswitch of claim 12, wherein the at least one vertical lateral surface comprises a first vertical lateral surface and a second vertical lateral surface, the at least one sectional inclined surface comprises a first sectional inclined surface and the second sectional inclined surface, a shape of the first vertical lateral surface being different from a shape of the second vertical lateral surface, the first sectional inclined surface connected to the first vertical lateral surface is higher than the second sectional inclined surface connected to the second vertical lateral surface.

14. The keyswitch of claim 13, wherein a distance between the first sectional inclined surface and a bottom of the lower sleeve component is greater than a distance between the second sectional inclined surface and the bottom of the lower sleeve component.

15. A keyswitch capable of assembling with a keycap, the keyswitch comprising: a substrate, having an electrode module; an upper cover disposed on the substrate; an upper sleeve component disposed on the upper cover in a movable manner at a vertical direction, the upper sleeve component having a keycap connecting portion assembled with the keycap; a lower sleeve component movably disposed between the substrate and the upper cover, the lower sleeve component being rotated relative to the substrate at a level direction and switched between a first angle position and a second angle position, the lower sleeve component having a first vertical lateral surface and a second vertical lateral surface, a shape of the first vertical lateral surface being different from a shape of the second vertical lateral surface, the first vertical lateral surface comprising a first sectional inclined surface, the second vertical lateral surface comprising a second sectional inclined surface lower than the first sectional inclined surface; and a recovering component disposed between the substrate and the lower sleeve component and adapted to upwardly move the lower sleeve component; wherein the second vertical lateral surface is separated from the electrode module and the first vertical lateral surface is interfered with the electrode module while the lower sleeve component is moved relative to the substrate in the first angle position; wherein the first vertical lateral surface is separated from the electrode module and the second vertical lateral surface is interfered with the electrode module while the lower sleeve component is moved relative to the substrate in the second angle position; wherein while the lower sleeve component is moved relative to the substrate in the first angle position, the electrode module is electrified as the lower sleeve component is located in a lower position, while the lower sleeve component is moved relative to the substrate in the second angle position, the electrode module is electrified as the lower sleeve component is located in a higher position, wherein the substrate further comprises a constraining pillar, the lower sleeve component comprises: a main body movably disposed on the constraining pillar; and a pushing portion stretching from a surface of the main body to be partly exposed out of the substrate, the pushing portion being pushed by an external force to guide level rotation of the main body.

16. The keyswitch of claim 15, wherein the upper sleeve component comprises a sliding portion movably disposed inside a sliding slot formed on the upper cover and adapted to prevent the upper sleeve component from being levelly rotated relative to the upper cover.

17. The keyswitch of claim 15, wherein the lower sleeve component is interfered with the electrode module while the lower sleeve component is moved relative to the substrate vertically, the electrode module comprises:

a first electrode sheet disposed inside the substrate; and a second electrode sheet spaced from the first electrode sheet, the second electrode sheet having an elastic portion movably contacting against the lower sleeve component, the elastic portion contacting against or being separated from the first electrode sheet in accordance with upward and downward motion of the lower sleeve component.

* * * * *